United States Patent
Woo et al.

(10) Patent No.: US 11,301,266 B2
(45) Date of Patent: Apr. 12, 2022

(54) METHOD AND APPARATUS FOR MANAGING INTELLIGENT AGENT

(71) Applicant: Samsung Electronics Co., Ltd., Suwon-si (KR)

(72) Inventors: Kyounggu Woo, Suwon-si (KR); Hojun Jaygarl, Hwaseong-si (KR); Jehun Jeon, Suwon-si (KR); Hyunjin Park, Suwon-si (KR); Sangwook Kang, Yongin-si (KR); Kyungtae Kim, Hwaseong-si (KR); Jaeyung Yeo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/608,656

(22) PCT Filed: Mar. 27, 2018

(86) PCT No.: PCT/KR2018/003612
§ 371 (c)(1),
(2) Date: Oct. 25, 2019

(87) PCT Pub. No.: WO2018/199483
PCT Pub. Date: Nov. 1, 2018

(65) Prior Publication Data
US 2020/0192684 A1 Jun. 18, 2020

(30) Foreign Application Priority Data
Apr. 27, 2017 (KR) .................. 10-2017-0054350

(51) Int. Cl.
*G06F 3/0488* (2013.01)
*G06F 9/451* (2018.01)
(Continued)

(52) U.S. Cl.
CPC ............ *G06F 9/451* (2018.02); *G06F 3/0488* (2013.01); *G06F 3/167* (2013.01); *G10L 15/22* (2013.01)

(58) Field of Classification Search
CPC ........ G06F 9/451; G06F 3/0488; G06F 3/167; G10L 15/22
See application file for complete search history.

(56) References Cited

U.S. PATENT DOCUMENTS 6,185,535 B1 * 2/2001 Hedin .................. G10L 15/30
704/270
6,212,649 B1 * 4/2001 Yalowitz ............. G06F 11/1479
709/201
(Continued)

FOREIGN PATENT DOCUMENTS

| JP | 2014-059647 A | 4/2014 |
| KR | 10-2016-0142802 A | 12/2016 |
| WO | 2015102124 A1 | 7/2015 |

OTHER PUBLICATIONS

ISA/KR, International Search Report and Written Opinion of the International Searching Authority, International Application No. PCT/KR2018/003612, dated Jun. 15, 2018, 26 pages.

*Primary Examiner* — Phenuel S Salomon

(57) ABSTRACT

The present invention can receive a user input comprising a request to perform a task using at least one of the application programs via at least one of a display or a microphone, transmit data related to the user input to an external server through a communication circuit, transmit version information on at least one of the application programs to the external server via the communication circuit together with the data transmission or after the data transmission, receive a pass rule as a response to the request from the external server via the communication circuit, and store instructions that cause an electronic device to perform the task by (Continued)

allowing the electronic device to have the sequence. The pass rule comprises information on a sequence of states of the electronic device for performing the task, and at least one of the states may be one determined by the external server on the basis of at least a portion of the version information.

14 Claims, 38 Drawing Sheets

(51) Int. Cl.
    *G06F 3/16*       (2006.01)
    *G10L 15/22*     (2006.01)

(56) References Cited

U.S. PATENT DOCUMENTS

| | | | |
|---|---|---|---|
| 6,678,716 B1* | 1/2004 | Pronsati, Jr. | G06Q 10/06312 709/201 |
| 7,321,857 B2 | 1/2008 | Rodriguez et al. | |
| 7,693,718 B2 | 4/2010 | Jan et al. | |
| 7,761,591 B2 | 7/2010 | Graham | |
| 8,667,479 B2 | 3/2014 | Johnsson et al. | |
| 8,924,928 B1* | 12/2014 | Belovich | H04L 63/101 717/117 |
| 9,548,050 B2* | 1/2017 | Gruber | G06F 40/279 |
| 9,570,086 B1* | 2/2017 | Sanders | G10L 15/22 |
| 2006/0161895 A1* | 7/2006 | Speeter | G06F 8/71 717/121 |
| 2007/0047735 A1* | 3/2007 | Celli | H04L 9/0825 380/30 |
| 2008/0028395 A1* | 1/2008 | Motta | G06F 8/65 717/177 |
| 2009/0300596 A1* | 12/2009 | Tyhurst | G06F 8/65 717/173 |
| 2010/0087181 A1* | 4/2010 | Chen | H04L 67/34 455/418 |
| 2010/0169876 A1* | 7/2010 | Mann | G06F 8/65 717/170 |
| 2011/0154228 A1* | 6/2011 | Kinoshita | G06F 3/04883 715/763 |
| 2012/0079471 A1* | 3/2012 | Vidal | G06F 8/65 717/169 |
| 2013/0115243 A1* | 5/2013 | Conrad | A61K 39/0011 424/204.1 |
| 2013/0151996 A1* | 6/2013 | Nario | G06F 8/38 715/760 |
| 2014/0047253 A1* | 2/2014 | Kim | H04N 21/41407 713/320 |
| 2014/0123149 A1* | 5/2014 | Maple | G06F 9/44536 718/102 |
| 2014/0206332 A1 | 7/2014 | Chen et al. | |
| 2014/0215356 A1* | 7/2014 | Brander | G06F 3/14 715/753 |
| 2014/0343950 A1* | 11/2014 | Simpson | G10L 15/22 704/275 |
| 2015/0163121 A1* | 6/2015 | Mahaffey | H04W 12/12 707/687 |
| 2015/0317151 A1* | 11/2015 | Faley | H04L 67/10 717/173 |
| 2016/0034253 A1 | 2/2016 | Bang et al. | |
| 2016/0328270 A1* | 11/2016 | Bikkula | G06F 3/038 |
| 2017/0068550 A1* | 3/2017 | Zeitlin | G06F 9/4843 |
| 2017/0131990 A1* | 5/2017 | Wabe | G06F 8/65 |
| 2017/0358305 A1* | 12/2017 | Kudurshian | G06F 3/167 |
| 2018/0091391 A1* | 3/2018 | Turow | H04L 43/0817 |

* cited by examiner

FIG. 37
(a)
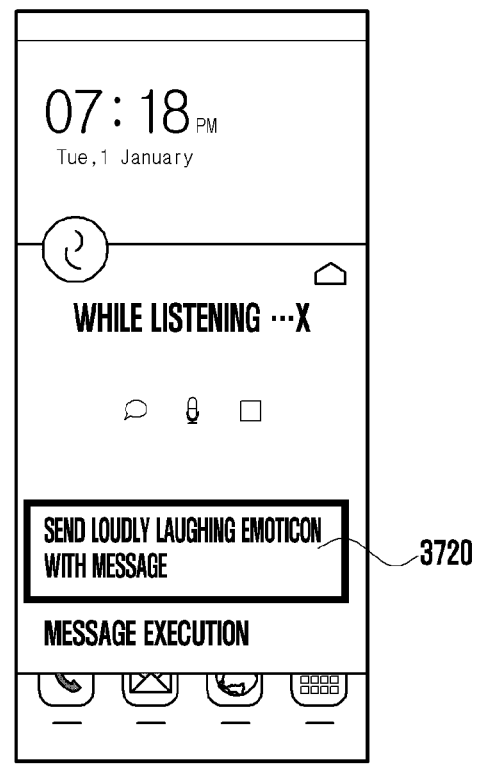
(b)

METHOD AND APPARATUS FOR MANAGING INTELLIGENT AGENT

CROSS-REFERENCE TO RELATED APPLICATIONS

This application is a 371 National Stage of International Application No. PCT/KR2018/003612, filed Mar. 27, 2018, which claims priority to Korean Patent Application No. 10-2017-0054350, filed Apr. 27, 2017, the disclosures of which are herein incorporated by reference in their entirety.

BACKGROUND

1. Field

Various embodiments of the disclosure relate to a method and an apparatus for managing an intelligent agent.

2. Description of Related Art

According to the latest trends, services for utilizing an electronic device using an intelligent agent have been popularized. The intelligent agent can serve various functions to a user itself. Further, the intelligent agent can control various applications installed in the electronic device to provide functions of the corresponding applications to the user. The intelligent agent can also control various external devices functionally connected to the electronic device to provide integrated functions to the user.

If a user input in the form of a speech or a text is received through an input interface, the intelligent agent may provide a service corresponding to a user's intent that is grasped through an analysis of the user input. The existing various intelligent agents may show the processing results of a task requested by the user through a graphic interface, such as a dialogue window. For example, the intelligent agent may recognize that a task desired by a user is "SMS message transmission" through a dialogue with the user, and it may provide an interface for controlling an SMS application to the user through a dialogue window of the intelligent agent. As another example, the intelligent agent may recognize that a user desires weather in a specific place through a dialogue with the user, and it may acquire weather information in the corresponding place from a weather application and provide the weather information to the user through the dialogue window of the intelligent agent. Here, although showing of the function of the application in the dialogue window of the intelligent agent may be unrelated to screen configuration information of the application, this is because the intelligent agent cites only the function of the corresponding application.

Further, a method and an apparatus according to various embodiments of the disclosure may provide an intelligent agent configured to control the operation of an application based on information on the application.

SUMMARY

According to various embodiments of the disclosure, an electronic device may include a housing; a touchscreen display located inside the housing and exposed through a first portion of the housing; a microphone located inside the housing and exposed through a second portion of the housing; at least one speaker located inside the housing and exposed through a third portion of the housing; a wireless communication circuitry located inside the housing; a processor located inside the housing and electrically connected to the display, the microphone, the speaker, and the communication circuitry; and a memory located inside the housing and electrically connected to the processor, wherein the memory is configured to store a plurality of application programs installed in the electronic device, and the memory, when executed, includes instructions to cause the processor to receive a user input including a request for performing a task using at least one of the application programs through at least one of the display or the microphone, to transmit data related to the user input to an external server through the communication circuitry, to transmit version information on at least one of the application programs to the external server through the communication circuit together with or after the data transmission, to receive a path rule from the external server through the communication circuitry as a response to the request, and to perform the task by allowing the electronic device to have the sequence. The path rule may include information on a sequence of states of the electronic device for performing the task, and at least one of the states may be determined by the external server based on at least a part of the version information.

According to various embodiments of the disclosure, an electronic device may include a housing; a touchscreen display located inside the housing and exposed through a first portion of the housing; a microphone located inside the housing and exposed through a second portion of the housing; at least one speaker located inside the housing and exposed through a third portion of the housing; a wireless communication circuitry located inside the housing; a processor located inside the housing and electrically connected to the display, the microphone, the speaker, and the communication circuitry; and a memory located inside the housing and electrically connected to the processor, wherein the memory, when executed, includes instructions to cause the processor to receive a user input through at least one of the display or the microphone, to transmit the user input to an external server, to receive an analysis result of the user input from the external server, to select a path rule set from a path rule set database based on at least a part of the analysis result and version information corresponding to respective applications installed in the electronic device, to select a path rule from the path rule set based on at least the part of the analysis result, and to control operations of at least one of the applications using the path rule. The path rule may include information on the operations and an order of the operations.

According to various embodiments of the disclosure, a server may include a path planner module configured to receive, from a user terminal, version information corresponding to respective applications installed in the user terminal and to acquire path rule sets respectively corresponding to the version information from a path rule set database; and a natural language understanding module configured to analyze a user input received from the user terminal, to select a path rule set among the path rule sets acquired by the path planner module based on at least a part of an analysis result, to select a path rule from the selected path rule set based on at least a part of the result, and to transmit the selected path rule to the user terminal, wherein the selected path rule controls at least one of operations of the applications installed in the user terminal.

According to various embodiments of the disclosure, a method for operating an electronic device may include receiving a user input through at least one of a touchscreen display or a microphone; acquiring version information corresponding to respective applications installed in the electronic device in response to the user input; transmitting the user input and the version information to an external server through a communication module; receiving a path rule from the external server; and controlling operations of at least one of the applications using the path rule, wherein the path rule is generated based on the user input and at least one of the version information, and the path rule includes information on the operations and an order of the operations.

The method and the apparatus according to various embodiments of the disclosure can provide an intelligent agent configured to execute an application in accordance with a user input.

Further, the method and the apparatus according to various embodiments of the disclosure can provide an intelligent agent configured to control an application based on metadata (e.g., version information) of the application.

BRIEF DESCRIPTION OF THE DRAWINGS

FIG. 37 is a diagram explaining a graphic interface for showing an operation in which an electronic device provides a hint to a user based on version information of an application according to various embodiments of the disclosure.

DETAILED DESCRIPTION

Figure 1:
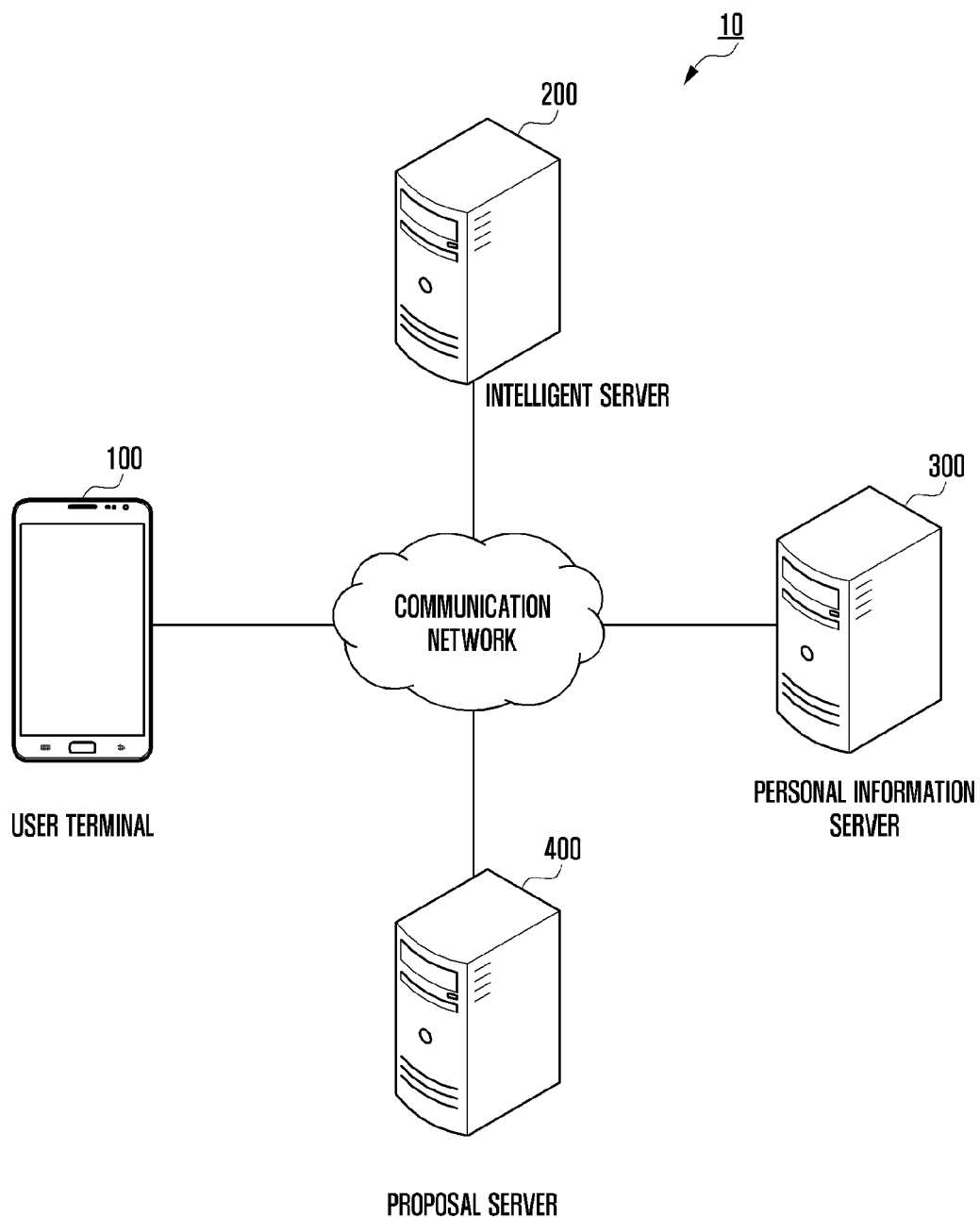
FIG. 1 is a diagram illustrating an integrated intelligence system according various embodiments of the disclosure.

Hereinafter, various embodiments of the disclosure are described with reference to the accompanying drawings. The embodiments and items used therein are not intended to be limited to a specific implementation form of a technology described in the disclosure, and it should be understood that the disclosure includes various changes, equivalents, and/or substitutes of the corresponding embodiments. In connection with the description of the drawings, similar components are designated by similar reference numerals. A singular expression may include a plural expression unless clearly differently meant on the context. In the disclosure, the expression "A or B" or "at least one of A and/or B" may include A, may include all possible combinations of the items enumerated together. The expressions "1", "2", "first", and "second" may modify the corresponding components regardless of their sequence and/or importance. The expressions may be used for distinguishing one component from other components, but they do not limit the corresponding components. When it is stated that a certain (e.g., first) component is "(functionally or communicatively) coupled to" or "connected to" another component, the component may be directly connected or coupled to another (e.g., second) component, the certain component may be directly connected to the other component, or it may be connected to the other component through another component (e.g., third component).

In the disclosure, the expression "configured (or set) to do" may be used to be interchangeable with, for example, "suitable for doing," "having the capability to do," "changed to do," "made to do," "capable of doing," or "designed to do" by hardware or software. In a certain situation, the expression "a device configured to do" may mean that the device is "capable of doing" something with other devices or parts. For example, the expression "processor configured (or set) to do A, B, and C" may mean a dedicated processor (e.g., embedded processor) for performing the corresponding operation or a generic-purpose processor (e.g., CPU or application processor (AP)) that can perform the corresponding operations by executing one or more software programs stored in a memory device.

An electronic device according to various embodiments of the disclosure may include, for example, at least one of a smart phone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, or a wearable device. The wearable device may include at least one of an accessary type device (e.g., a watch, a ring, a bracelet, an anklet, a necklace, glasses, contact lenses, or a head-mounted device (HMD)), a fabric or clothing integrated type device (e.g., e-clothes), a body attachable type device (e.g., skin pad or tattoo), or a bio-transplantation type circuit. In certain embodiments, the electronic device may include, for example, at least one of a television receiver, a digital video disk (DVD) player, an audio, a refrigerator, an air conditioner, a vacuum cleaner, an oven, a microwave oven, a washing machine, an air purifier, a set-top box, a home automation control panel, a security control panel, a media box (e.g., Samsung HomeSync™, Apple TV™, or Google TV™), a game console (e.g., Xbox™, or PlayStation™), an electronic dictionary, an electronic key, a camcorder, or an electronic picture frame.

As another embodiment, the electronic device may include at least one of various kinds of medical devices (e.g., various kinds of portable medical measurement devices (a blood glucometer, a heart rate monitor, a blood pressure monitor, or a thermometer), a magnetic resonance angiography (MRA), a magnetic resonance imaging (MRI), a computed tomography (CT), a camera, or an ultrasonic device), a navigation device, a global navigation satellite system (GNSS), an event data recorder (EDR), a flight data recorder (FDR), a vehicle infotainment device, electronic equipment for a ship (for example, a navigation device for a ship or a gyro compass), avionics, a security device, a head unit for a vehicle, an industrial or home robot, a drone, an ATM of financial institutions, a point of sales (POS) of shops, or the Internet of things (e.g., a lamp, various kinds of sensors, a sprinkler, a fire alarm, a temperature adjuster, a street lamp, a toaster, athletic equipment, a hot water tank, a heater, or a boiler). According to a certain embodiment, the electronic device may include at least one of a furniture, a part of a building/structure or a vehicle, an electronic board, an electronic signature receiving device, a projector, or various kinds of measuring devices (for example, a water meter, an electricity meter, a gas meter, or a radio wave meter). According to various embodiments, the electronic device may be flexible, or it may be a combination of two or more of the various devices as described above. In an embodiment of the disclosure, the electronic device is not limited to the above-described devices. In the disclosure, the term "user" may be a person who uses the electronic device, or it may be a device (e.g., artificial intelligent electronic device) using the electronic device.

Prior to description of an embodiment of the disclosure, an integrated intelligence system to which an embodiment of the disclosure may be applied will be described.

FIG. 1 is a diagram illustrating an integrated intelligence system according various embodiments of the disclosure.

With reference to FIG. 1, an integrated intelligent system 10 may include a user terminal 100, an intelligent server 200, a personal information server 300, or a proposal server 400.

The user terminal 100 may provide a necessary service to a user through an app (or an application program) (e.g., alarm app, message app, or photo (gallery) app) stored in the user terminal 100. For example, the user terminal 100 may execute and operate another app through an intelligent app (or speech recognition app) stored in the user terminal 100. Through the intelligent app of the user terminal 100, a user input for executing and operating another app may be received. The user input may be received, for example, through a physical button, touchpad, speech input, or remote input. According to an embodiment, the user terminal 100 may correspond to various kinds of terminal devices (or electronic device) connectable to the Internet, such as a portable phone, a smart phone, a personal digital assistant (PDA), or a notebook computer.

According to an embodiment, the user terminal 100 may receive a user's speech as the user input. The user terminal 100 may receive the user's speech, and it may generate a command for operating an app based on the user's speech. Accordingly, the user terminal 100 can operate the app using the command.

The intelligent server 200 may receive a user's speech input from the user terminal through a communication network, and it may change the user's speech to text data. In another embodiment, the intelligent server 200 may generate (or select) a path rule based on the text data. The path rule may include information on an action (or operation) for performing the function of the app or information on a parameter necessary to execute the operation. Further, the path rule may include the order of the operations of the app. The user terminal 100 may receive the path rule, and it may select the app in accordance with the path rule, and the selected app may execute the operation included in the path rule.

For example, the user terminal 100 may execute the operation, and it may display a screen corresponding to the state of the user terminal 100 having executed the operation on a display. As another example, the user terminal 100 may execute the operation, and it may not display the result of performing the operation on the display. For example, the user terminal 100 may execute a plurality of operations, and it may display only the partial result of the plurality of operations on the display. For example, the user terminal 100 may display only the result of executing the operation in the last order on the display. As another example, the user terminal 100 may receive the user's input, and it may display the result of executing the operation on the display.

The personal information server 300 may include a database in which user information is stored. For example, the personal information server 300 may receive the user information (e.g., context information, or app execution information) from the user terminal 100, and it may store the received user information in the database. The intelligent server 200 may use the user information received from the personal information server 300 in the case of generating the path rule for the user input. According to an embodiment, the user terminal 100 may receive the user information from the personal information server 300 through the communication network, and it may use the received user information as information for managing the database.

The proposal server 400 may include a database in which introduction of functions or applications in the terminal or information on the functions to be provided are stored. For example, the proposal server 400 may include a database for functions for enabling a user to receive and use the user information of the user terminal 100 from the personal information server 300. The user terminal 100 may receive information on the functions to be provided from the proposal server 400 through the communication network, and it may provide the information to the user.

Figure 2:
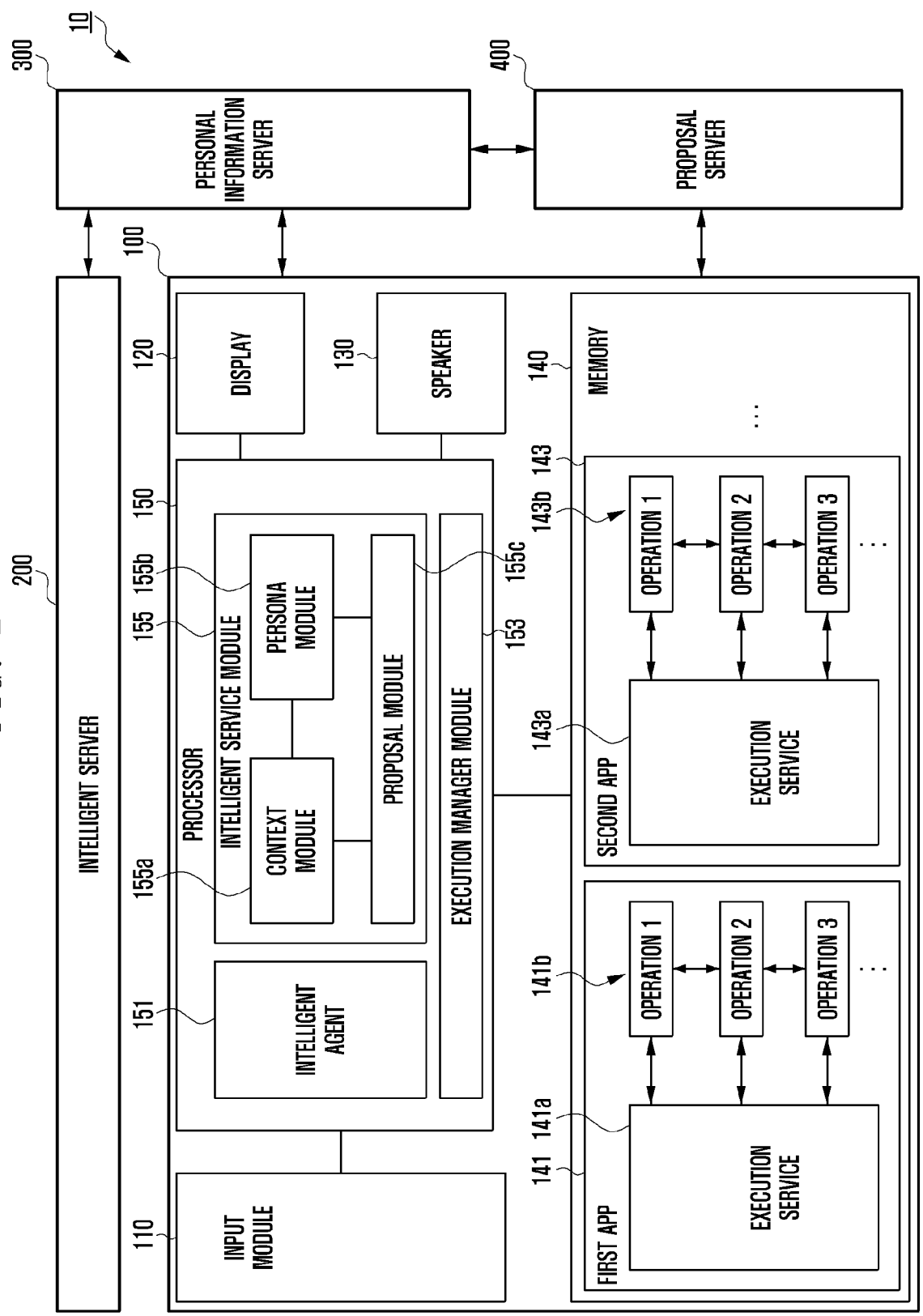
FIG. 2 is a block diagram illustrating a user terminal of an integrated intelligence system according to an embodiment of the disclosure.

FIG. 2 is a block diagram illustrating a user terminal of an integrated intelligence system according to an embodiment of the disclosure.

With reference to FIG. 2, a user terminal may include an input module 110, a display 120, a speaker 130, a memory 140, or a processor 150. The user terminal may further include a housing, and constituent elements of the user terminal 100 may be seated inside the housing or it may be located on the housing.

According to an embodiment, the input module 110 may receive the user input from the user. For example, the input module 110 may receive the user input from an external device (e.g., keyboard or head set) connected thereto. As another example, the input module 110 may include a touch screen (e.g., touch screen display) coupled to the display 120. As still another example, the input module 110 may include a hardware key (or physical key) 112 (in FIG. 3) located on the user terminal (or housing of the user terminal) 100.

According to an embodiment, the input module 110 may include a microphone 111 (in FIG. 2) capable of receiving the user's speech as a speech signal. For example, the input module 110 may include a speech input system, and it may receive the user's speech as the speech signal through the speech input system.

According to an embodiment, the display 120 may display an execution screen of an image, a video, and/or an application. For example, the display 120 may display a graphic user interface (GUI) of the app.

According to an embodiment, the speaker 1320 may output the speech signal. For example, the speaker 130 may output the speech signal generated inside the user terminal 100 to outside.

According to an embodiment, the memory 140 may store a plurality of apps 141 and 143. The plurality of apps 141 and 143 stored in the memory 140 may be selected, executed, and operated in accordance with the user input.

According to an embodiment, the memory 140 may include a database for storing information necessary to recognize the user input. For example, the memory 140 may include a log database for storing log information. As another example, the memory 140 may include a persona database for storing the user information.

According to an embodiment, the memory 140 may store therein the plurality of apps 141 and 143, and the plurality of apps 141 and 143 may be loaded into a volatile memory to operate. For example, the plurality of apps 141 and 143 stored in the memory 140 may be loaded into the volatile memory to operate through an execution manager module 153. The plurality of apps 141 and 143 may include execution services 141a and 143a for performing services or a plurality of operations (or unit operations) 141b and 143b. The execution services 141a and 143a may be generated by the execution manager module 153 of the processor 150, and they may perform the plurality of operations 141a and 143b.

According to an embodiment, when the operations 141a and 143b of the apps 141 and 143 are executed, an execution state screen in accordance with the execution of the operations 141b and 143b may be displayed on the display 120. The execution state screen may be, for example, a screen in a state where the operations 141b and 143b are completed. As another example, the execution state screen may be a screen in a state where the execution of the operations 141b and 143b is stopped (partial landing) (e.g., parameters necessary for the operations 141b and 143b are not inputted).

According to an embodiment, the execution services 141a and 143a may execute the operations 141b and 143b in accordance with the path rule. For example, the execution services 141a and 143a may be activated by the execution manager module 153, and they may receive an execution request in accordance with the path rule, and execute the operations 141b and 143b of the apps 141 and 143 in accordance with the execution request. If the execution of the operations 141b and 143b is completed, the execution services 141a and 143a may transmit completion information to the execution manager module 153.

According to an embodiment, if the plurality of operations 141b and 143b are executed by the apps 141 and 143, the plurality of operations 141b and 143b may be successively executed. If execution of one operation (operation 1) is completed, the execution services 141a and 143a may open the next operation (operation 2), and they may transmit the completion information of the operation 1 to the execution manager module 153. Here, opening of a certain operation may be understood shifting of the certain operation to an executable state or preparing of execution of the certain operation. In other words, if the certain operation is not opened, the corresponding operation is unable to be executed. If the completion information is received, the execution manager module 153 may transmit an execution request for the next operation (e.g., operation 2) to the execution services 141a and 143a. According to an embodiment, if the plurality of apps 141 and 143 are executed, the plurality of apps 141 and 143 may be successively executed. For example, if execution of the last operation of the first app 141 is completed and the completion information is received from the execution service 141a, the execution manager module 153 may transmit an execution request for the first operation of the second app 143 to the execution service 143a.

According to an embodiment, if the plurality of operations 141b and 143b are executed by the apps 141 and 143, the resultant screen in accordance with the execution of the plurality of operations 141b and 143b may be displayed on the display 120. According to an embodiment, only parts of a plurality of resultant screens in accordance with the execution of the plurality of operations 141b and 143b may be displayed on the display 120.

According to an embodiment, the memory 140 may store therein an intelligent app (e.g., speech recognition app) interlocking with an intelligent agent 151. The app interlocking with the intelligent agent 151 may receive and process the user's speech as a speech signal. According to an embodiment, the app interlocking with the intelligent agent 151 may be operated by a specific input (e.g., input through a hardware key, input through a touch screen, or specific speech input) through the input module 110.

According to an embodiment, the processor 150 may control the overall operation of the user terminal 100. For example, the processor 150 may control the input module 110 to receive the user input. The processor 150 may control the display 120 to display an image. The processor 150 may control the speaker 130 to output a speech signal. The processor 150 may control the memory 140 to read out or store necessary information.

According to an embodiment, the processor 150 may include the intelligent agent 151, the execution manager module 153, or an intelligent service module 155. In an embodiment, the processor 150 may execute instructions stored in the memory 140 to drive the intelligent agent 151, the execution manager module 153, or the intelligent service module 155. Several modules mentioned in various embodiments of the disclosure may be implemented by hardware or software. In various embodiments of the disclosure, the operations performed by the intelligent agent 151, the execution manager module 153, or the intelligent service module 155 may be understood as operations performed by the processor 150.

According to an embodiment, the intelligent agent 151 may generate a command for operating the app based on the speech signal received through the user input. According to an embodiment, the execution manager module 153 may receive the generated command from the intelligent agent 151, and it may select, execute, and operate the apps 141 and 143 stored in the memory 140. According to an embodiment, the intelligent service module 155 may be used to manage the user information and to process the user input.

The intelligent agent 151 may transmit the user input received through the input module 110 to the intelligent server 200 to process the user input.

According to an embodiment, before transmitting the user input to the intelligent server 200, the intelligent agent 151 may preprocess the user input. According to an embodiment, in order to preprocess the user input, the intelligent agent 151 may include an adaptive echo canceller (AEC) module, a noise suppression (NS) module, an end-point detection (EPD) module, or an automatic gate control (AGC) module. The adaptive echo canceller module can cancel an echo included in the user input. The noise suppression module can suppress a background noise included in the user input. The end-point detection module can find a portion in which user's speech exists through detection of the end-point of the user's speech included in the user input. The automatic gain control module can adjust the volume of the user input so as to be suitable to recognize and process the user input. According to an embodiment, the intelligent agent 151 may include the whole preprocessing configuration for its performance, whereas according to another embodiment, the intelligent agent 151 may include a part of the preprocessing configuration to operate with low power.

According to an embodiment, the intelligent agent 151 may include a wakeup recognition module recognizing a user's call. The wakeup recognition module can recognize a user's wakeup command through a speech recognition module, and it may activate the intelligent agent 151 to receive the user input in the case of recognizing the wakeup command. According to an embodiment, the wakeup recognition module of the intelligent agent 151 may be implemented by a low-power processor (e.g., processor included in an audio codec). According to an embodiment, the intelligent agent 151 may be activated in accordance with the user input through a hardware key. If the intelligent agent 151 is activated, an intelligent app (e.g., speech recognition app) interlocking with the intelligent agent 151 may be executed.

According to an embodiment, the intelligent agent 151 may include the speech recognition module for recognizing the user input. The speech recognition module can recognize the user input for enabling the app to execute the operation. For example, the speech recognition module can recognize a limited user (speech) input (e.g., speech such as "click" to execute a photographing operation when a camera app is being executed) for the apps 141 and 143 to execute the operation such as the wakeup command. The speech recognition module recognizing the user input in supplement to the intelligent server 200 can recognize the user command capable of being processed within the user terminal 100 to quickly process the user command. According to an embodiment, the speech recognition module for the intelligent agent 151 to recognize the user input may be implemented by an app processor.

According to an embodiment, the speech recognition module of the intelligent agent 151 (including the speech recognition module of the wakeup recognition module) may recognize the user input using an algorithm for recognizing the speech. The algorithm used to recognize the speech may be, for example, at least one of a hidden markov model (HMM) algorithm, an artificial neural network (ANN) algorithm, or a dynamic time warping (DTW) algorithm.

According to an embodiment, the intelligent agent 151 may convert the user's speech input into text data. According to an embodiment, the intelligent agent 151 may receive the converted text data through transfer of the user's speech to the intelligent server 200. Accordingly, the intelligent agent 151 may display the text data on the display 120.

According to an embodiment, the intelligent agent 151 may receive a path rule from the intelligent server 200. According to an embodiment, the intelligent agent 151 may transmit the path rule to the execution manager module 153.

According to an embodiment, the intelligent agent 151 may transmit an execution result log in accordance with the path rule received from the intelligent server 200 to an intelligent service module 155, and the transmitted execution result log may be accumulatively managed as user preference information of a persona module (persona manager) 155*b*.

According to an embodiment, the execution manager module 153 may execute the apps 141 and 143 through reception of the path rule from the intelligent agent 151, and it may execute the operations 141*b* and 143*b* included in the path rule. For example, the execution manager module 153 may transmit command information for executing the operations 141*b* and 143*b* to the apps 141 and 143, and it may receive completion information of the operations 141*b* and 143*b* from the apps 141 and 143.

According to an embodiment, the execution manager module 153 may transmit and receive the command information for executing the operations 141*b* and 143*b* of the apps 141 and 143 between the intelligent agent 151 and the apps 141 and 143. The manager module 153 may bind the apps 141 and 143 to be executed in accordance with the path rule, and it may transmit the command information of the operations 141*b* and 143*b* included in the path rule to the apps 141 and 143. For example, the execution manager module 153 may successively execute the operations 141*b* and 143*b* of the apps 141 and 143 in accordance with the path rule through successive transmission of the operations 141*b* and 143*b* included in the path rule to the apps 141 and 143.

According to an embodiment, the execution manager module 153 may manage the execution state of the operations 141*b* and 143*b* of the apps 141 and 143. For example, the execution manager module 153 may receive information on the execution state of the operations 141*b* and 143*b* from the apps 141 and 143. If the execution of the operations 141*b* and 143*b* is, for example, in a partial landing state (e.g., parameters necessary for the operations 141*b* and 143*b* are not inputted), the execution manager module 153 may transmit information on the partial landing state to the intelligent agent 151. The intelligent agent 151 may request a user to input necessary information (e.g., parameter information) using the received information. As another example, if the execution of the operations 141*b* and 143*b* is in an operation state, the intelligent agent 151 can receive the user's speech, and the execution manager module 153 can transmit information on the apps 141 and 143 being executed and the execution state of the apps 141 and 143 to the intelligent agent 151. The intelligent agent 151 may receive parameter information of the user's speech through the intelligent server 200, and it may transmit the received parameter information to the execution manager module 153. The execution manager module 153 may change the parameter of the operations 141*b* and 143*b* to a new parameter using the received parameter information.

According to an embodiment, the execution manager module 153 may transfer the parameter information included in the path rule to the apps 141 and 143. If the plurality of apps 141 and 143 are successively executed in accordance with the path rule, the execution manager module 153 may transfer the parameter information included in the path rule from one app to the other app.

According to an embodiment, the execution manager module 153 may receive a plurality of path rules selected based on the user's speech. For example, if the user's speech specifies the partial app 141 to execute the partial operation 141*b*, but it does not specify the other app 143 to execute the remaining operation 143*b*, the execution manager module 153 may receive the plurality of different path rules whereby the same apps (e.g., gallery apps) 141 to execute the partial operation 141*b* are executed and the different apps (e.g., message app and telegram app) 143 capable of executing the remaining operation 143*b* are executed, respectively. The execution manager module 153 may execute, for example, the same operations 141*b* and 143*b* of the plurality of path rules (e.g., the same successive operations 141*b* and 143*b*). If up to the same operations are executed, the execution manager module 153 may display, on the display 120, a state screen for selecting the different apps 141 and 143 included in the plurality of path rules.

According to an embodiment, the intelligent service module 155 may include a context module 155*a*, a persona module 155*b*, or a proposal module 155*c*.

The context module 155*a* may collect the current state of the apps 141 and 143 from the apps 141 and 143. For example, the context module 155*a* may collect the current state of the apps 141 and 143 through reception of the context information indicating the current state of the apps 141 and 143.

The persona module 155*b* may manage personal information of the user who uses the user terminal 100. For example, the persona module 155*b* may manage the personal information of the user through collection of usage information of the user terminal 100 and the performing result.

The proposal module 155*c* may recommend a command to the user through prediction of the user's intent. For example, the proposal module 155*c* may recommend the command to the user in consideration of the current state of the user (e.g., time, place, situation, or app).

Figure 3:
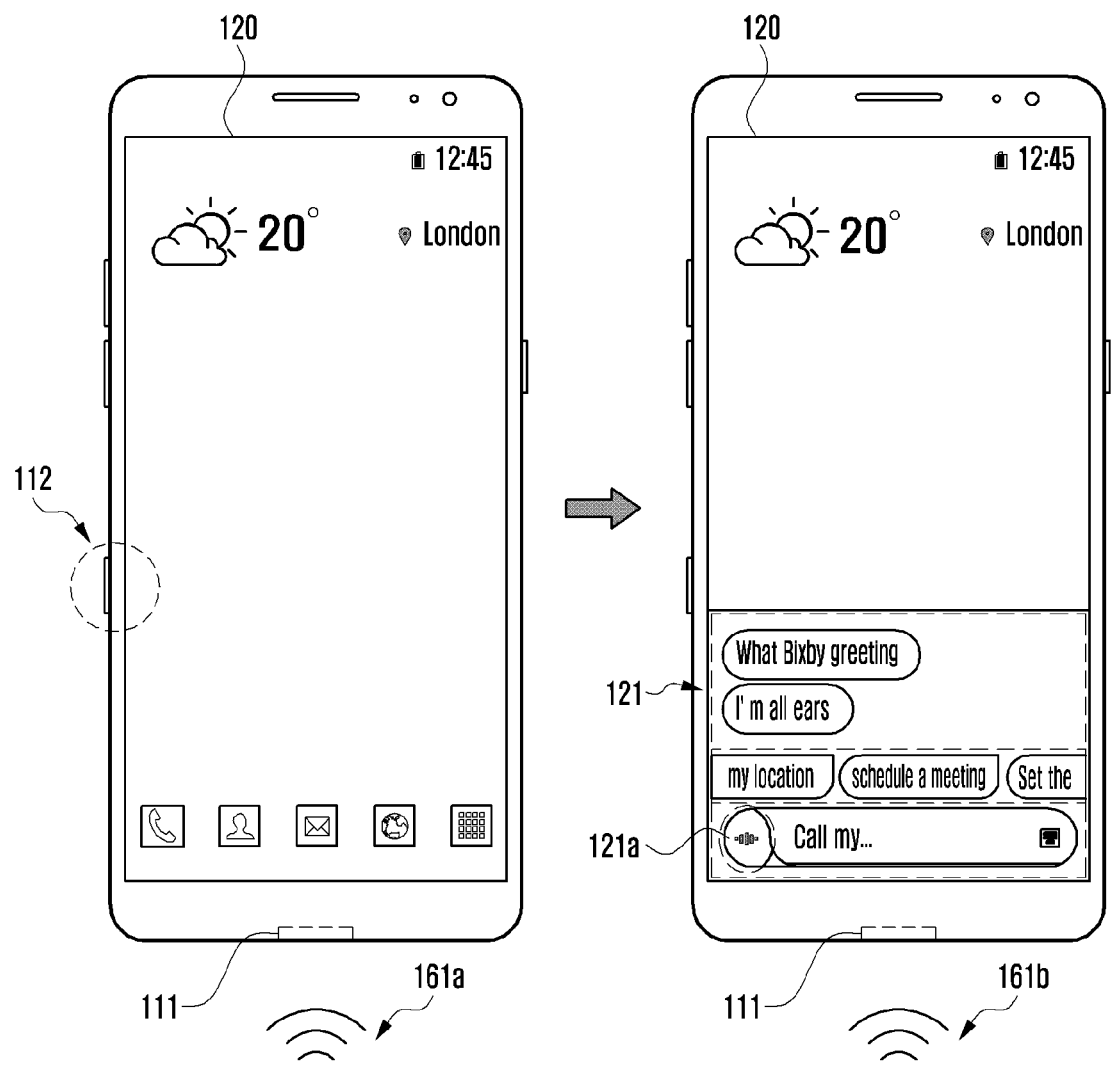
FIG. 3 is a diagram explaining execution of an intelligent app of a user terminal according to an embodiment of the disclosure.

FIG. 3 is a diagram explaining execution of an intelligent app of a user terminal according to an embodiment of the disclosure.

With reference to FIG. 3, the user terminal 100 receives the user input, and it executes the intelligent app (e.g., speech recognition app) interlocking with the intelligent agent 151.

According to an embodiment, the user terminal 100 may execute the intelligent app for recognizing a speech through a hardware key 112. For example, if the user input is received through the hardware key 112, the user terminal 100 may display a user interface (UI) 121 of the intelligent app on the display 120. For example, the user may touch a speech recognition button 121*a* on the UE 121 of the intelligent app for the speech input 161*b* in a state where the UI 121 of the intelligent app is displayed on the display 120. As another example, the user may perform the speech input 161*b* by continuously pressing the hardware key 112 for the speech input 161*b*.

According to an embodiment, the user terminal 100 may execute the intelligent app for recognizing the speech through the microphone 111. For example, if a designated speech (e.g., Wake up!) is input through the microphone 111 (161*a*), the user terminal 100 may display the UI 121 of the intelligent app on the display 120.

Figure 4:
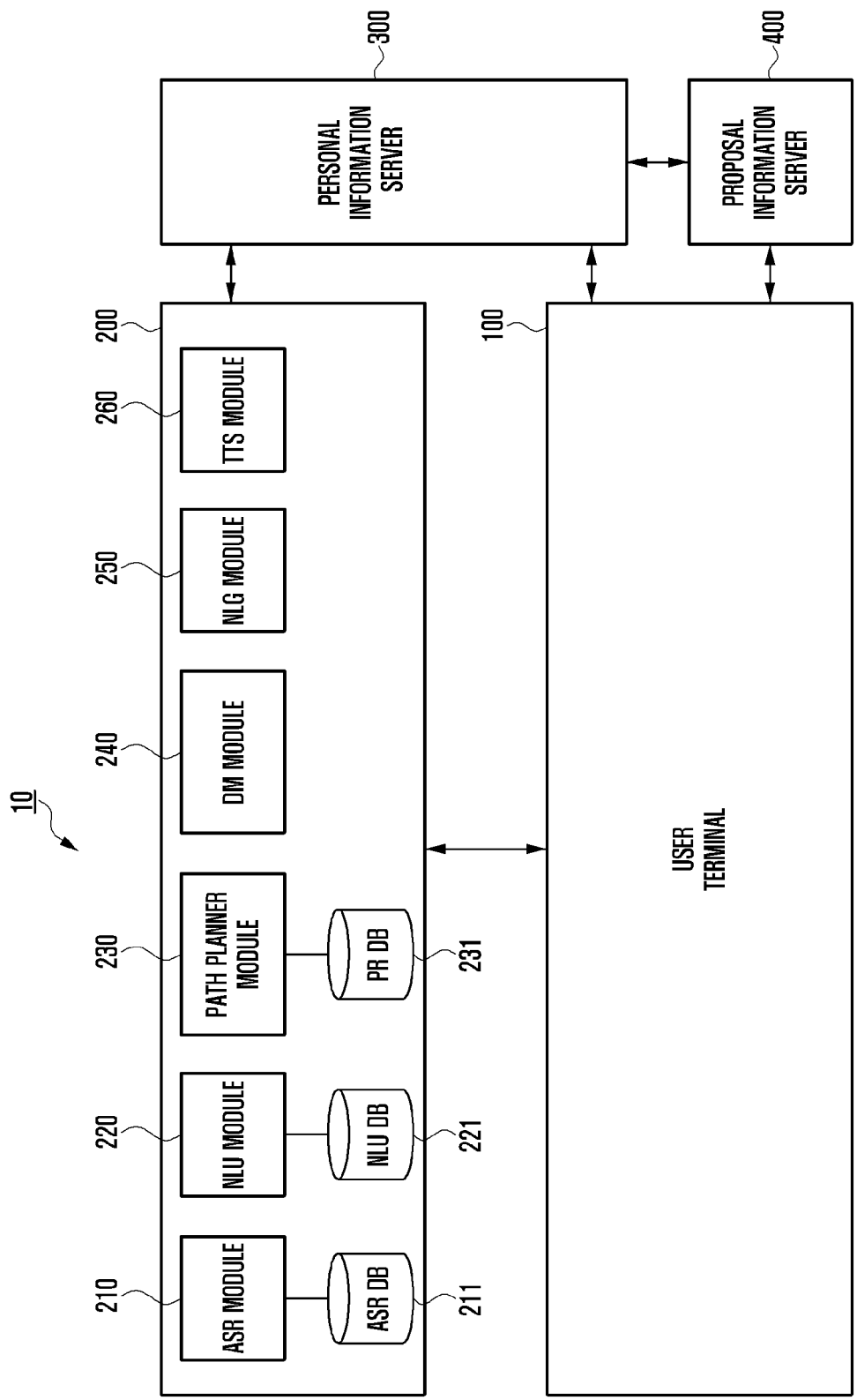
FIG. 4 is a block diagram of an intelligent server of an integrated intelligence system according to an embodiment of the disclosure.

FIG. 4 is a block diagram of an intelligent server of an integrated intelligence system according to an embodiment of the disclosure.

With reference to FIG. 4, the intelligent server 200 may include an automatic speech recognition (ASR) module 210, a natural language understanding (NLU) module 220, a path planner module 230, a dialogue manager (DM) module 240, a natural language generator (NLC) module 250, or a text-to-speech (TTS) conversion module 260.

In the intelligent server 200, the natural language understanding module 220 or the path planner module 230 may generate a path rule.

According to an embodiment, the automatic speech recognition (ASR) module 210 may convert the user input received from the user terminal 100 into text data.

According to an embodiment, the automatic speech recognition module 210 may convert the user input received from the user terminal 100 into the text data. For example, the automatic speech recognition module 210 may include a speech recognition module. The speech recognition module may include an acoustic model and a language model. For example, the acoustic model may include information related to an utterance, and the language model may include information on unit phoneme information and a combination of unit phoneme information. The speech recognition module may convert the user's speech into the text data using the information related to the utterance and unit phoneme information. The information on the acoustic model and the language model may be stored in, for example, an automatic speech recognition database (ASR DB) 211.

According to an embodiment, the natural language understanding module 220 may grasp the user's intent by performing syntactic analysis or semantic analysis. The syntactic analysis may divide the user input into syntactic units (e.g., word, phrase, and morpheme), and it may grasp what syntactic element the divided unit has. The semantic analysis may be performed using semantic matching rule matching, or formula matching. Accordingly, the natural language understanding module 220 may obtain a domain, an intent, or a parameter (or slot) that is necessary to express the intent from the user input.

According to an embodiment, the natural language understanding module 220 may determine the user's intent and the parameter using the matching rule being divided into the domain, intent, and parameter (or slot) necessary to grasp the intent. For example, one domain (e.g., alarm) may include a plurality of intents (e.g., alarm setting and alarm release), and one intent may include a plurality of parameters (e.g., time, the number of repetitions, and alarm sound). The matching rule may be stored in the natural language understanding database (NLU DB) 221.

According to an embodiment, the natural language understanding module 220 may grasp the meaning of a word extracted from the user input using linguistic features (e.g., syntactic elements), such as the morpheme and the phrase, and it may determine the user's intent by matching the meaning of the grasped word to the domain and the intent. For example, the natural language understanding module 220 may determine the user's intent through calculation of how many words extracted from the user input are included in the domain and the intent. According to an embodiment, the natural language understanding module 220 may determine the parameters of the user input using the words that are the basis to grasp the intent. According to an embodiment, the natural language understanding module 220 may determine the user's intent using the natural language understanding database 221 in which the linguistic features for grasping the intent of the user input are stored. According to another embodiment, the natural language understanding module 220 may determine the user's intent using a personal language model (PLM). For example, the natural language understanding module 220 may determine the user's intent using personal information (e.g., contact address list or music list). The personal language model may be stored, for example, in the natural language understanding database 221. According to an embodiment, not only the natural language understanding module 220 but also the automatic speech recognition module 210 can recognize the user's speech with reference to the personal language model stored in the natural language understanding database 221.

According to an embodiment, the natural language understanding module 220 may generate the path rule based on the intent of the user input and the parameter. For example, the natural language understanding module 220 may select the app to be executed based on the intent of the user input, and it may determine the operation to be performed by the selected app. The natural language understanding module 220 may generate the path rule through determination of the parameter corresponding to the determined operation. According to an embodiment, the path rule generated by the natural language understanding module 220 may include information on the app to be executed, the operation to be executed by the app, and the parameter necessary to execute the operation.

According to an embodiment, the natural language understanding module 220 may generate one path rule or a plurality of path rules based on the intent of the user input and the parameter. For example, the natural language understanding module 220 may receive a path rule set corresponding to the user terminal 100 from the path planner module 230, and it may determine a path rule through mapping of the intent of the user input and the parameter onto the received path rule set.

According to another embodiment, the natural language understanding module 220 may generate one path rule or a plurality of path rules through determination of the app to be executed, the operation to be executed by the app, and the parameter necessary to execute the operation based on the intent of the user input and the parameter. For example, the natural language understanding module 220 may generate the path rule through arrangement of the app to be executed and the operation to be executed by the app in the form of an ontology or a graph model in accordance with the intent of the user input using the information of the user terminal 100. The generated path rule may be stored in, for example, a path rule database (PR DB) 231 through the path planner module 230. The generated path rule may be added to the path rule set of the database 231.

According to an embodiment, the natural language understanding module 220 may select at least one of the plurality of generated path rules. For example, the natural language understanding module 220 may select an optimum path rule among the plurality of path rules. As another example, if only a partial operation is specified based on the user's speech, the natural language understanding module 220 may select the plurality of path rules. The natural language understanding module 220 may determine one of the plurality of path rules by an additional input of the user.

According to an embodiment, the natural language understanding module 220 may transmit the path rule to the user terminal 100 as a request for the user input. For example, the natural language understanding module 220 may transmit one path rule corresponding to the user input to the user terminal 100. As another example, the natural language understanding module 220 may transmit the plurality of path rules corresponding to the user input to the user terminal 100. If only a partial operation is specified based on the user's speech, the plurality of path rules may be generated by the natural language understanding module 220.

According to an embodiment, the path planner module 230 may select at least one of the plurality of path rules.

According to an embodiment, the path planner module 230 may transfer the path rule set including the plurality of path rules to the natural language understanding module 220. The plurality of path rules of the path rule set may be stored in the form of a table in the path rule database 231 connected to the path planner module 230. For example, the path planner module 230 may transfer the path rule set corresponding to the information (e.g., OS information or app information) of the user terminal 100 received from the intelligent agent 151 to the natural language understanding module 220. A table stored in the path rule database 231 may be stored, for example, for each domain or domain version.

According to an embodiment, the path planner module 230 may select one path rule or a plurality of path rules from the path rule set, and it may transfer the selected path rules to the natural language understanding module 220. For example, the path planner module 230 may select one path rule or a plurality of path rules through matching of the user's intent and the parameter to the path rule set corresponding to the user terminal 100, and it may transfer the selected path rule to the natural language understanding module 220.

According to an embodiment, the path planner module 230 may generate one path rule or a plurality of path rules using the user's intent and the parameter. For example, the path planner module 230 may generate one path rule or a plurality of path rules through determination of the app to be executed and the operation to be executed by the app based on the user's intent and the parameter. According to an embodiment, the path planner module 230 may store the generated path rules in the path rule database 231.

According to an embodiment, the path planner module 230 may store the path rules generated by the natural language understanding module 220 in the path rule database 231. The generated path rule may be added to the path rule set stored in the path rule database 231.

The plurality of path rules or the plurality of path rule sets may reflect the kind, version, type, or characteristic of a device performing the path rule.

The dialogue manager module 240 may determine whether the parameter grasped by the natural language understanding module 220 is sufficient to perform the task. According to an embodiment, if the user's intent is not clear, the dialogue manager module 240 may perform a feedback to request necessary information from the user. For example, the dialogue manager module 240 may perform the feedback to request information on the parameter for grasping the user's intent.

According to an embodiment, the dialogue manager module 240 may include a content provider module. If the operation is performed based on the intent grasped by the natural language understanding module 220 and the parameter, the content provider module may generate the result of performing the task corresponding to the user input. According to an embodiment, the dialogue manager module 240 may transmit the result generated by the content provider module to the user terminal 100 in response to the user input.

According to an embodiment, the natural language generator module (NLG) 250 may change designated information to a text form. The information changed to the text form may be in the form of a natural language speech. The designated information may be, for example, information on an additional input, information guiding completion of the operation corresponding to the user input, or information guiding user's additional input (e.g., feedback information against the user input). The information changed to the text form may be transmitted to the user terminal 100 to be displayed on the display 120, or it may be transmitted to the text-to-speech conversion module 260 to be changed to a speech form.

According to an embodiment, the text-to-speech conversion module 260 may change the information in the text form to information in the speech form. The text-to-speech conversion module 260 may receive the information in the text form from the natural language generator module 250, and it may change the information in the text form to the information in the speech form to be transmitted to the user terminal 100. The user terminal 100 may output the information in the speech form to the speaker 130.

According to an embodiment, the natural language understanding module 220, the path planner module 230, and the dialogue manager module 240 may be implemented by one module. For example, the natural language understanding module 220, the path planner module 230, and the dialogue manager module 240 may be implemented by one module to determine the user's intent and the parameter and to generate a response (e.g., path rule) corresponding to the determined user's intent and parameter. Accordingly, the generated response may be transmitted to the user terminal 100.

Figure 5:
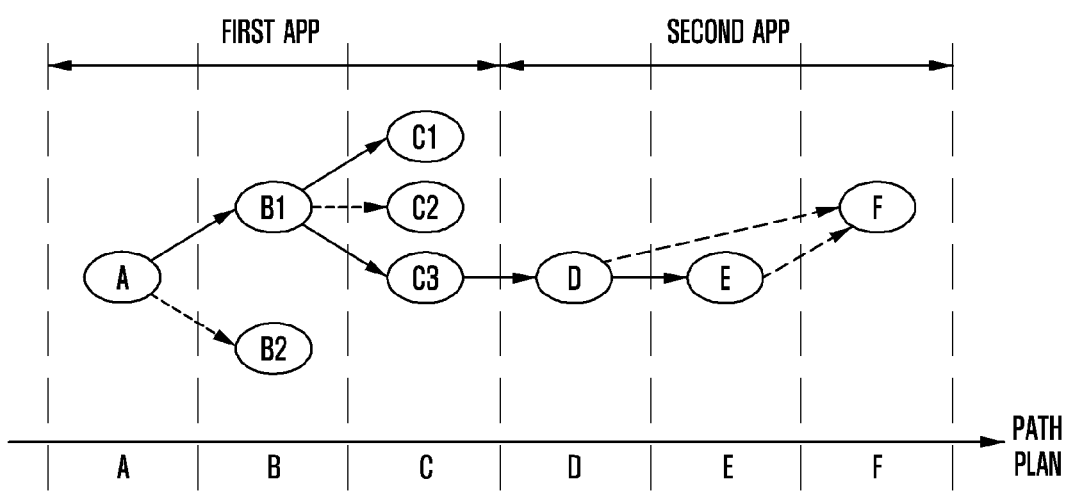
FIG. 5 is a diagram explaining a method in which a path planner module generates a path rule according to an embodiment of the disclosure.

FIG. 5 is a diagram explaining a method in which a path planner module generates a path rule according to an embodiment of the disclosure;

With reference to FIG. 5, the natural language understanding module 220 according to an embodiment may divide a function of an app into unit operations A to F to store the unit operations in the path rule database 231. For example, the natural language understanding module 220 may store the path rule set including a plurality of path rules A-B1-C1, A-B1-C2, A-B1-C3-D-F, and A-B1-C3-D-E-F divided into the unit operations in the path rule database 231.

According to an embodiment, the path rule database 231 of the path planner module 230 may store the path rule set for performing the function of the app. The path rule set may include a plurality of path rules including a plurality of operations. The operations of the plurality of path rules, being executed in accordance with parameters input to the respective operations, may be successively arranged. According to an embodiment, the plurality of path rules may be configured in the form of an ontology or a graph model to be stored in the path rule database 231.

According to an embodiment, the natural language understanding module 220 may select the optimum path rule A-B1-C3-D-E-F among the plurality of path rules A-B1-C1, A-B1-C2, A-B1-C3-D-F, and A-B1-C3-D-E-F corresponding to the intent of the user input and the parameter.

According to an embodiment, if there is no path rule that completely matches to the user input, the natural language understanding module 220 may transfer the plurality of rules to the user terminal 100. For example, the natural language understanding module 220 may select the path rule (e.g., A-B1) partially corresponding to the user input. The natural language understanding module 220 may select one or more path rules A-B1-C1, A-B1-C2, A-B1-C3-D-F, and A-B1-C3-D-E-F including the path rule (e.g., A-B1) partially corresponding to the user input to be transferred to the user terminal 100.

According to an embodiment, the natural language understanding module 220 may select one of the plurality of path rules based on the additional input of the user terminal 100, and it may transfer the one selected path rule to the user terminal 100. For example, the natural language understanding module 220 may select one path rule (e.g., A-B1-C3-D-F) among the plurality of path rules A-B1-C1, A-B1-C2, A-B1-C3-D-F, and A-B1-C3-D-E-F in accordance with the user input (e.g., input for selecting C3) additionally input to the user terminal 100, and it may transmit the selected path rule to the user terminal 100.

According to still another embodiment, the natural language understanding module 220 may determine the user's intent and the parameter corresponding to the user input (e.g., input for selecting C3) additionally input to the user terminal 100 through the natural language understanding module 220, and it may transmit the determined user's intent or parameter to the user terminal 100. The user terminal 100 may select one path rule (e.g., A-B1-C3-D-F) among the plurality of path rules A-B1-C1, A-B1-C2, A-B1-C3-D-F, and A-B1-C3-D-E-F based on the transmitted intent or the parameter.

Accordingly, the user terminal 100 may complete the operation of the apps 141 and 143 through the selected one path rule.

According to an embodiment, if the user input with insufficient information is received in the intelligent server 200, the natural language understanding module 220 may generate the path rule partially corresponding to the received user input. For example, the natural language understanding module 220 may transmit (①) the partially corresponding path rule to the intelligent agent 151. The intelligent agent 151 may transmit (②) the partially corresponding path rule to the execution manager module 153, and the execution manager module 153 may execute the first app 141 in accordance with the path rule. The execution manager module 153 may transmit (③) information on the insufficient parameter to the intelligent agent 151 while executing the first app 141. The intelligent agent 151 may request an additional input from the user using the information on the insufficient parameter. If the additional input is received (④) from the user, the intelligent agent 151 may transmit the received additional input to the intelligent server 200 to process the additional input. The natural language understanding module 220 may generate the added path rule based on the intent of the additionally inputted user input and the parameter information, and it may transmit (⑤) the generated path rule to the intelligent agent 151. The intelligent agent 151 may transmit (⑥) the path rule to the execution manager module 153 to execute the second app 143.

According to an embodiment, if the user input of which partial information is omitted is received in the intelligent server 200, the natural language understanding module 220 may transmit a user information request to the personal information server 300. The personal information server 300 may transmit information of the user who has inputted the user input stored in a persona database to the natural language understanding module 220. The natural language understanding module 220 may select the path rule corresponding to the user input of which the partial operation is omitted using the user information. Accordingly, even if the user input of which the partial information is omitted is received in the intelligent server 200, the natural language understanding module 220 may receive the addition input through a request for the omitted information or it may determine the path rule corresponding to the user input using the user information.

Figure 6:
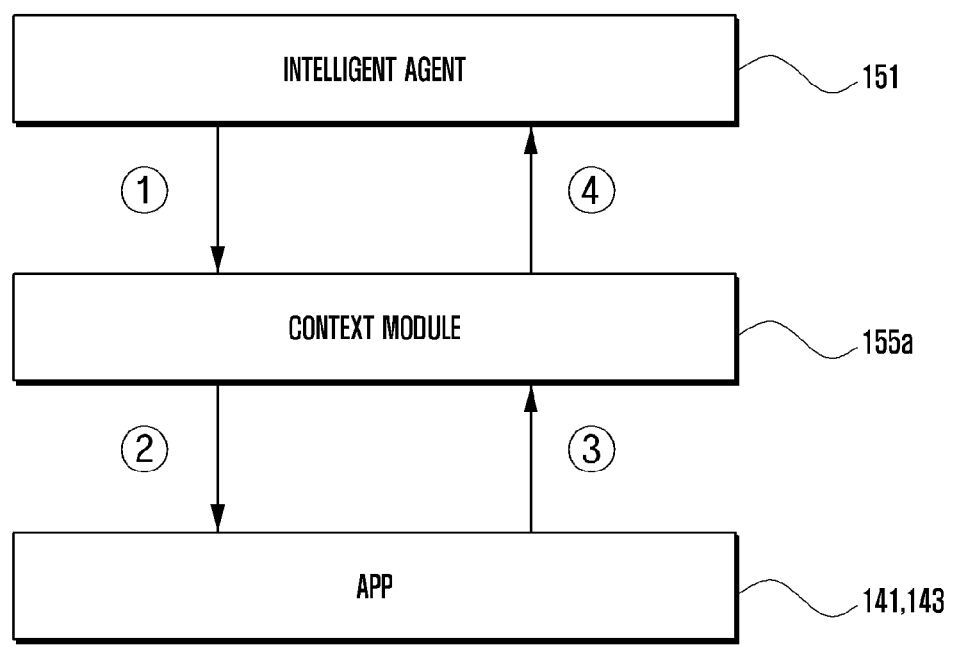
FIG. 6 is a diagram explaining that a context module of a processor collects a current state according to an embodiment of the disclosure.

FIG. 6 is a diagram explaining that a context module of a processor collects a current state according to an embodiment of the disclosure.

With reference to FIG. 6, if a context request is received (①) from the intelligent agent 151, the context module 155*a* may request context information indicating the current state of the apps 141 and 143 from the apps 141 and 143. According to an embodiment, the context module 155*a* may receive (③) the context information from the apps 141 and 143, and it may transmit (④) the received context information to the intelligent agent 151.

According to an embodiment, the context module 155*a* may receive a plurality of pieces of context information through the apps 141 and 143. For example, the context information may be information on the apps 141 and 143 executed most recently. As another example, the context information may be information on the current state in the apps 141 and 143 (e.g., information on a photo if the corresponding photo is seen in a gallery).

According to an embodiment, the context module 155*a* may receive the context information indicating the current state of the user terminal 100 from not only the apps 141 and 143 but also a device platform. The context information may include general context information, user context information, or device context information.

The general context information may include general information of the user terminal 100. The general context information may be identified through an internal algorithm through reception of data through a sensor hub of a device platform. For example, the general context information may include information on the current space-time. The information on the current space-time may include, for example, information on the current time or current location of the user terminal 100. The current time may be identified through the time on the user terminal 100, and the information on the current location may be identified through a global positioning system (GPS). As another example, the general context information may include information on physical movement. The information on the physical movement may include information on, for example, walking, running, and during driving. The physical movement information may be identified through a motion sensor. The information on "during driving" may be identified through the motion sensor, and boarding and parking may be identified through sensing of Bluetooth connection in a vehicle. As still another example, the general context information may include user activity information. The user activity information may include, for example, information on commuting, shopping, and traveling. The user activity information may be identified using information on a place that the user or app has registered in a database.

The user context information may include information on the user. For example, the user context information may include information on a user's emotional state. The information on the emotional state may include, for example, information on user's happiness, sadness, and anger. As another example, the user context information may include information on the current state of the user. The information on the current state may include, for example, information on interest or intent (e.g., shopping).

The device context information may include information on the state of the user terminal 100. For example, the device context information may include information on the path rule executed by the execution manager module 153. As another example, the device information may include information on a battery. The information on the battery may be identified, for example, through charging and discharging states of the battery. As still another example, the device information may include information on a connected device and a network. The information on the connected device may be identified, for example, through a communication interface connected to the device.

Figure 7:
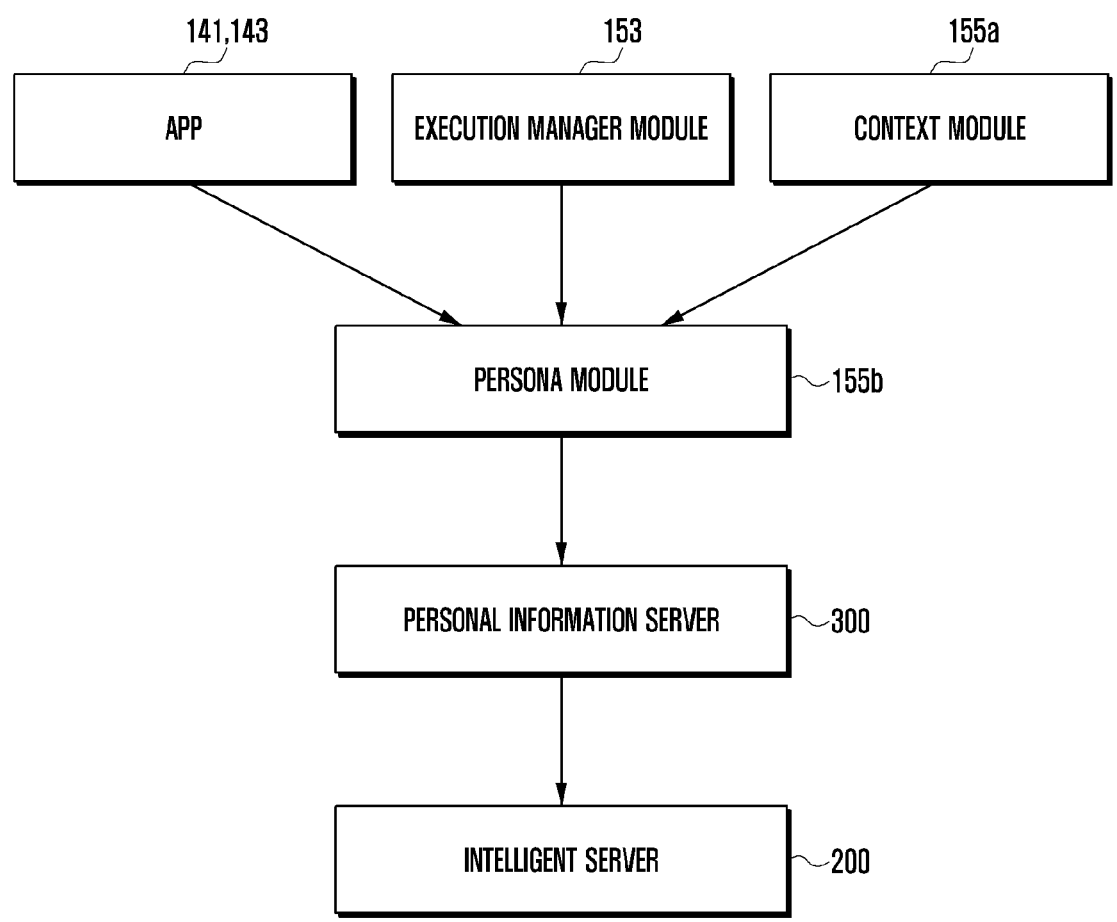
FIG. 7 is a diagram explaining that a persona module manages user information according to an embodiment of the disclosure.

FIG. 7 is a diagram explaining that a persona module manages user information according to an embodiment of the disclosure.

With reference to FIG. 7, the persona module 155*b* may receive information of the user terminal 100 from the apps 141 and 143, the execution manager module 153, or the context module 155*a*. The apps 141 and 143 and the execution manager module 153 may store resultant information on the operations of the apps 141*b* and 143*b* in an operation log database. The context module 155*a* may store the information on the current state of the user terminal 100 in a context database. The persona module 155*b* may receive the stored information from the operation log database or the context database. Data stored in the operation log database and the context database may be analyzed, for example, by an analysis engine, and it may be transmitted to the persona module 155*b*.

According to an embodiment, the persona module 155*b* may transmit the information received from the execution manager module 153 or the context module 155*a* to the proposal module 155*c*. For example, the persona module 155*b* may transmit data stored in the operation log database or the context database to the proposal module 155*c*.

According to an embodiment, the persona module 155*b* may transmit the information received from the execution manager module 153 or the context module 155*a* to the personal information server 300. For example, the persona module 155*b* may periodically transmit data accumulatively stored in the operation log database or the context database to the personal information server 300.

According to an embodiment, the persona module 155*b* may transmit data stored in the operation log database or the context database to the proposal module 155*c*. The user information generated by the persona module 155*b* may be stored in the persona database. The persona module 155*b* may periodically transmit the user information stored in the persona database to the personal information server 300. According to an embodiment, the information that the persona module 155*b* transmits to the personal information server 300 may be stored in the persona database. The personal information server 300 may deduce the user information necessary for the path rule generation of the intelligent server 200 using the information stored in the persona database.

According to an embodiment, the user information deduced using the information transmitted by the persona module 155*b* may include profile information or preference information. The profile information or the preference information may be deduced through a user's account and accumulated information.

The profile information may include user's personal information. For example, the profile information may include user's population statistics information. The population statistics information may include, for example, a user's gender and age. As another example, the profile information may include life event information. The lift event information may be deduced through comparison of log information with a life event model, and it may be supplemented through analysis of a behavior pattern. As still another example, the profile information may include interesting information. The interesting information may include, for example, an interesting shopping product and an interesting field (e.g., sport or politics). As still another example, the profile information may include activity area information. The activity area information may include information on, for example, home and workplace. The activity area may include information on areas recorded with priorities based on an accumulated stay time and the number of visits in addition to information on the location of the place. As still another example, the profile information may include activity time information. The activity time information may include, for example, information on the rising hour, commuting time, and sleeping hour. The information on the commuting hour may be deduced using the activity area information (e.g., information on the home and workplace). The information on the sleeping hour may be deduced through non-use time of the user terminal 100.

The preference information may include user's preference information. For example, the preference information may include information on an app preference. The app preference may be deduced, for example, through an app usage record (e.g., usage record by times or places). The app preference may be used to determine the app to be executed in accordance with the user's current state (e.g., time and place). As another example, the preference information may include information on contacts preference. The contacts preference may be deduced through analysis of the contact frequency (contact frequency by times or places) of the contacts. The contacts preference may be used to determine the contacts to contact in accordance with the user's current state (e.g., contact to duplicate names). As still another example, the preference information may include setting information. The setting information may be deduced through analysis of setting frequency (frequency set as setting values by times and places) information of a specific setting value. The setting information may be used to set the specific setting value in accordance with the user's current state (e.g., time, place, and situation). As still another example, the preference information may include place preference. The place preference may be deduced through a visit record (e.g., visit record by times) of a specific place. The place preference may be used to determine a place being visited in accordance with the user's current state (e.g., time). As still another example, the preference information may include a command preference. The command preference may be deduced, for example, through the command usage frequency (usage frequency by times and places). The command preference may be used to determine an instructions pattern to be used in accordance with the user's current state (e.g., time and place). The command preference may include information on a menu most frequently selected by the user in the current state of the app being executed through analysis of log information.

Figure 8:
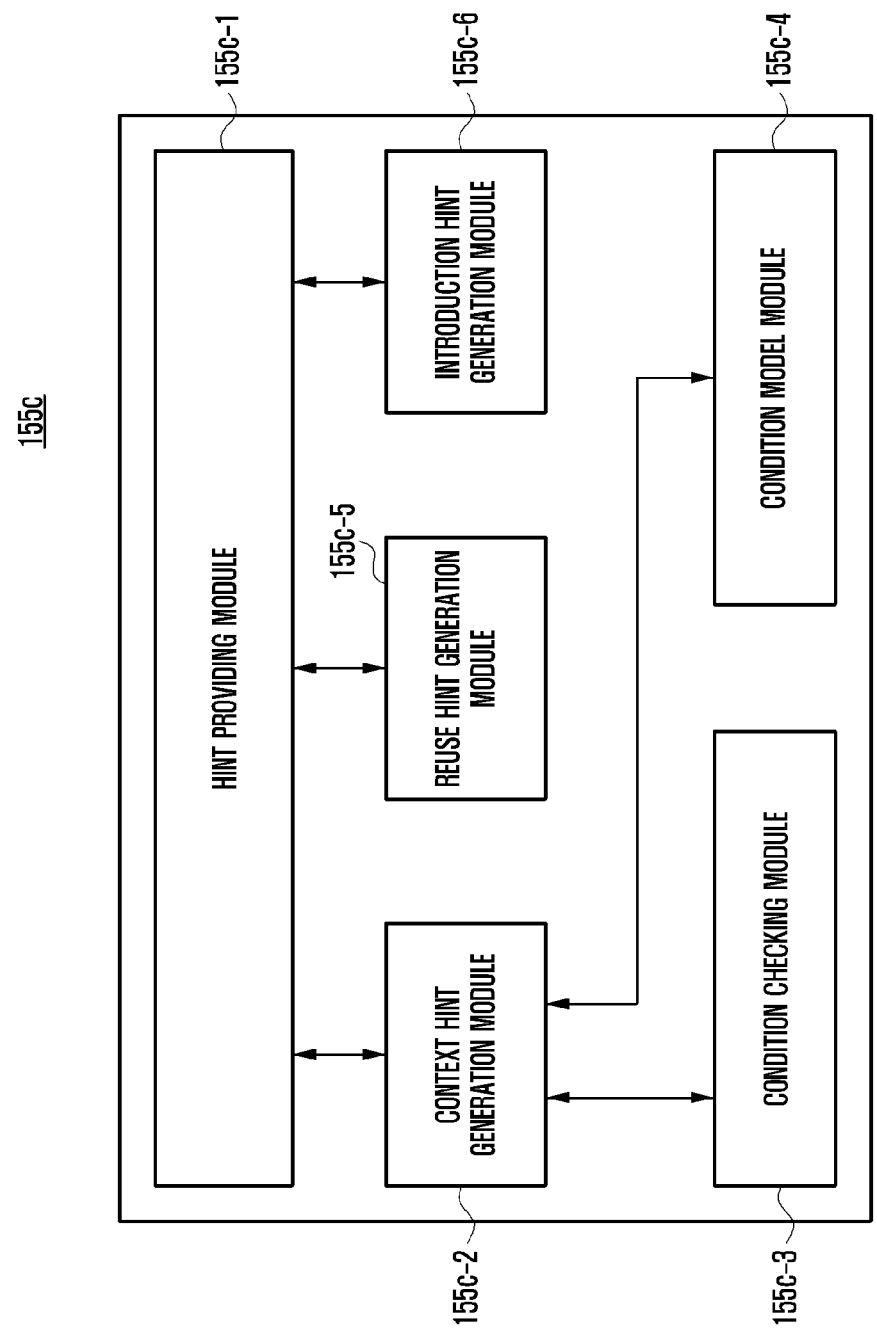
FIG. 8 is a block diagram illustrating a proposal module according to an embodiment of the disclosure.

FIG. 8 is a block diagram illustrating a proposal module according to an embodiment of the disclosure.

With reference to FIG. 8, the proposal module 155*c* may include a hint providing module 155*c*-1, a context hint generation module 155*c*-2, a condition checking module 155*c*-3, a condition model module 155*c*-4, a reuse hint generation module 155*c*-5, or an introduction hint generation module 155*c*-6.

According to an embodiment, the hint providing module 155*c*-1 may provide a hint to the user. For example, the hint providing module 155*c*-1 may provide the hint to the user through reception of the hint generated by the context hint generation module 155c-2, the reuse hint generation module 155c-5, or the introduction hint generation module 155c-6.

According to an embodiment, the context hint generation module 155c-2 may generate the hint that may be recommended in accordance with the current state through the condition checking module 155c-3 or the condition model module 155c-4. The condition checking module 155c-3 may receive information corresponding to the current state through the intelligent service module 155, and the condition model module 155c-4 may set a condition model using the received information. For example, the condition model module 155c-4 may provide, to the user, the hint having high usage possibility on the corresponding condition in the order of high priorities through grasping of the app using the time, location, and situation for providing the hint to the user.

According to an embodiment, the reuse hint generation module 155c-5 may generate the hint capable of being recommended in consideration of the usage frequency in accordance with the current state. For example, the reuse hint generation module 155c-5 may generate the hint in consideration of the usage pattern of the user.

According to an embodiment, the introduction hint generation module 155c-6 may generate a hint for introducing a new function or a function frequently used by other users to the user. For example, the hint for introducing the new function may include an introduction (e.g., operation method) of the intelligent agent 151.

According to another embodiment, the context hint generation module 155c-2, the condition checking module 155c-3, the condition model module 155c-4, the reuse hint generation module 155c-5, or the introduction hint generation module 155c-6 of the proposal module 155c may be included in the personal information server 300. For example, the hint providing module 155c-1 of the proposal module 155c may receive the hint from the context hint generation module 155c-2, the reuse hint generation module 155c-5, or the introduction hint generation module 155c-6 of the user personal information server 300, and it may provide the received hint to the user.

According to an embodiment, the user terminal 100 may provide the hint in accordance with a series of processes as follows. For example, if a hint providing request is received (①) from the intelligent agent 151, the hint providing module 155c-1 may transmit (②) the hint generation request to the context hint generation module 155c-2. If the hint generation request is received, the context hint generation module 155c-2 may receive (④) information corresponding to the current state from the context module 155a and the persona checking module 155b using (③) the condition checking module 155c-3. The condition checking module 155c-4 may transmit (⑤) the received information to the condition model module 155c-4, and the condition model module 155c-4 may give a priority with respect to the hint in the order of high usability on the condition among the hints provided to the user using the above-described information. The context hint generation module 155c-2 may identify (⑥) the condition, and it may generate the hint corresponding to the current state. The context hint generation module 155c-2 may transmit (⑦) the generated hint to the hint providing module 155c-1. The hint providing module 155c-1 may align the hints in accordance with a designated rule, and it may transmit (⑧) the hints to the intelligent agent 151.

According to an embodiment, the hint providing module 155c-1 may generate a plurality of context hints, and it may designate the priorities to the plurality of context hints in accordance with the designated rule. According to an embodiment, the hint providing module 155c-1 may first provide the hint having high priority among the plurality of context hints to the user.

According to an embodiment, the user terminal 100 may propose the hint in accordance with the usage frequency. For example, if the hint providing request is received (①) from the intelligent agent 151, the hint providing module 155c-1 may transmit (②) the hint generation request to the reuse hint generation module 155c-5. If the hint generation request is received, the reuse hint generation module 155c-5 may receive (③) the user information from the persona module 155b. For example, the reuse hint generation module 155c-5 may receive the path rule included in the user's preference information of the persona module 155b, the parameter included in the path rule, the app execution frequency, and space-time information in which the app is used. The reuse hint generation module 155c-5 may generate the hint corresponding to the received user information. The reuse hint generation module 155c-5 may transmit (④) the generated hint to the hint providing module 155c-1. The hint providing module 155c-1 may align the hints, and it may transmit (⑤) the hints to the intelligent agent 151.

According to an embodiment, the user terminal 100 may propose the hint for a new function. For example, if the hint providing request is received (①) from the intelligent agent 151, the hint providing module 155c-1 may transmit (②) the hint generation request to the introduction hint generation module 155c-6. The introduction hint generation module 155c-6 may transmit (③) the introduction hint providing request from the proposal server 400, and it may receive (④) information on the function to be introduced from the proposal server 400. For example, the proposal server 400 may store the information on the function to be introduced, and a hint list for functions to be introduced may be updated by a service operator. The introduction hint generation module 155c-6 may transmit (⑤) the generated hints to the hint providing module 155c-1. The hint providing module 155c-1 may align the hints, and it may transmit (⑥) the hints to the intelligent agent 151.

Accordingly, the proposal module 155c may provide the hint generated by the context hint generation module 155c-2, the reuse hint generation module 155c-5, or the introduction hint generation module 155c-6 to the user. For example, the proposal module 155c may display the generated hint on an app execution screen for operating the intelligent agent 151, and it may receive an input for selecting the hint from the user through the app execution screen.

Figure 9:
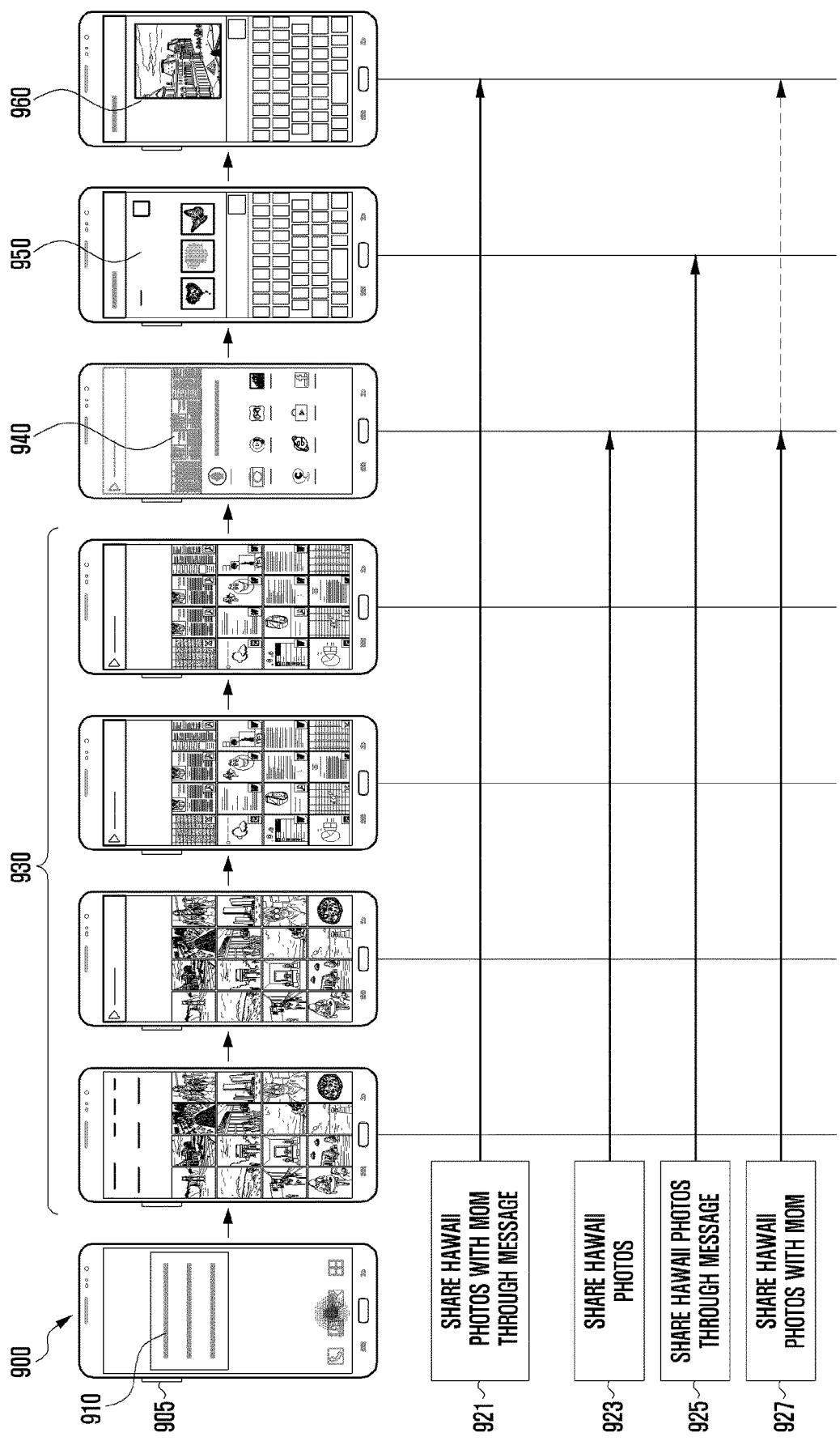
FIG. 9 is a diagram illustrating that an intelligent agent operates to control an application in response to a user's speech as a change of a graphic interface in stages in an electronic device according to various embodiments of the disclosure.

FIG. 9 is a diagram illustrating that an intelligent agent operates to control an application in response to a user's speech as a change of a graphic interface in stages in an electronic device according to various embodiments of the disclosure.

With reference to FIG. 9, an electronic device 900 according to various embodiments of the disclosure may call an application program installed in the electronic device 900, for example, the intelligent agent (e.g., intelligent agent 151), through an input of a user's key 905, and it may display the intelligent agent on a dialogue window 910. The electronic device 900 may convert the user's speech into a text to show the text through the dialogue window 910. The electronic device 900 may execute the operation of an application using the path rule generated through analysis of the speech.

For example, if the user speaks "Share Hawaii photos with mom with a message" (921), the execution manager module (e.g., execution manager module 153) in the electronic device 900 may command a gallery application to select photos taken in Hawaii and to select an SMS application as a medium to transmit the selected photos. If the command performance completion is reported from the gallery application, the execution manager module may select "mom" as a message recipient, and it may command the SMS application to transmit the photos attached to the message by the gallery application.

According to various embodiments of the disclosure, a series of processes of the path rule may be expressed to the user through an interface of an application that is the performance subject rather than through the dialogue window 910 of the intelligent agent. For example, first interfaces 930 showing a process in which the gallery application searches for Hawaii photos are successively provided through the display, and then a second interface 940 of the gallery application for selecting a transmission medium is provided. Thereafter, a third interface 950 showing a process in which the SMS application attaches the photos to the message is provided, and last, a fourth interface 960 showing that the SMS application has completed the message transmission to mom.

On the other hand, if the user's speech is "Share Hawaii photos" (923), and the transmission medium and the recipient are not acquired from the speech, it may be possible to perform up to the process of providing the second interface 940 through the display. Accordingly, the intelligent agent may make a vocal inquiry, for example, "What will be sent to whom?", and if the user speaks "To mom with a message" in response to this, it may be possible to perform up to the process of providing the fourth interface 960.

If the user's speech is "Share Hawaii photos with a message" (925), and the recipient is not acquired from the speech, it may be possible to perform up to the process of providing the third interface 950 on the display. If the user additionally speaks "To mom", it may be possible to additionally perform up to the process of providing the fourth interface 960.

If the user's speech is "Share Hawaii photos with mom" (927), it means that the transmission medium does not exist in the speech, and thus it may be possible to perform up to the process of providing the second interface 940 through the display. If the user additionally speaks "With a message", it may be possible to additionally perform up to the process of providing the fourth interface 960. As another example, the transmission medium may be automatically selected through SMS based on the contacts information, and it may be possible to additionally perform up to the process of providing the fourth interface 960.

According to various embodiments of the disclosure, the electronic device 900 may perform the path rule by controlling an application in the electronic device 900 through the intelligent agent, and it may also perform the path rule by controlling even the functions of an external electronic device functionally connected to the electronic device 900.

According to various embodiments of the disclosure, the electronic device 900 may recognize a change (extension or limit) of the functions provided from the application or the external electronic device, and it may use the recognized change in selecting the path rule. Further, electronic device 900 may recognize a change of the state for the application to perform the function in addition to whether to provide a specific function, and it may use the recognized change in selecting the path rule. The change of the state may interlock with the change of the function in accordance with the version of the application, but even in a state where the function is not changed, it is possible to change the state, and thus the electronic device 900 may recognize and utilize the change in selecting the path rule.

Figure 10:
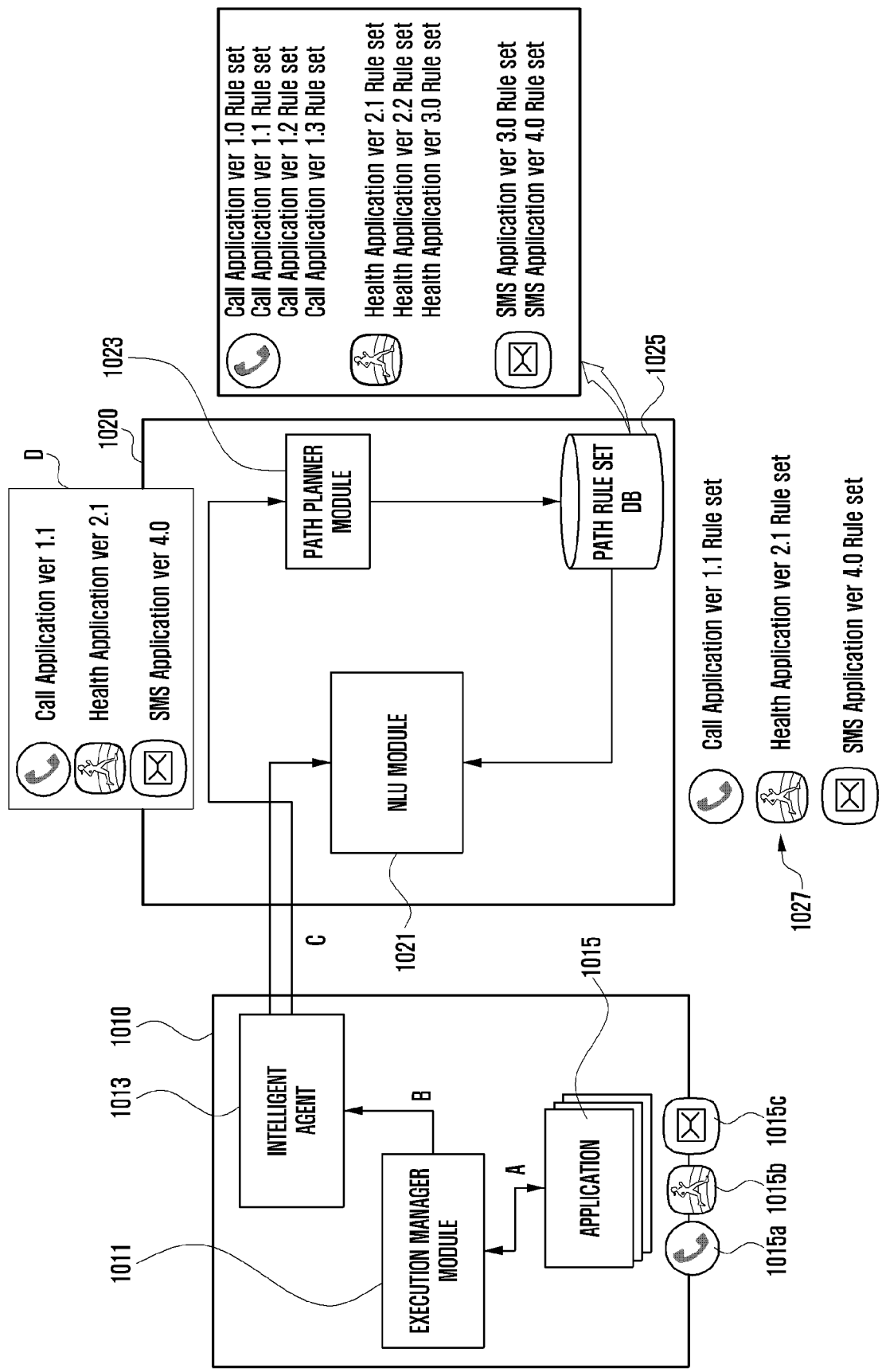
FIG. 10 is a diagram explaining an operation in which an integrated intelligence system manages a version of an application according to various embodiments of the disclosure.

FIG. 10 is a diagram explaining an operation in which an integrated intelligence system manages a version of an application according to various embodiments of the disclosure.

With reference to FIG. 10, an electronic device 1010 according to various embodiments of the disclosure may include an execution manager module 1011, an intelligent agent 1013, and applications 1015.

A server 1020 according to various embodiments of the disclosure may include an NLU module 1021, a path planner module 1023, and a path rule set DB 1025.

The execution manager module 1011 may manage execution of the applications 1015 installed in the electronic device 1010. Further, the execution manager module 1011 may collect (A) metadata including the kinds of the respective applications and version information from the applications 1015, and it may transmit (B) the metadata to the intelligent agent 1013.

The intelligent agent 1013 according to various embodiments of the disclosure may receive a user input (e.g., utterance or touch input) for controlling the applications through an input module, and it may transmit (C) the received user input to the NLU module 1021. Further, the metadata of the applications collected by the execution manager module 1011 may be transmitted (D) to the path planner module 1023 through the intelligent agent 1013.

The path rule set DB 1025 according to various embodiments of the disclosure may include a path rule set corresponding to respective versions for the applications.

The path planner module 1023 according to various embodiments of the disclosure may permit an access (E) of the NLU module 1021 through acquisition of the path rule set 1027 that coincides with the versions of the respective applications installed in the electronic device 1010 from the DB 1025 based on the metadata received from the electronic device 1010. For example, the NLU module 1021 may access the DB 1025 to read the path rule set 1027 selected by the path planner module 1023. As another example, the path planner module 1023 may temporarily store the path rule set 1027 in a separate storage space, and it may notify the NLU module 1021 of this, and thus the NLU module 1021 may read the path rule set 1027 from the separate storage space.

According to various embodiments of the disclosure, the NLU module 1021 may grasp the user's intent through analysis of the user input (utterance or touch input), and it may select the path rule corresponding to the intent from the path rule set 1027.

According to an embodiment, if it is assumed that the applications that can be directly controlled by the execution manager module 10011 are a call application 1015*a*, a health application 1015*b*, and an SMS application 1015*c*, the execution manager module 1011 may collect the metadata including the kinds of the respective applications and the version information, and it may transfer the collected metadata to the server 1020 through the intelligent agent 1013. If a user input, for example, an utterance "Call mom", is received through the input module of the electronic device 1010, the collected metadata may be transferred to the path planner module 1023. The path planner module 1023 may read the path rule set 1027 that coincides with the versions of the respective applications installed in the electronic device 1010, for example, "Call application rule set ver 1.1, Health application rule set v2.1, SMS application rule set ver 3.0", from the path rule set DB 1025 based on the received metadata, and it may provide the read path rule set 1027 to the NLU module 1021. The NLU module 1021 may determine the domain of the user input as "Call application", and it may finally select the path rule corresponding to the analyzed user's intent as one of the path rules existing in "Call application rule set ver 1.1".

According to various embodiments of the disclosure, if the function of the application functionally connected to the intelligent agent 1013 through the execution manager module 1011 is extended or changed through a version change or the like in the case where the user controls the electronic device 1010 using the intelligent agent 1013, the corresponding information may be recognized by the intelligent agent 1013. Accordingly, it may be easy for the user to control the application or the external electronic device through the intelligent agent 1013. Further, according to various embodiments of the disclosure, as the number of kinds and versions of the applications becomes larger, the complexity of the task for selecting the path rule may be geometrically increased, and a method and an apparatus for efficiently control this can be provided.

Various embodiments of the disclosure relate to a system for individually controlling respective applications using the intelligent agent. In the case of such a system, respective versions of the applications and the intelligent agents can be individually updated, and further, even if the intelligent agents in respective user's electronic devices have the same version, the applications installed in the electronic devices may have different versions. In this case, the function of the application provided by the intelligent agent may be changed in accordance with the version of the application. Table 1 below shows an example of a situation in which the supported path rules are changed in accordance with the version change of the application.

TABLE 1

| User Command | Path rule | VER 1.0 | VER 2.0 | Remarks |
| --- | --- | --- | --- | --- |
| "Execute gallery" | Rule 1 | O | O | Both supported (Case 1) |
| "Cancel favorites of latest Hawaii photos" | Rule 2 | X | O | New path rule addition (Case 2) |
| "Perform automatic correction of latest Hawaii photos" | Rule 3 | O | X | Existing path rule deletion (Case 3) |
| "Show latest Hawaii photo information" | Rule 4 | O | X | Conflict (Case 4) |
| | Rule 5 | X | O | Conflict |

In Table 1, VER_1.0 and VER_2.0 are examples in which the supported path rule is changed in accordance with the version of the application. The path rule may be a set of states, and it may mean a complete behavior to process the user input, such as "Execute gallery", using the corresponding app/service. The state may be a state resulted from a user's action (touch or the like), and it may mean a state shifted to a specific screen.

In Table 1, Rule 1 denotes a case where both versions are supported regardless of the two kinds of versions, and Rule 2 denotes a case where the existing non-supported path rule is newly supported as the version of the application is changed. In contrast, Rule 3 denotes a case where the existing supported path rule is deleted as the version of the application is changed.

In Table 1, in the case of Rule 4 and Rule 5, in accordance with a version, the path rule corresponding to the operation "Show the latest Hawaii photo information" may be performed as Rule 4, whereas in another version, the path rule may be performed as Rule 5. In the above case, in order to perform "Show the latest Hawaii photo information" desired by the user, the path rule to be received in the application may differ. Accordingly, in accordance with the version information of the application, the path rule may be added, deleted, or corrected. In the case of the intelligent agent managing the operation of the application based on the path rule information, the path rule change in accordance with the corresponding version may be recognized in order to perform the application in accordance with the user's intent.

Figure 11:
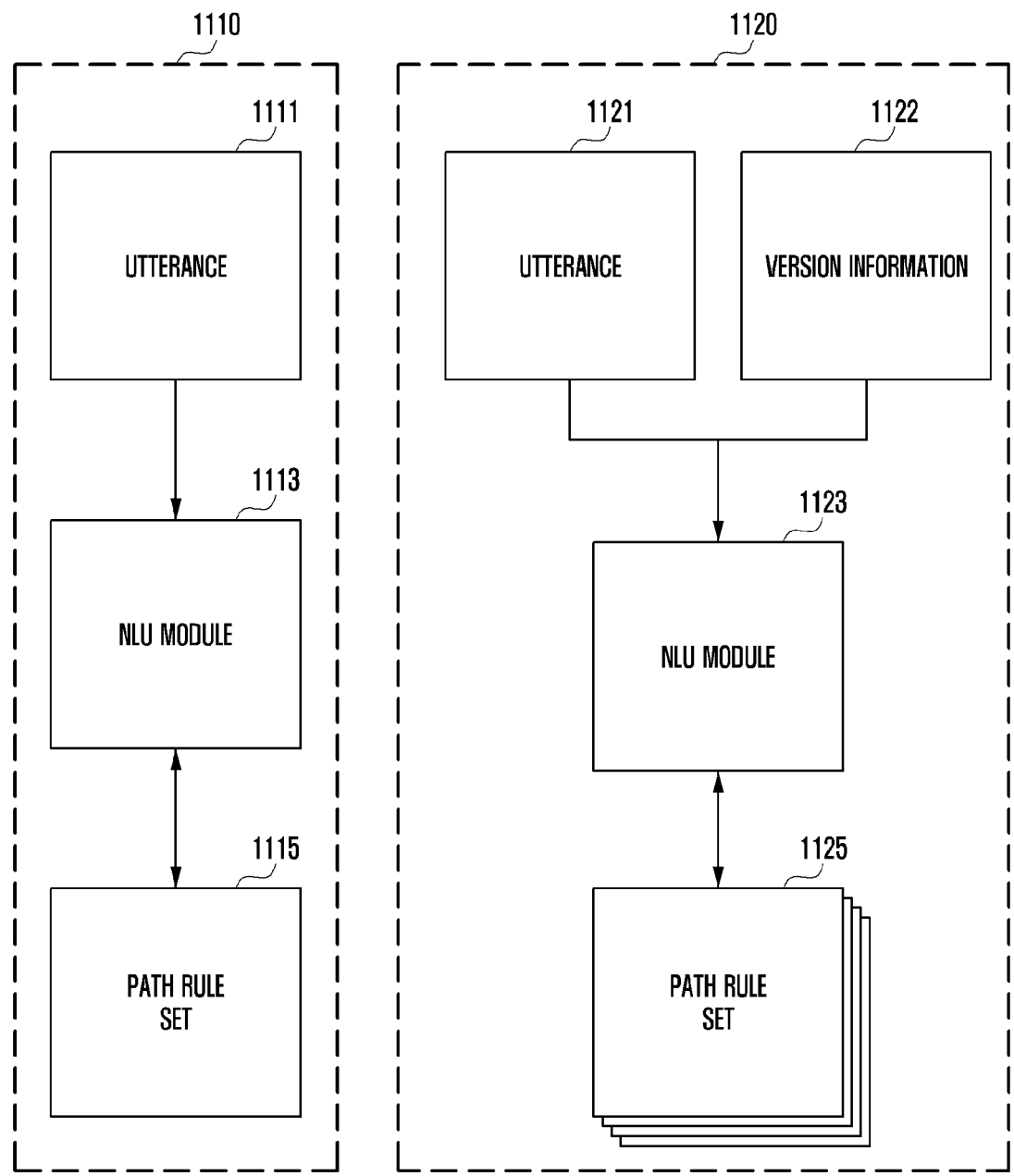
FIG. 11 is a diagram explaining an operation in which an NLU module processes a speech according to various embodiments of the disclosure.

FIG. 11 is a diagram explaining an operation in which an NLU module processes a speech according to various embodiments of the disclosure.

According to various embodiments of the disclosure, the left-side model 1110 in FIG. 11 is an example in which various versions of applications do not exist. If the user makes an utterance 1111, the NLU module 1113 may grasp the intent of the utterance 1111 through processing of the utterance 1111, and it may select the path rule corresponding to the intent in the corresponding set 1115.

According to various embodiments of the disclosure, the right-side model 1120 is a model considering the version of the application together with the user's utterance when the path rule is selected, and if the user makes an utterance 1121, version information 1122 of the application may be transferred to the NLU module 1123 together with the utterance 1121. The NLU module 1123 may select one set corresponding to the version information 1122 among several path rule sets 1125 in consideration of the version information. The NLU module 1123 may select the path rule corresponding to the user's intent from the selected set.

Figure 12:
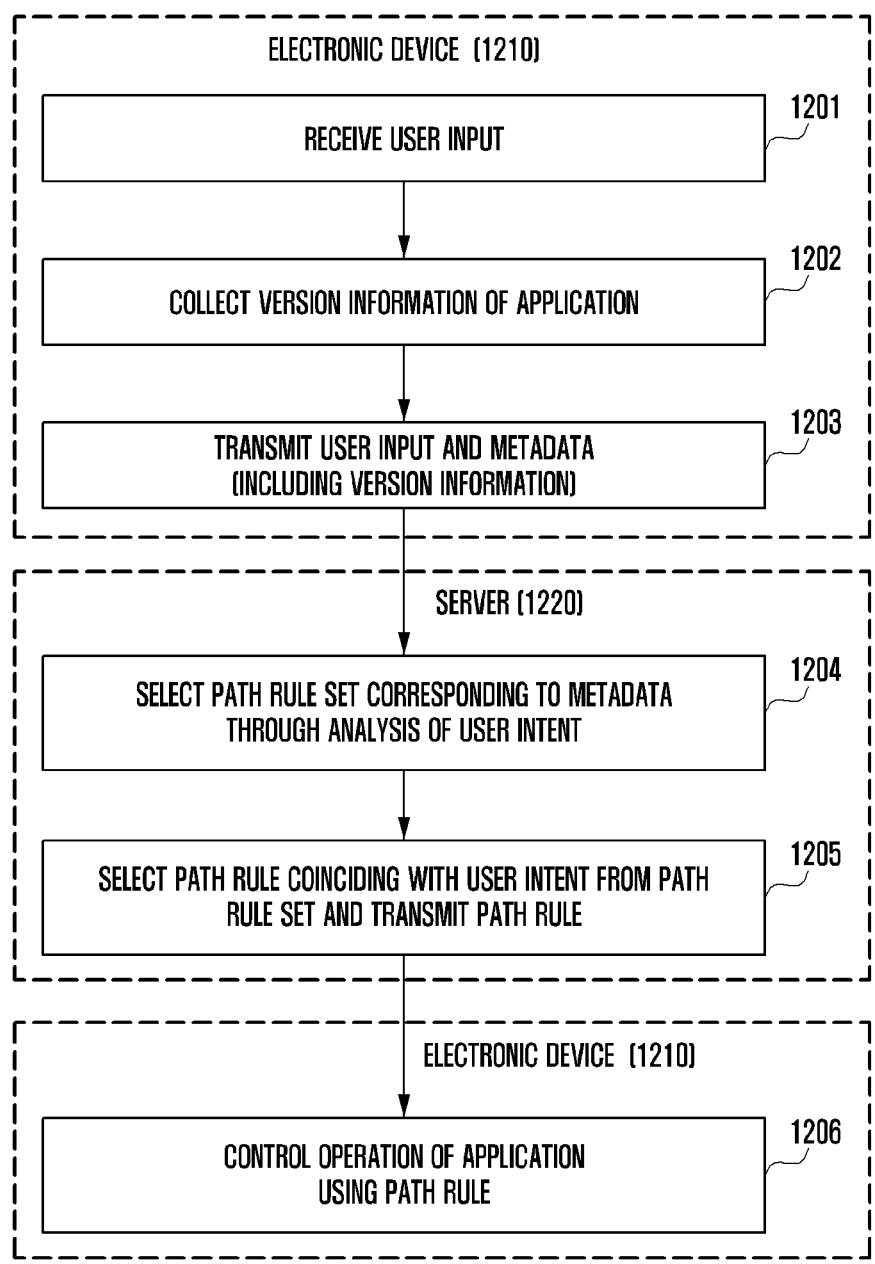
FIG. 12 is a flowchart explaining an agent service method in an integrated intelligence system configured to determine a path rule through a server according to various embodiments of the disclosure.

FIG. 12 is a flowchart explaining an agent service method in an integrated intelligence system configured to determine a path rule through a server according to various embodiments of the disclosure.

With reference to FIG. 12, at operation 1201, a processor (e.g., 150 of FIG. 2) of an electronic device 1210 may receive a user input (utterance or touch input) for controlling an application through an input module (e.g., 110 of FIG. 2). At operation 1202, the processor of the electronic device 1210 may collect respective version information of applications installed in the electronic device 1210 that can be controlled by the intelligent agent. Not only version information but also metadata, various pieces of information, such as area, operator, and the like) may be collected. The additionally collected information as described above may be utilized when the path rule set is selected together with version information. At operation 1203, the processor of the electronic device 1210 may transmit the collected metadata (including at least version information of the respective applications) to the server 1220 together with the user input.

At operation 1204, the server 1220 may send the user input to the NLU module to analyze the user's intent. Further, the server 1220 may send the metadata to the path planner module to select the path rule set corresponding to the metadata from the path rule set DB. At operation 1205, the server 1220 may select the path rule that coincides with the user's intent from the selected path rule set, and it may transmit the selected path rule to the electronic device 1210. Meanwhile, if the path rule that coincides with the user's intent does not exist in the selected path rule set, or if the selected path rule is unable to support the version of the corresponding application, the server 1220 may transmit a notification indicating that the user input is unable to be processed to the electronic device instead of the path rule.

At operation 1206, the processor of the electronic device 1210 may control the operation of the application using the path rule received from the server 1220.

Figure 13:
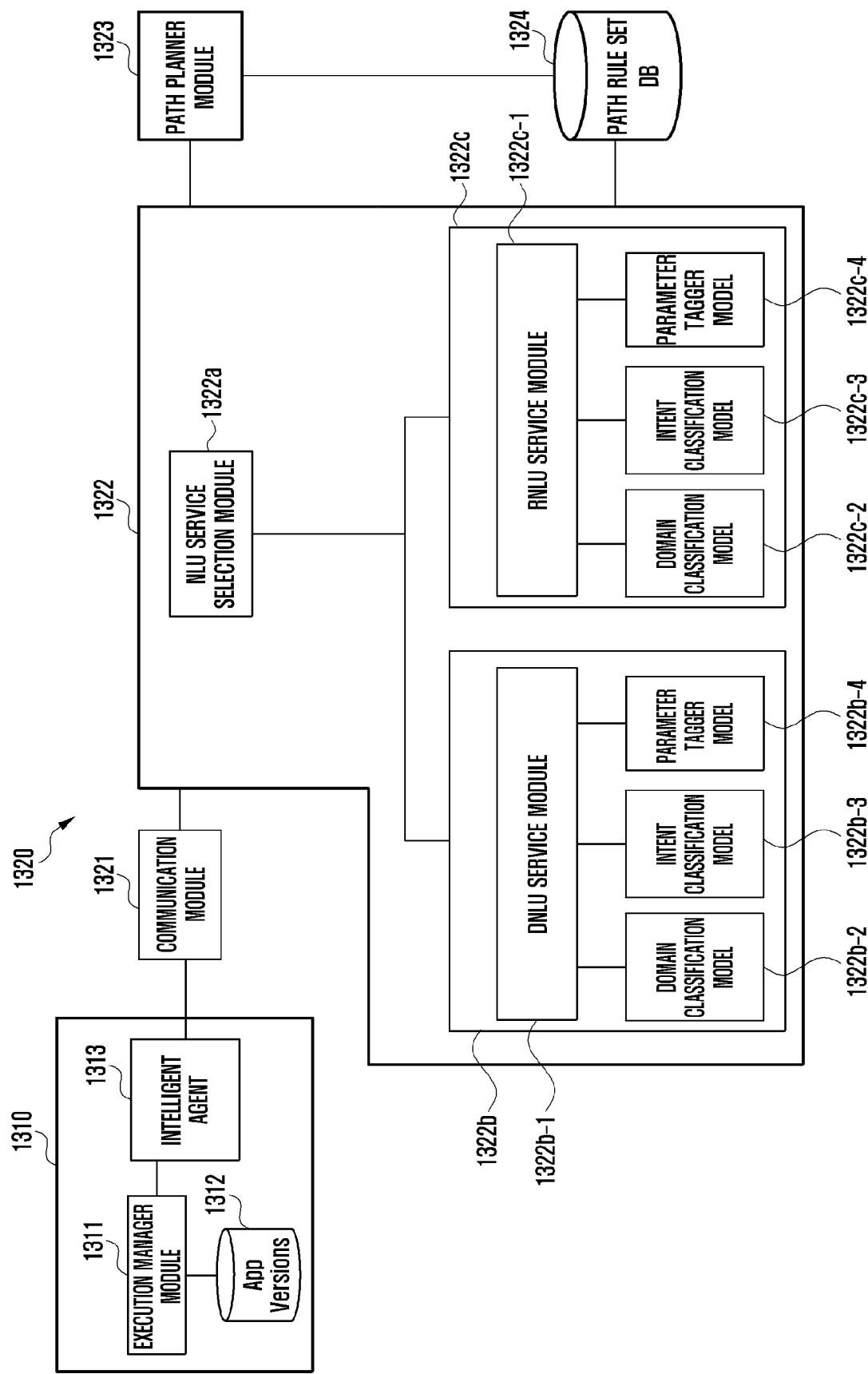
FIG. 13 is a diagram explaining an integrated intelligence system configured to determine a path rule through a server according to various embodiments of the disclosure.

FIG. 13 is a diagram explaining an integrated intelligence system configured to determine a path rule through a server according to various embodiments of the disclosure.

With reference to FIG. 13, according to various embodiments of the disclosure, an execution manager module 1311 of an electronic device 1310 may acquire version information 1312 from applications that can be controlled by the execution manager module 1311 installed in the electronic device 1310. The version information 1312 may be provided to an intelligent agent 1313 through the execution manager module 1311 in the form of a version set, that is, in the form in which respective version information of the applications are gathered. This information may be transferred to the server 1320 together with the user input after the user input is transferred to the server 1320.

According to various embodiments of the disclosure, the server 1320 may include a communication module 1321, an NLU module 1322, a path planner module 1323, and a path rule set DB 1324. The NLU module 1322 may include an NLU service selection module 1322a, a deep learning-based NLU (DNLU) 1322b, and a rule-based NLU (RNLU) module 1322c.

According to various embodiments of the disclosure, the NLU service selection module 1322a may select one of the DNLU module 1322b and the RNLU module 1322c as a module to analyze the user input. For example, as an analysis module, the RNLU module 1322c may be preferentially selected. Further, any one of the kind of domain, the kind of intent, a variable value of an NLU engine, the kind of utterance, or utterance complexity may be used as a reference for selecting the analysis module. Further, one of two modules may be selected based on the size of text data generated by the ASR module (e.g., 210 of FIG. 4). For example, if the size of the text data exceeds a predetermined reference value, the DNLU module 1322b may be selected as the analysis module. Further, the NLU service selection module 1322a may send the user input received from the electronic device 1310 through the communication module 1321 to the selected analysis module to select the path rule corresponding to the user input from the path rule set selected by the path planner module 1323.

According to various embodiments of the disclosure, the path planner module 1323 may receive version information received from the electronic device 1310 from the communication module 1321 through the NLU module 1322, and it may recognize the versions of the respective applications being executed in the electronic device 1310 from the version information. The path planner module 1323 may manage the path rule set DB 1324 including the path rule set corresponding to the respective versions by applications. The path planner module 1323 may acquire the path rule set corresponding to the version information of the application installed in the electronic device 1310 from the DB 1324, and it may provide the acquired path rule set to the selected analysis module. In addition, the path rule sets in the DB may be managed by not only version information but also other information (e.g., area or operator name).

According to various embodiments of the disclosure, the path planner module 1323 and the path rule set DB 1324 may be implemented by one module with the NLU module 1322.

According to various embodiments of the disclosure, the path rule sets may be equal to each other although versions of the applications are different from each other. For example, as in Table 2 below, Galley_2.1.0, Galley_2.2.0, and Galley_2.3.0 may have the same path rule set "Galley_KOR_SKT_R1".

TABLE 2

| Application_Version | Application_Area_Operator Name_Path Rule Set Version |
|---|---|
| Galley_2.1.0 | Galley_KOR_SKT_R1 |
| Galley_2.2.0 | |
| Galley_2.3.0 | |
| Galley_2.4.0 | Galley_KOR_SKT_R2 |

According to various embodiments of the disclosure, a method for confirming the path rule corresponding to the user input may be divided into a domain classifier model, an intent classifier model, and parameter tagger model, and such models may be successively performed in the selected analysis module.

According to an embodiment, the RNLU module 1322c may be selected as the analysis module, and it may receive the user input. For example, if the user input is "Send a text message to mom that I will be late", the RNLU service module 1322c-1 may determine the SMS application as a domain by performing the domain classification model 1322c-2 with respect to the user input. Next, the RNLU service module 1322c-1 may grasp "text transmission" as the user's intent by performing the intent classification model 1322c-3 (e.g., by performing syntactic and/or semantic analyses through searching for a keyword (e.g., "text" and "transmission") from text data in accordance with a predetermined rule), and it may select the path rule corresponding to the user's intent from the path rule set of the SMS application (determined domain) being received from the path planner module 1323. Next, the RNLU service module 1322c-1 may determine "will be late (contents)" and "mom (recipient)" in the user input as parameters through performing of a parameter tagger model 1322c-4 with respect to the user input, and it may transmit the determined parameters to the electronic device 1310 through the communication module 1321 together with the path rule.

According to another embodiment, the DNLU module 1322b may be selected as the analysis module to receive the user input. The DNLU service module 1322b-1 may determine the domain, intent, and parameter by successively performing the domain classification model 1322b-2, intent classification model (syntactic and/or semantic analyses based on deep running) 1322b-3, and parameter tagger model 1322b-4 with respect to the user input, select the path rule corresponding to the intent from the path rule set of the determined domain, and transmit the parameter to the electronic device 1310 through the communication module 1321 together with the path rule.

According to still another embodiment, the DNLU module 1322b and the RNLU module 1322c may interlock with each other to analyze the user input. For example, the RNLU module 1322c may perform domain classification and parameter tagging, and the DNLU module 1322b may perform intent classification. As another example, the RNLU module 1322c may be preferentially selected as the analysis module to determine the domain, and if the probability of the intent (degree of possibility of the user's intent) grasped by performing the intent classification model 1322c-3 is lower than a predetermined reference value, the DNLU module 1322b may be determined as the intent analysis module to transfer the user input and the domain to the DNLU module 1322b. Accordingly, instead of the RNLU module 1322c, the DNLU module 1322b may perform the intent classification model to finally select the path rule. As another example, the RNLU module 1322c may be preferentially selected as the analysis module to determine the domain, and if plural domains are determined, the DNLU module 1322b may be determined as the intent analysis module to transfer the user input and the domains to the DNLU module 1322b. If versions or applications are gradually increased, fragmentation of the path rule may also be increased. Through this, the amount of operation for the path rule confirmation may be increased, and the possibility that the user selects a desired path rule may be gradually lowered to cause the operation of the integrated intelligence system to be further difficult. According to various embodiments of the disclosure, because the domain classification model and the parameter tagger module may be fixed to have no change for each version, and only the intent classification model is changed for each version, the amount of operation for the path rule confirmation can be reduced.

Figure 14:
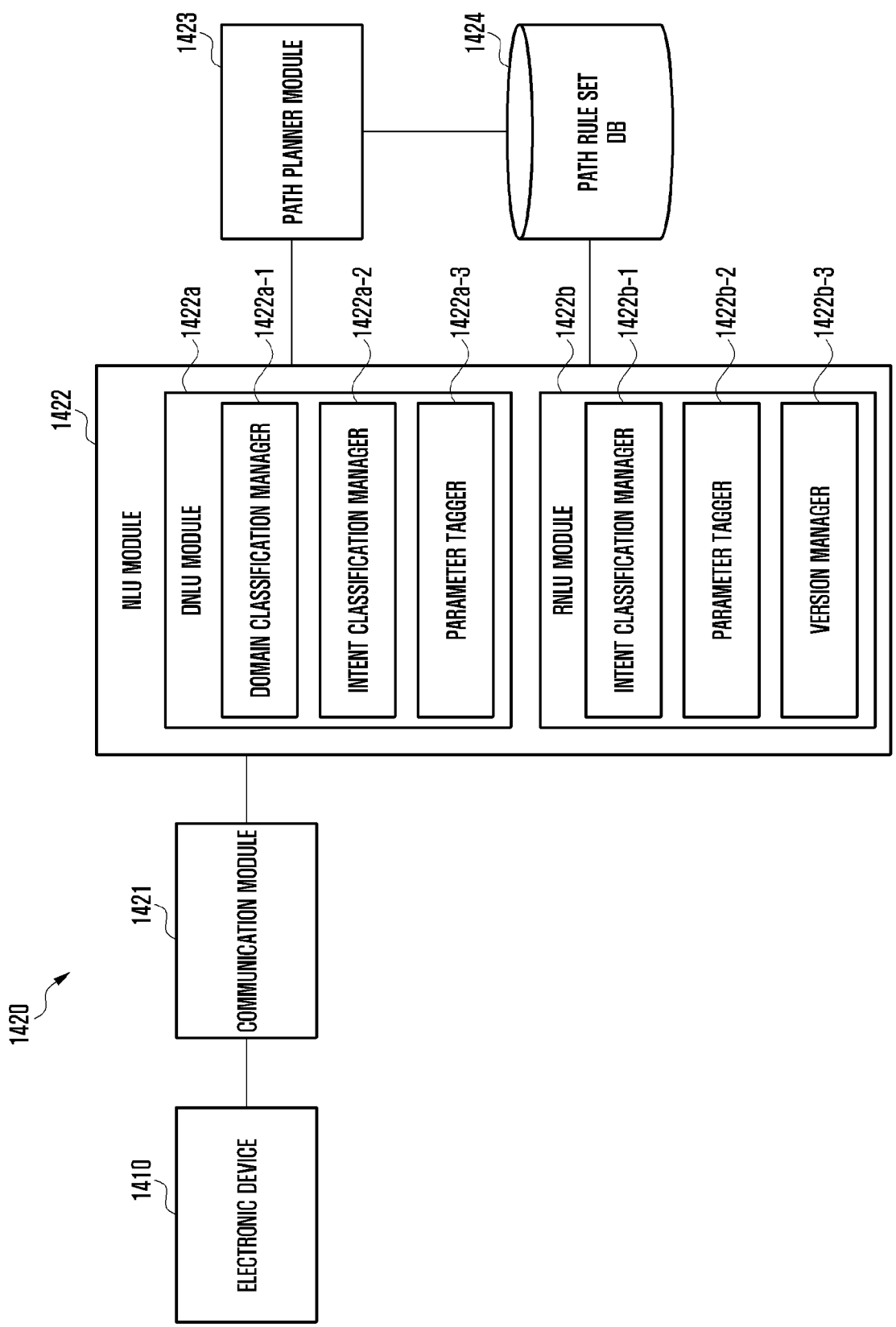
FIG. 14 is a diagram explaining an integrated intelligence system configured to process a user input through interlocking of DNLU and RNLU with each other according to various embodiments of the disclosure.

FIG. 14 is a diagram explaining an integrated intelligence system configured to process a user input through interlocking of DNLU and RNLU with each other according to various embodiments of the disclosure.

According to various embodiments of the disclosure, a server 1420 may include a communication module 1421, an NLU module 1422, a path planner module 1423, and a path rule set DB 1424.

According to various embodiments of the disclosure, the NLU module 1422 may include a DNLU module 1422a and an RNLU module 1422b. The DNLU module 1422a may include a domain classification manager 1422a-1, an intent classification manager 1422a-2, and a parameter tagger 1422a-3. The RNLU module 1422b may include an intent classification manager 1422b-1, a parameter tagger 1422b-2, and a version manager 1422b-3.

According to various embodiments of the disclosure, the version manager 1422b-3 may be a constituent element of the path planner module 1423.

According to various embodiments of the disclosure, the path planner module 1423 and the path rule set DB 1424 may be implemented by one module together with the NLU module 1422.

According to various embodiments of the disclosure, the communication module 1421 may receive the user input from the electronic device 1410, and it may transfer the user input to the NLU module 1422. Along with the user input or after receiving the user input, the communication module 1421 may receive version information of applications from the electronic device 1410, and it may transfer the version information to the NLU module 1422 or the path planner module 1423. The communication module 1421 may receive the selected path rule transferred from the NLU module 1422 and it may transmit the path rule to the electronic device 1410 based on the user input and the version information through the NLU module 1422.

According to various embodiments of the disclosure, the domain classification manager 1422a-1 of the DNLU module 1422a may determine the domain of the user input, and it may transfer the determined domain to the intent classification manager 1422a-2 of the DNLU module 1422a.

According to various embodiments of the disclosure, the intent classification manager 1422a-2 of the DNLU module 1422a may grasp the user's intent through analysis of the user input, and it may select a plurality of path rules from the path rule set DB 1424 as path rule candidates corresponding to the intent. The intent classification manager 1422a-2 of the DNLU module 1422a may transfer the selected candidates to the intent classification manager 1422b-1 of the RNLU module 1422b.

According to various embodiments of the disclosure, the intent classification manager 1422b-1 of the RNLU module 1422b may determine the degree of matching between the candidates transferred from the DNLU module 1422a and the user input through a rule-based intent classification technique. For example, the intent classification manager 1422b-1 of the RNLU module 1422b may determine the accuracy of the path rule matching between the respective candidates and the user input through calculation of the matching quality (MQ) of the respective candidates. If the MQ level of all the candidates is equal to or lower than a specific threshold value, the path rule matching may be requested from the DNLU module 1422a.

According to various embodiments of the disclosure, in response to the request for the path rule matching, the intent classification manager 1422a-2 of the DNLU module 1422a may grasp the intent through the deep running based intent classification technique, and it may select the path rule corresponding to the intent from the path rule set. Here, the path rule set may be selected by the path planner module 1423 from the path rule set DB 1424 based on the version information. Further, in response to the request, the parameter tagger 1422a-3 of the DNLU module 1422a may acquire the parameter from the user input. The DNLU module 1422a may transmit the path rule selected by the intent classification manager 1422a-2 in accordance with the request and the parameter acquired from the parameter tagger 1422a-3 to the electronic device 1410 through the communication module 1421.

According to various embodiments of the disclosure, if the MQ level of a certain candidate is equal to or higher than a specific threshold value, the version manager 1422b-3 of the RNLU module 1422b may identify whether the corresponding candidate corresponds to the version information of the application installed in the electronic device 1410. For example, if it is identified that the candidate can support the version of the application, the version manager 1423b-2 may determine the candidate as the path rule to be transmitted to the user, and it may transmit the candidate to the electronic device 1410 together with the parameter acquired from the parameter tagger 1422b-2. If it is identified that the candidate is unable to support the version of the application, the version manager 1422b-3 may transmit a notification indicating that the user input is unable to be processed to the electronic device 1410 instead of the path rule. As another example excluding such a notification, the version manager 1422b-3 may transmit another path rule to the electronic device 1410 instead of the non-supportable path rule (candidate). For example, the version manager 1422b-3 may convert the path rule (candidate) into a path rule to suit the version of the application installed in the electronic device 1410, and it may transmit the converted path rule to the electronic device 1410. Here, the path rule list for the version change may be stored in the path rule set DB 1424 or another storage through the version manager 1422b-3.

Figure 15:
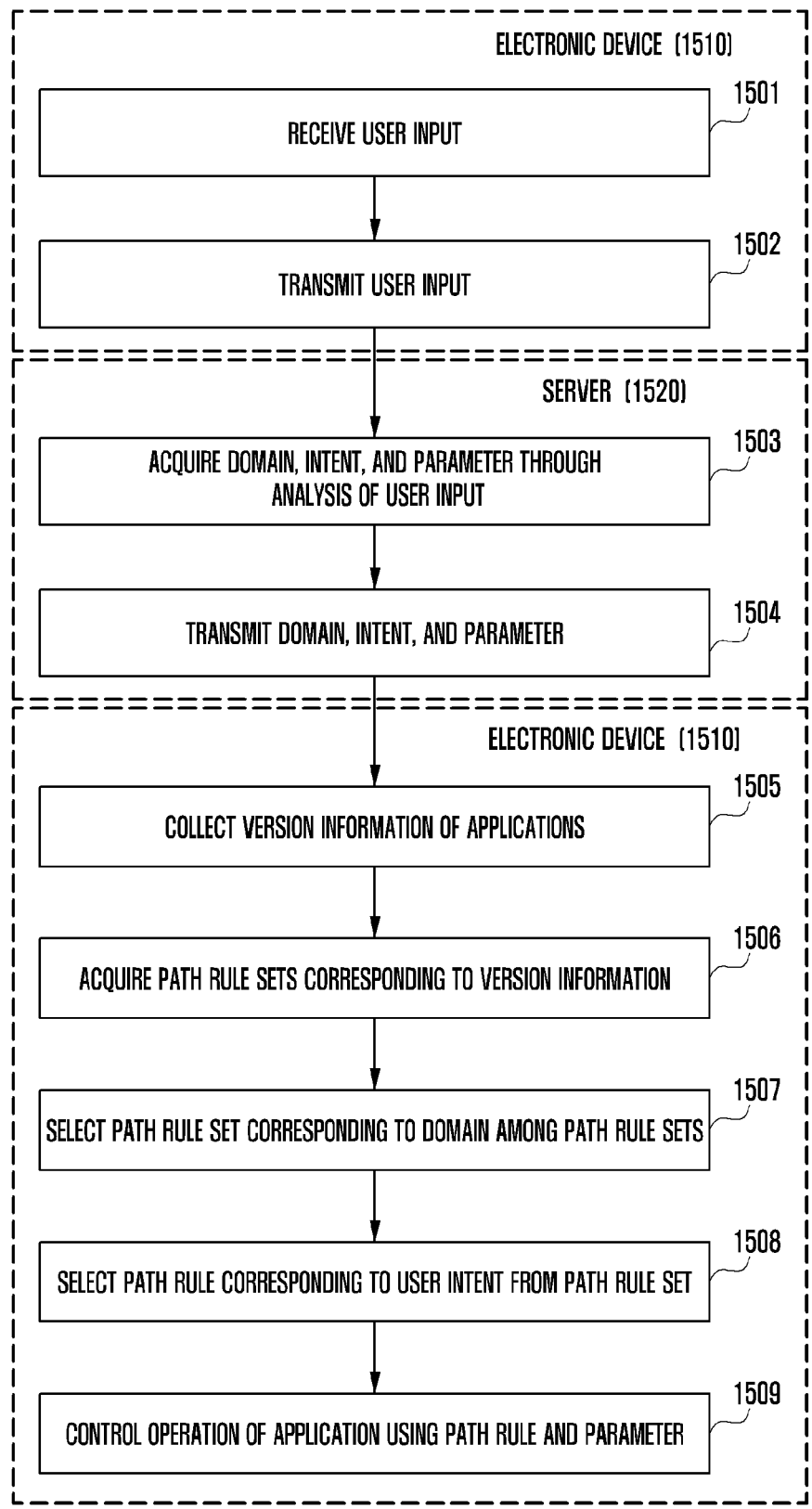
FIG. 15 is a flowchart explaining an agent service method in an integrated intelligence system configured to determine a path rule through an electronic device (user terminal) according to various embodiments of the disclosure.

FIG. 15 is a flowchart explaining an agent service method in an integrated intelligence system configured to determine a path rule through an electronic device (user terminal) according to various embodiments of the disclosure.

With reference to FIG. 15, at operation 1501, a processor of an electronic device 1510 may receive the user input (utterance or touch input) for an application control through an input module (e.g., 110 in FIG. 2). At operation 1502, the processor of the electronic device 1510 may transmit the received user input to a server 1520.

At operation 1503, the server 1520 may send the user input to an NLU module (e.g., 220 in FIG. 4), and it may make it possible to acquire a domain, an intent, and a parameter through analysis of the user input. For example, if the user's request is "Send a text message to mom that I will be late", the domain may be determined as an SMS application, the intent may be determined as "message transmission", and the parameter may be determined as "will be late (contents)" and "mom (recipient)". At operation 1504, the server 1520 may transmit the "domain, intent, and parameter" to the electronic device 1510 as the analysis result of the user input.

At operation 1505, the processor of the electronic device 1510 may collect version information of the applications installed in the electronic device 1510, which can be controlled by an intelligent agent (e.g., 151 in FIG. 2). As not only the version information but also metadata, various pieces of information, such as an area and an operator's name, may be collected. The additionally collected information as described above may be utilized when the path rule set is selected together with the version information. Further, the electronic device 1510 may include a DB including path rule sets corresponding to the respective versions by applications that can be controlled by the intelligent agent.

At operation 1506, the processor of the electronic device 1510 may acquire the path rule sets corresponding to the collected metadata from the DB. At operation 1507, the processor of the electronic device 1510 may select the path rule set corresponding to the domain among the path rule sets acquired from the DB. At operation 1508, the processor of the electronic device 1510 may select the path rule corresponding to the users' intent from the selected path rule set. At operation 1509, the processor of the electronic device 1510 may control the operation of the application using the selected path rule and the parameter to perform the user's request.

Figure 16:
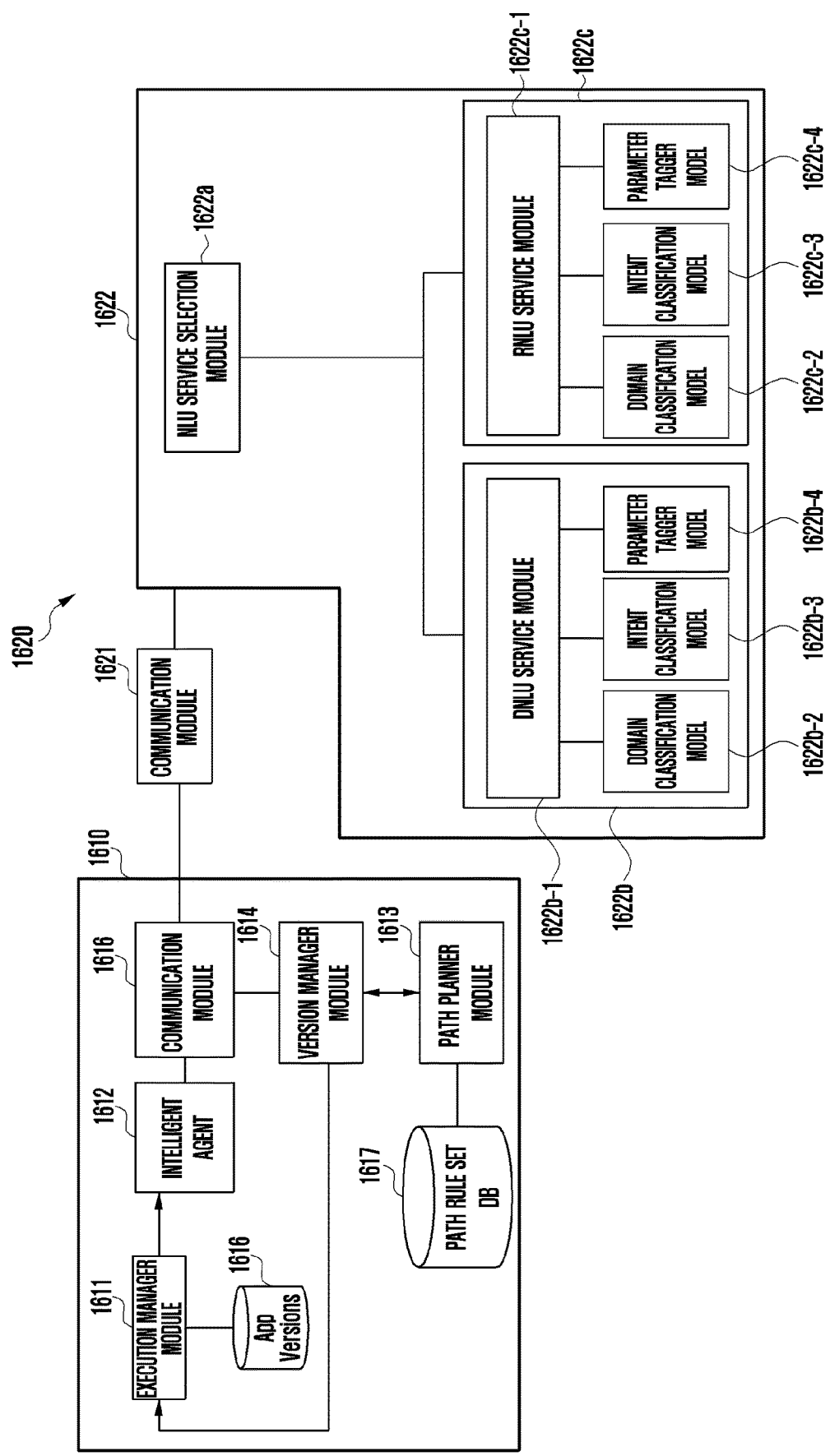
FIG. 16 is a diagram explaining an integrated intelligence system configured to determine a path rule through an electronic device (user terminal) according to various embodiments of the disclosure.

FIG. 16 is a diagram explaining an integrated intelligence system configured to determine a path rule through an electronic device (user terminal) according to various embodiments of the disclosure.

With reference to FIG. 16, according to various embodiments of the disclosure, an execution manager module 1611 of an electronic device 1610 may acquire version information 1615 from applications that can be controlled by the execution manager module 1611 installed in the electronic device 1610. The version information 1615 may be provided from the execution manager module 1611 to a version manager module 1614 in the form of a version set, that is, in the form in which respective version information of the applications are gathered. This information may be transferred to the server 1320 together with the user input after the user input is transferred to the server 1320. As not only the version information but also metadata, various pieces of information, such as an area and an operator's name, may be collected. The additionally collected information as described above may be utilized when the path rule set is selected together with the version information.

According to various embodiments of the disclosure, an intelligent agent 1612 of the electronic device 1610 may transmit the user input for the application control, being received through the input module, to the server 1620 through the communication module 1616 to analyze the user input. According to various embodiments of the disclosure, the path planner module 1613 may be installed in the electronic device 1610, and it may manage a DB including path rule sets corresponding to respective versions by applications that can be controlled by the intelligent agent 1612. According to a certain embodiment, the path planner module 1613 may be located in an external electronic device, for example, in a server 1620, rather than in the electronic device 1610.

According to various embodiments of the disclosure, the electronic device 1610 may manage a path rule set DB 1617, and it may confirm the path rule using the DB 1617. For example, in comparison with the server 1320 of FIG. 13, the amount of operation of the server 1620 can be reduced, a process of registering the version of the application installed in the electronic device 1610 in the server 1620 whenever the version of the application is changed can be omitted, and thus the server 1620 can be efficiently managed.

According to various embodiments of the disclosure, the version manager module 1614 may receive the domain, intent, and parameter from the server 1620 through the communication module 1616 as the analysis result of the user input. The version manager module 1614 may send version information collected from the execution manager module 1611 to the path planner module 1613 to acquire the corresponding path rule sets from the DB. Further, the version manager module 1614 may send the domain to the path planner module 1613 to select one set corresponding to the domain among the acquired path rule sets. Further, the version manager module 1614 may send the user's intent to the path planner module 1613 to select, that is, confirm one path rule from the one selected path rule set. Further, the version manager module 1614 may send the parameter to the execution manager module 1611 together with the confirmed path rule. Accordingly, the execution manager module 1611 may execute the operation corresponding to the user input by controlling the application using the received path rule and the parameter.

According to various embodiments of the disclosure, the path rule confirmed by the version manager module 1614 and the path planner module 1613 may be used as the path rule for controlling the application in the execution manager module 1611. If the path rule that accurately matches the user's intent does not exist in the corresponding set, the intelligent agent 1612 may notify the user that the operation of the application corresponding to the user input is unable to be performed through an output module (e.g., speaker 130 or display 120), or it may notify the user of a hint similar to the user input.

According to various embodiments of the disclosure, the server 1620 may include a communication module 1621 and an NLU module 1622. The NLU module 1622 may include an NLU service selection module 1622a, a DNLU module 1622b, and an RNLU module 1622c, and the respective modules may perform the same functions as those of the respective modules of FIG. 13.

Figure 17:
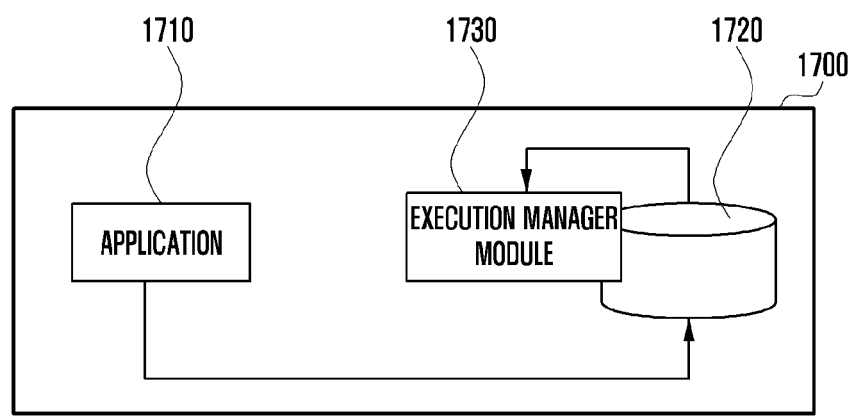
FIG. 17 is a diagram explaining an operation in which an electronic device manages version information an application according to various embodiments of the disclosure.

FIG. 17 is a diagram explaining an operation in which an electronic device manages version information an application according to various embodiments of the disclosure.

With reference to FIG. 17, an application 1710 installed in an electronic device 1700 according to various embodiments of the disclosure may store information necessary for version management in a storage 1720. For example, the application 1710 may store its own version in the storage 1720 as a file of a specific format. The corresponding file may include information on an application name, an application version, or a package name.

According to various embodiments of the disclosure, the execution manager module 1730 may collect the respective version information from all the applications installed in the electronic device 1700. For example, during an initial execution, an execution manager module 1730 may collect metadata including the version information from the storage

1720. When the application is installed, updated, or deleted, the corresponding metadata may be collected in the execution manager module 1730. Further, when a SIM card is changed, the metadata of the application may be collected in the execution manager module 1730.

For example, the application that can be controlled by the intelligent agent may inscribe "PathRuleAppName" on metadata of "androidNanifest.xml". If there are several applications capable of supporting the agent in a single package, it is possible to inscribe the applications in the metadata through discrimination by commas ",", for example, "PathRuleAppName1", "PathRuleAppName2", "PathRuleAppName3". Further, the version information may be configured as PathRuleAppName, packageName, or versionName. During an initial execution, the execution manager module 1730 may collect the version information of the application that can be controlled by the intelligent agent by searching for the metadata of "androidNanifest.xml" and package information. Further, the application may update the changes of the corresponding application information into the storage 1720 during Install/Update/Delete, and the changes of the application may be identified by the execution manager module 1630 even during attachment/detachment of an SD card.

Figure 18:
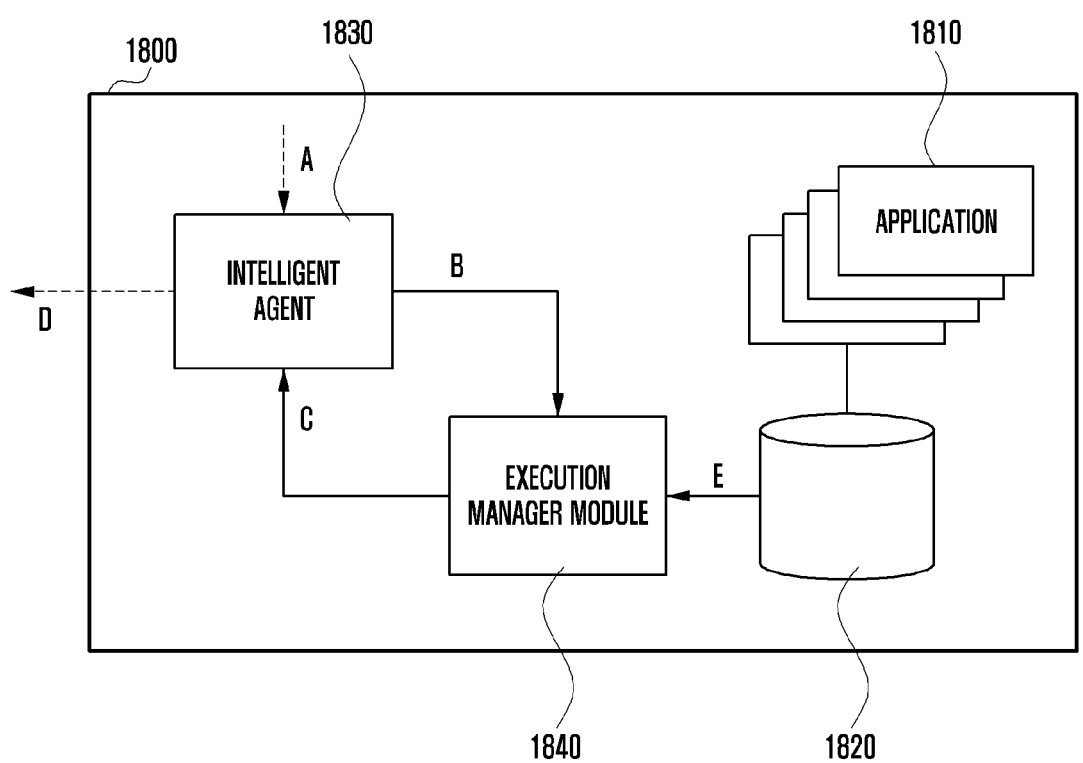
FIG. 18 is a diagram explaining an overall synchronization operation in a version information management method according to various embodiments of the disclosure.

FIG. 18 is a diagram explaining an overall synchronization operation in a version information management method according to various embodiments of the disclosure.

With reference to FIG. 18, in an electronic device 1800 according to various embodiments of the disclosure, applications 1810 that can be controlled by an intelligent agent may manage information necessary for version management in a specific storage 1820 in the form of a file when the applications 1810 are preloaded or installed in the electronic device 1800.

The intelligent agent 1830 according to various embodiments of the disclosure may request (B) the whole synchronization of the applications from an execution manager module 1840 if booting completion of the electronic device 1800, insertion of the SD card into the electronic device 1800, or removal of the SD card from the electronic device 1800 is recognized (A). In response to the request (B), the intelligent agent 1830 may receive (C) the version information of the applications from the execution manager module 1840, and it may transmit (D) the received version information to the server.

The execution manager module 1840 according to various embodiments of the disclosure may collect (E) the version information by accessing the storage 1820 in accordance with the request (B), and it may transmit the collected information to the intelligent agent 1830.

Figure 19:
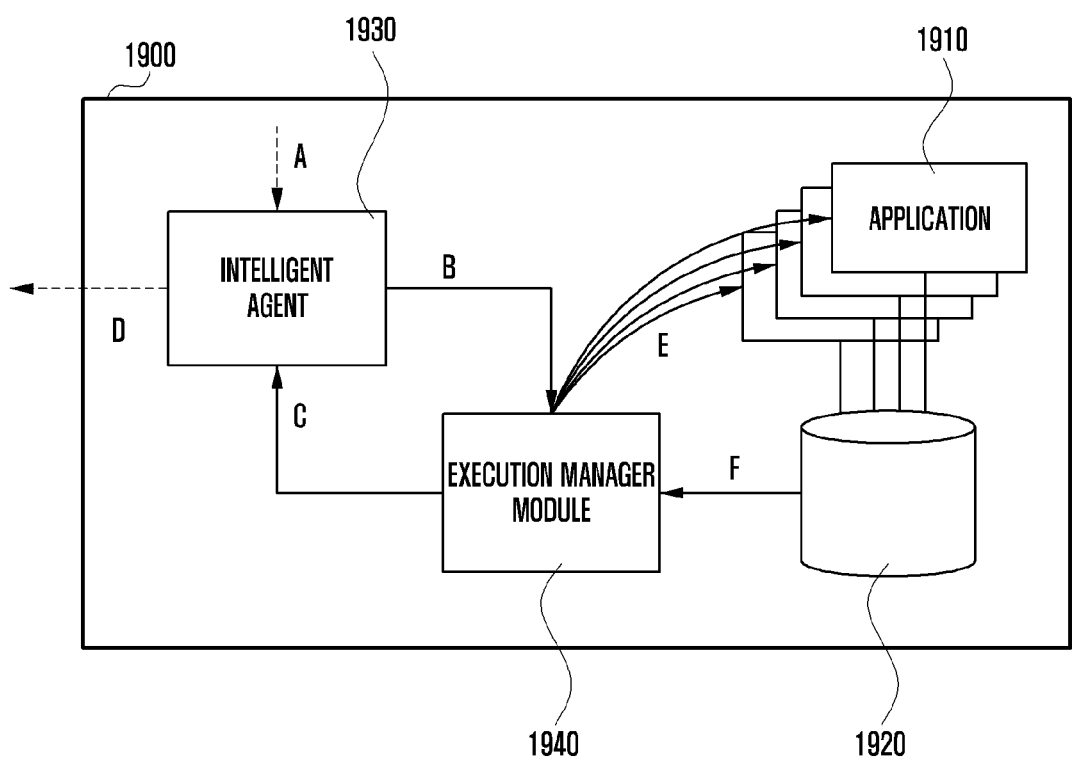
FIG. 19 is a diagram explaining a partial synchronization operation in a version information management method according to various embodiments of the disclosure.

FIG. 19 is a diagram explaining a partial synchronization operation in a version information management method according to various embodiments of the disclosure.

With reference to FIG. 19, according to various embodiments of the disclosure, applications 1910 that can be controlled by an intelligent agent may manage information necessary for version management in a specific storage 1920 in the form of a file when the applications 1810 are preloaded or installed in the electronic device 1900.

The intelligent agent 1930 according to various embodiments of the disclosure may request (B) partial synchronization of the applications from an execution manager module 1940 if change of a SIM card or an initial execution of the agent is recognized (A). In response to the request (B), the intelligent agent 1930 may receive (C) the version information of the applications from the execution manager module 1940, and it may transmit (D) the received version information to the server.

The execution manager module 1940 according to various embodiments of the disclosure may request (E) an update of the version information from the applications 1910 in response to the request (B). The application of which the version information is changed among the applications 1910 may respond to the request (E). Accordingly, the execution manager module 1940 may collect (F) the version information of the application having responded through an access of the storage 1920, and it may transmit (C) the collected information to the intelligent agent 1930.

Figure 20:
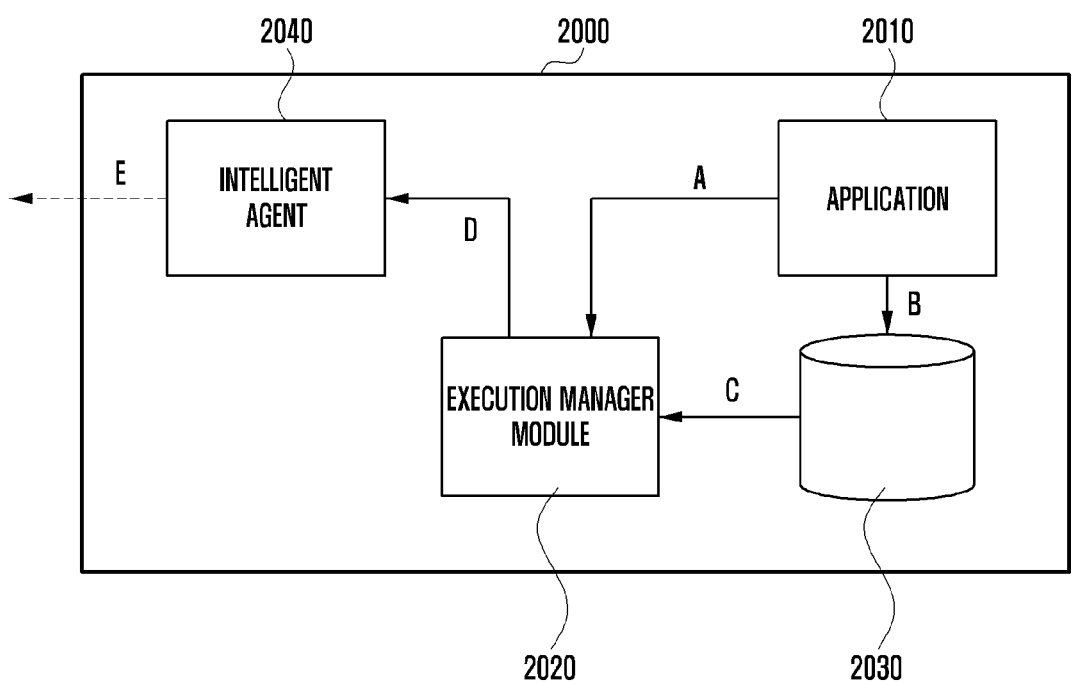
FIG. 20 is a diagram explaining an interaction synchronization operation in a version information management method according to various embodiments of the disclosure.

FIG. 20 is a diagram explaining an interaction synchronization operation in a version information management method according to various embodiments of the disclosure.

With reference to FIG. 20, an application 2010 installed in an electronic device 2000 according to various embodiments of the disclosure may notify (A) an execution manager module 2020 of its changes (installation, update, or deletion). Further, the application 2010 may be information necessary for version management, and it may store (B) the changes in a specific storage 2030 in the form of a file.

The execution manager module 2020 according to various embodiments of the disclosure may be an interact synchronization operation, and it may read (C) version information of the application 2010 by accessing the storage 2030 in response to the notification (A) to transmit (D) the read version information to an intelligent agent 2040.

The intelligent agent 2040 according to various embodiments of the disclosure may transmit (E) the version information received from the execution manager module 2020 to a server.

Figure 21:
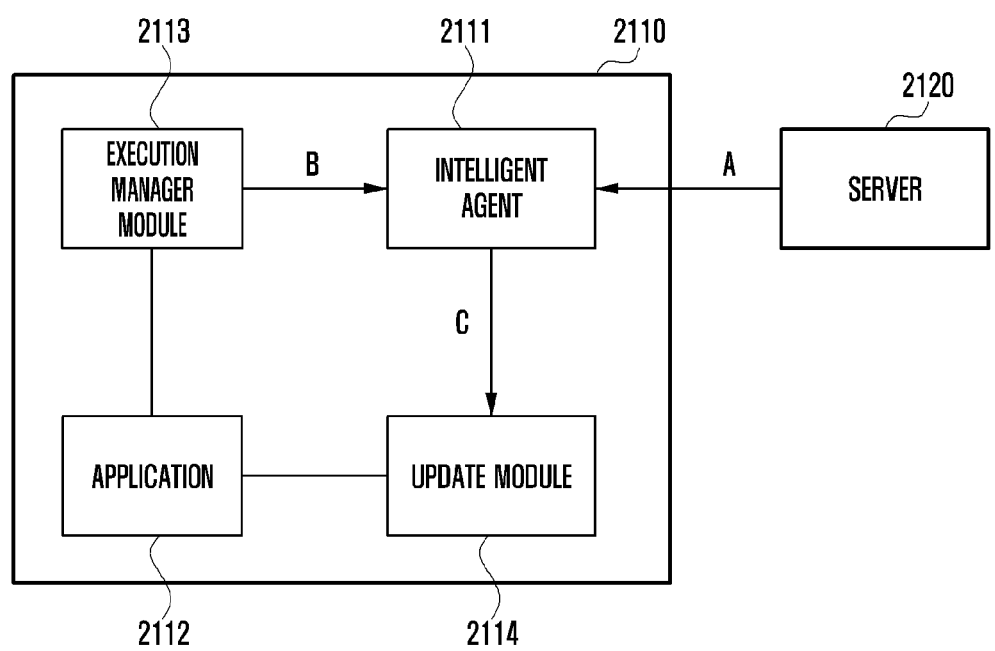
FIG. 21 is a diagram explaining an operation in which an electronic device updates a version of an application according to various embodiments of the disclosure.

FIG. 21 is a diagram explaining an operation in which an electronic device updates a version of an application according to various embodiments of the disclosure.

With reference to FIG. 21, an intelligent agent 2111 of an electronic device 2110 according to various embodiments of the disclosure may receive (A) version information of an application from a server 2120. For example, the received (A) version information may include supportable version information of an agent service. For example, the application can be controlled by the intelligent agent 2111 in the case of Version 2.0 or more, but the application may be unable to be controlled by the intelligent agent 2111 in the case of Version below the Version 2.0. Further, the received (A) version information may include latest version information of the corresponding application. Meanwhile, the supportable version information of the agent service is data related to the corresponding application, rather than the server 2120, and it may be stored in the electronic device 2110. With reference to such data, the intelligent agent 2111 may grasp whether the version of the corresponding application installed in the electronic device 2110 is a version that can support the agent service.

The intelligent agent 2111 may collect (B) the version information of the application 2112 installed in the electronic device 2110 through the execution manager module 2113. The intelligent agent 2111 may grasp whether the version of the application 2112 is the latest version through comparison of the received (A) version with the collected (B) version. Further, the intelligent agent 2111 may grasp whether it is necessary to update the application 2112 through the above-described comparison. For example, if the minimum version that can be controlled by the intelligent agent 2111 is Version 2.0, and the version of the application 2112 installed in the electronic device 2110 is Version 1.0, the intelligent agent 2111 may determine that the update of the application 2112 is necessary.

An update module 2114 according to various embodiments of the disclosure may receive (C) an update request for the application 2112 of the intelligent agent 2111. For example, as a response to the update request, the update module 2114 may update the application 2112 through downloading of the latest version of the application 2112 from an external electronic device (e.g., application providing server).

According to various embodiments of the disclosure, version fragmentation of the application can be prevented by updating the application 2112 as described above. Further, according to various embodiments of the disclosure, because the application 2112 is automatically updated, it is possible to provide the user with an agent service in which the function of the application 2112 can be controlled by the intelligent agent 2111.

According to various embodiments of the disclosure, versions of all applications that can be controlled by the intelligent agent 2111 are integrally managed, and thus it is possible to perform the version update at a time or to perform the update of partial applications.

According to various embodiments of the disclosure, if the version of a specific application is a version that is unable to support the agent service when the intelligent agent 211 is initially driven, the agent service may be started after the update module 2112 performs the version update of the application into the latest version supporting the agent service.

Figure 22:
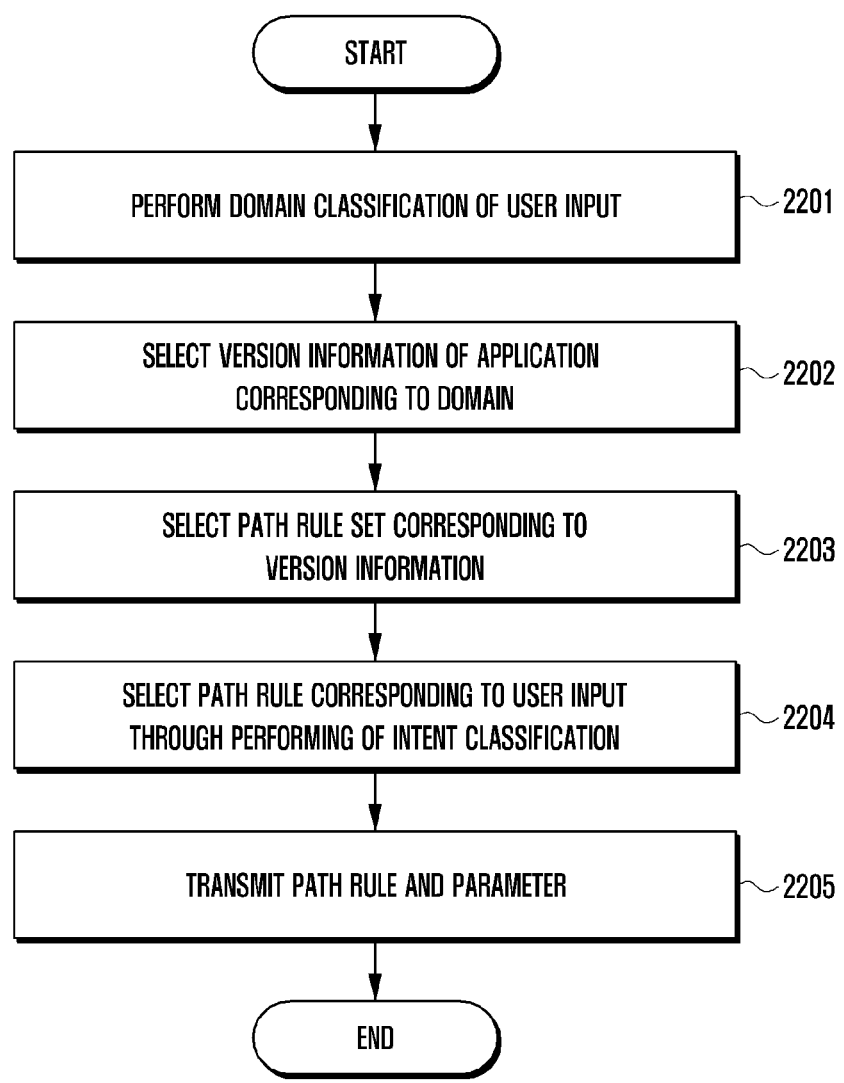
FIG. 22 is a flowchart explaining operations of a server for an agent service based on version information of an application in an integrated intelligence system according to various embodiments of the disclosure.

FIG. 22 is a flowchart explaining operations of a server for an agent service based on version information of an application in an integrated intelligence system according to various embodiments of the disclosure.

With reference to FIG. 22, at operation 2201, a server (e.g., 200 in FIG. 2) may perform domain classification through sending of the user input received from an electronic device (e.g., 100 in FIG. 2) to an NLU module (e.g., 220 in FIG. 4). The NLU module may first perform the domain classification of the user input in analyzing the user input. This may be a process in which it is determined what domain the user input belongs to.

At operation 2202, the server may transfer the domain of the user input to the path planner module (e.g., 230 in FIG. 4) to select the version information of the application corresponding to the domain. That is, the path planner module may select the version information of the application corresponding to the domain among the version information of the applications received from the electronic device. For example, the version information received from the electronic device may be Call Application ver 1.1, Health Application ver 2.1, SMS Application ver 4.0, and among them, the version information corresponding to the domain may be SMS Application ver 4.0.

At operation 2203, the server may control the path planner module to select the path rule set corresponding to the selected version information from the DB. For example, the path planner module may select SMS Application ver 4.0 rule set. Information received from the electronic device may include not only the version information but also various pieces of information, such as an area and an operator's name, as metadata. The metadata may be utilized during selection of the path rule set together with the selected version information.

At operation 2204, the server may send the selected path rule set to the NLU module to select the path rule corresponding to the user input through performing of intent classification. That is, in analyzing the user input, the NLU module may perform the intent classification after domain classification of the user input. This may be a process in which the path planner module selects at least one path rule corresponding to the user's intent from the path rule set selected to suit the domain of the user input. For example, if the user speaks "Send me a text message", the NLU module may determine that the corresponding speech belongs to the SMS domain through the domain classification. The path planner module may provide the path rule set corresponding to the SMS domain to the NLU module for the intent classification. For example, the path planner module may provide the path rule set corresponding to the version of the SMS application installed in the electronic device among the SMS path rule sets to the NLU module. The NLU module may grasp the user's intent through analysis of the user input, and it may confirm the path rule corresponding to the grasped intent in the set provided from the path planner module.

At operation 2205, the server may transmit the parameter extracted from the user input through the parameter classification to the electronic device together with the path rule so that the electronic device executes the operation of the application.

Figure 23:
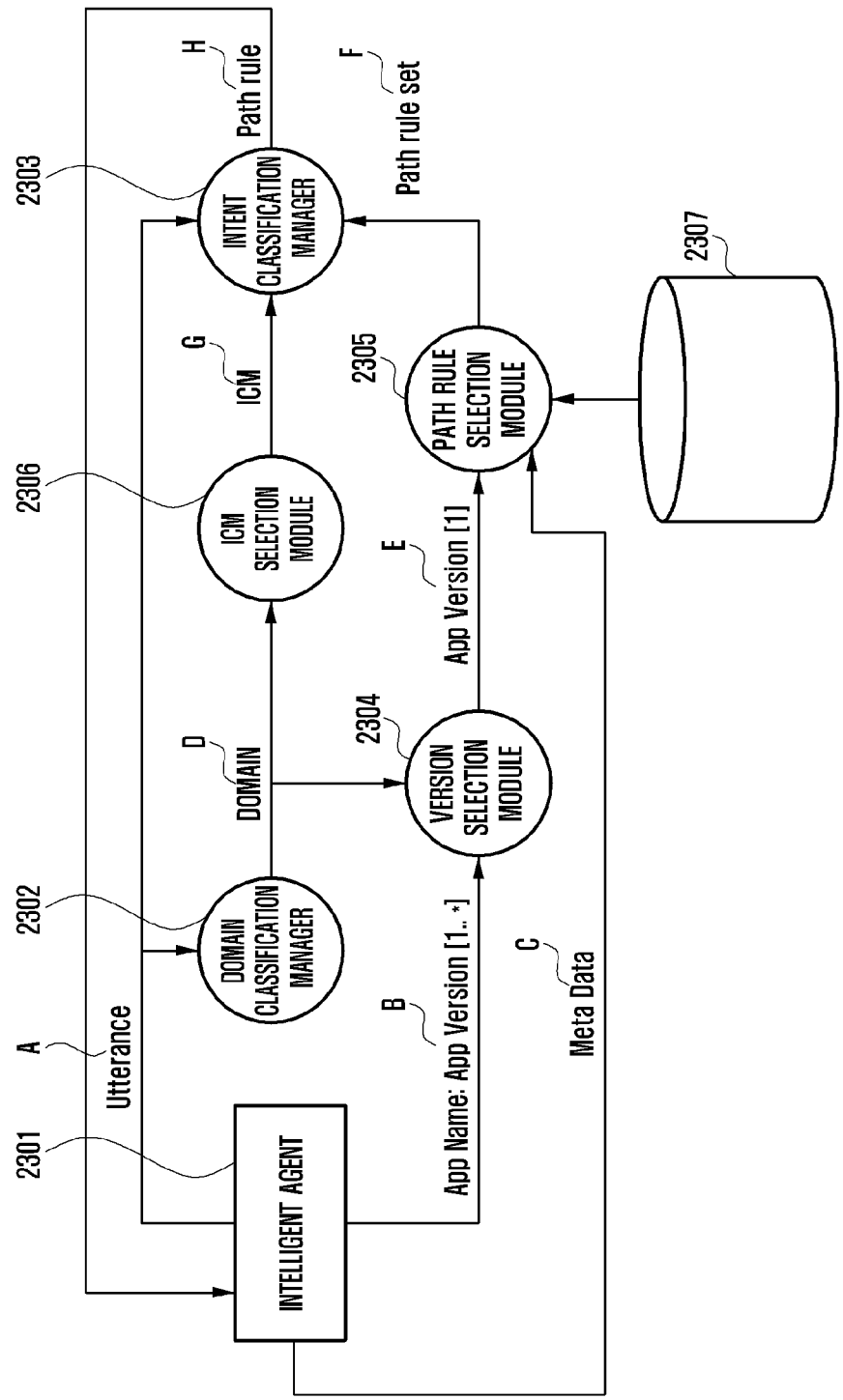
FIG. 23 is a diagram illustrating a process in which a user input and application version information are being changed to a path rule in an integrated intelligence system according to various embodiments of the disclosure.

FIG. 23 is a diagram illustrating a process in which a user input and application version information are being changed to a path rule in an integrated intelligence system according to various embodiments of the disclosure.

With reference to FIG. 23, an intelligent agent 2301 according to various embodiments of the disclosure may transmit a user input, for example, utterance (A), to a domain classification manager 2302 and an intent classification manager 2303. Further, the intelligent agent 2301 may transmit version information (B) of applications to a version selection module 2304. In addition, the intelligent agent 2301 may transmit metadata (C) to a path rule set selection module 2305. Table 3 below shows an example of the metadata (C).

TABLE 3

| Path Rule set name | Product | region | country | Sales code | App name | App version |
|---|---|---|---|---|---|---|
| Gallery_Dream_OTHERS_D1 | Sch-M380 | OTHERS | US | VZW | Gallery | 3.1.1 |

As shown in Table 3, metadata (C) may include not only version information of applications but also various pieces of information, such as an area and an operator model name, and it may be used to select a path rule set. For example, even if SMS applications have the same version information, there may be a difference between a supportable path rule and a non-supportable path rule in accordance with communication operators. In addition to the version information of the application, other information may be collected from the metadata (C), and it may be considered during selection of the path rule.

The domain classification manager 2302 according to various embodiments of the disclosure may determine the domain (D) of the utterance (A), and it may transfer the determined domain to the version selection module 2304 and an ICM selection module 2306.

The version selection module 2304 according to various embodiments of the disclosure may select version information (E) corresponding to the domain (D) among the version information (B). That is, if the domain (D) is, for example, an SMS application even in the case where the intelligent agent 2301 transmits, for example, the version information of all the applications installed in the electronic device, the version selection module 2304 may select only the version information (E) of the SMS application, and it may transfer the selected version information to a path rule set selection module 2305.

The path rule set selection module 2305 according to various embodiments of the disclosure may select the path rule set corresponding to the version information (E) from a path rule set DB 2307. In addition, the path rule set selection module 2305 may consider the metadata (C) during selection of the path rule set. For example, the path rule set selection module 2305 may finally select the path rule set (F) matching the metadata (C) (e.g., an area and an operator's name) among the path rule sets corresponding to the version information (E).

The ICM selection module 2306 according to various embodiments of the disclosure may select one intent classification manager (ICM) among given ICMs using the domain (D), and it may transfer its identification information (G) to the intent classification manager 2303. Further, the intent classification manager 2303 may perform the intent classification for the utterance (A) using the ICM corresponding to the identification information (G), and thus the path rule set (F) may confirm the path rule (H) corresponding to the user's intent to transmit the path rule to the intelligent agent 2301.

According to an embodiment, the intelligent agent 2301 may be a constituent element of the user terminal, and the remainders 2302 to 2307 may be constituent elements of an intelligent server. In a certain embodiment, at least parts of the remainders 2302 to 2307 may be provided in the user terminal.

Figure 24:
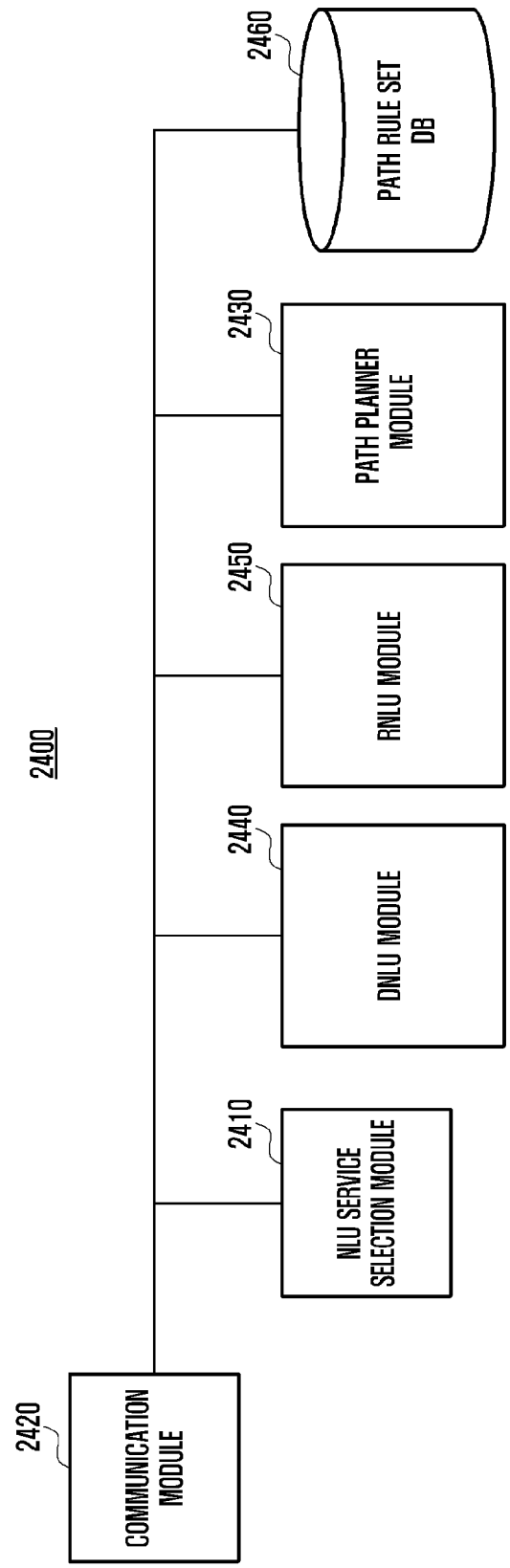
FIG. 24 is a diagram explaining an operation in which a server of an integrated intelligence system extracts a path rule set for each version according to various embodiments of the disclosure.

FIG. 24 is a diagram explaining an operation in which a server of an integrated intelligence system extracts a path rule set for each version according to various embodiments of the disclosure.

With reference to FIG. 24, a server 2400 according to various embodiments of the disclosure may include an NLU service selection module 2410, a communication module 2420, a path planner module 2430, a DNLU module 2440, an RNLU module 2450, and a path rule set DB 2460.

According to various embodiments of the disclosure, the NLU service selection module 2410 may select one of the DNLU module 2440 and the RNLU module 2450 as a module to analyze the user input. Further, the NLU service selection module 2410 may receive version information of applications from an electronic device (e.g., 100 in FIG. 1) through the communication module 2420. The NLU service selection module 2410 may select a corresponding path rule set through sending of the version information of the applications to the path planner module 2430, and it may transmit the selected path rule set to the selected analysis module. Further, the NLU service selection module 2410 may send the user input received from the electronic device through the communication module 2420 to the selected analysis module to select the path rule corresponding to the user input from the path rule set selected by the path planner module 2430.

According to various embodiments of the disclosure, the path planner module 2430 may manage the path rule set DB 2460 including the path rule set corresponding to the respective versions by applications. The path planner module 2430 may acquire the path rule set corresponding to the version information of the application installed in the electronic device from the DB 2460, and it may provide the acquired path rule set to the selected analysis module. In addition, in the DB 2460, the path rule sets may be managed by not only the version information but also other information (e.g., an area and an operator's name).

According to various embodiments of the disclosure, the operation in which the DNLU module 2440 confirms the path rule corresponding to the user input may be divided into a domain classification model (e.g., 1322b-2 in FIG. 13), an intent classification model (e.g., 1322b-3 in FIG. 13), and a parameter tagger model (e.g., 1322b-4), and such models may be successively performed.

According to various embodiments of the disclosure, the operation in which the RNLU module 2450 confirms the path rule corresponding to the user input may be divided into a domain classification model (e.g., 1322c-2), an intent classification model (e.g., 1322c-3), and a parameter tagger model (e.g., 1322c-4), and such models may be successively performed. Here, at least one operation (e.g., intent classification operation) may be performed by the DNLU module 2440.

As various kinds of applications are provided and version-upgraded, fragmentation of the path rule may be increased. Due to this, an amount of operation that is rapidly increased for the path rule confirmation may cause a burden in an integrated intelligence system. Further, this may cause a speed deterioration of the operation result. Further, if the fragmentation caused by the version becomes severer, the probability to select an accurate path rule may also be lowered in inverse proportion thereto. According to various embodiments of the disclosure to manage various versions of various applications, the domain in a domain classification model (e.g., 2442 or 2452) may be fixedly operated without any change even if the version of the application is changed. In a parameter tagger model (e.g., 2444 or 2454), the parameter may also differ in accordance with the user input, but it may be fixedly operated without any change even if the version of the application is changed. In an intent classification model (e.g., 2443 or 2453), the intent may be changed in accordance with the version of the application. For example, the path rule sets may be managed as one superset by domains. Further, the path rule sets in one superset may be managed as a plurality of subsets being divided by versions of the applications. Accordingly, the DNLU service module 2441 or the RNLU service module 2451 may discriminate subsets supporting the path rule corresponding to the intent and subsets non-supporting the path rule from each other with reference to the version information of the applications. Further, the DNLU service module 2441 or the RNLU service module 2451 may select the path rule corresponding to the intent from the subset corresponding to the version information of the application.

Figure 25:
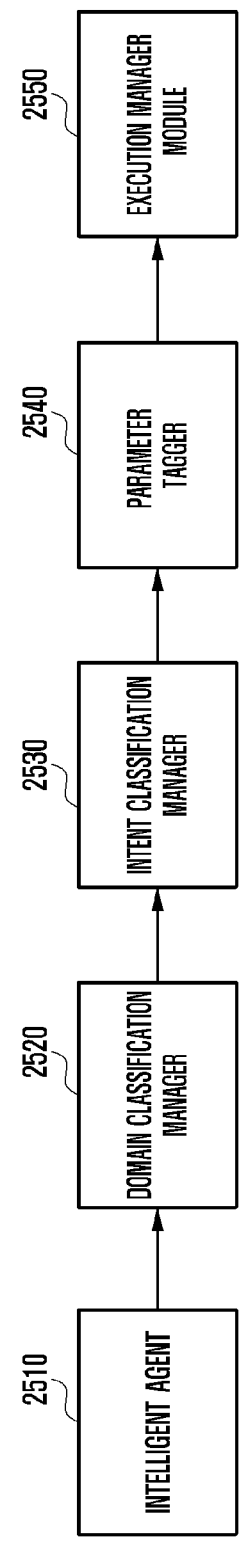
FIG. 25 is a diagram explaining an intent classification operation for each version in an integrated intelligence system according to various embodiments of the disclosure.

FIG. 25 is a diagram explaining an intent classification operation for each version in an integrated intelligence system according to various embodiments of the disclosure.

With reference to FIG. 25, an intelligent agent 2510 according to various embodiments of the disclosure may transmit user's speech and version information of an application to a domain classification manager 2520 as a user input.

The domain classification manager 2520 according to various embodiments of the disclosure may determine a domain of the user input. Information indicating a path rule corresponding to the determined domain, a parameter, and support/non-support by versions may be arranged and managed by an intelligent server as in Table 4 below. In Table 4, KT and SKT may call names of communication operators. For example, in Version 1.0, the same path rule may be applied for the application of the corresponding domain regardless of the communication operator, whereas in Version 1.1, the applied path rule may differ in accordance with the communication operator to which the corresponding electronic device subscribes.

TABLE 4

| Domain | Utterance | Path rule | Parameter | Version 1.0 | Version 1.1_KT | Version 1.1_SKT |
|---|---|---|---|---|---|---|
| Text message service | Send laughing emoticon with text message. | R1 | st1 | ○ | X | ○ |
| | Send awkwardly laughing emoticon with text message. | R2 | st2 | ○ | X | ○ |
| | Send loudly laughing emoticon with text message. | R3 | st3 | ○ | X | X |
| | Send cash emoticon with text message | R4 | st4 | ○ | ○ | X |

As shown in Table 4, the domain may be fixed without any change for each version of the corresponding application. Accordingly, if the domain classification manager 2520 determines the domain of the user input as a text message service, path rules R1, R2, R3, and R4 having the same "text message service" may be selected for intent classification.

The intent classification manager 2530 according to various embodiments of the disclosure may grasp the intent through analysis of the user input, and it may select the path rule corresponding to the intent. During selection of the path rule, version information may be considered. For example, if the version information received from the intelligent agent 2510 is Ver 1.1_SKT, the intent classification manager 2530 may select the path rule R2 supporting this as the path rule corresponding to the user input. If the received version information is Ver_1.1_KT, the selected path rule R2 is not supported in the version of the corresponding application, and thus a message indicating that it is not possible to perform an agent service corresponding to the user input may be shown to the user.

A parameter tagger 2540 according to various embodiments of the disclosure may extract a parameter from the user input, and it may tag the extracted parameter onto the path rule selected by the intent classification manager 2530. The parameter may have a fixed value that is not changed with respect to the respective path rules. For example, if the path rule R2 is selected, "st2 (laughing emoticon)" may be selected as the parameter to be tagged onto R2. Finally, the path rule R2 and the parameter tagged onto the path rule may be transferred to the execution manager module 2550 to execute the operation of the application.

According to an embodiment, the intelligent agent 2510 and the execution manager module 2550 may be constituent elements of the user terminal, and the remainders 2520 to 2540 may be constituent elements of the intelligent server. In a certain embodiment, at least parts of the remainders 2520 to 2540 may be provided in the user terminal.

Figure 26:
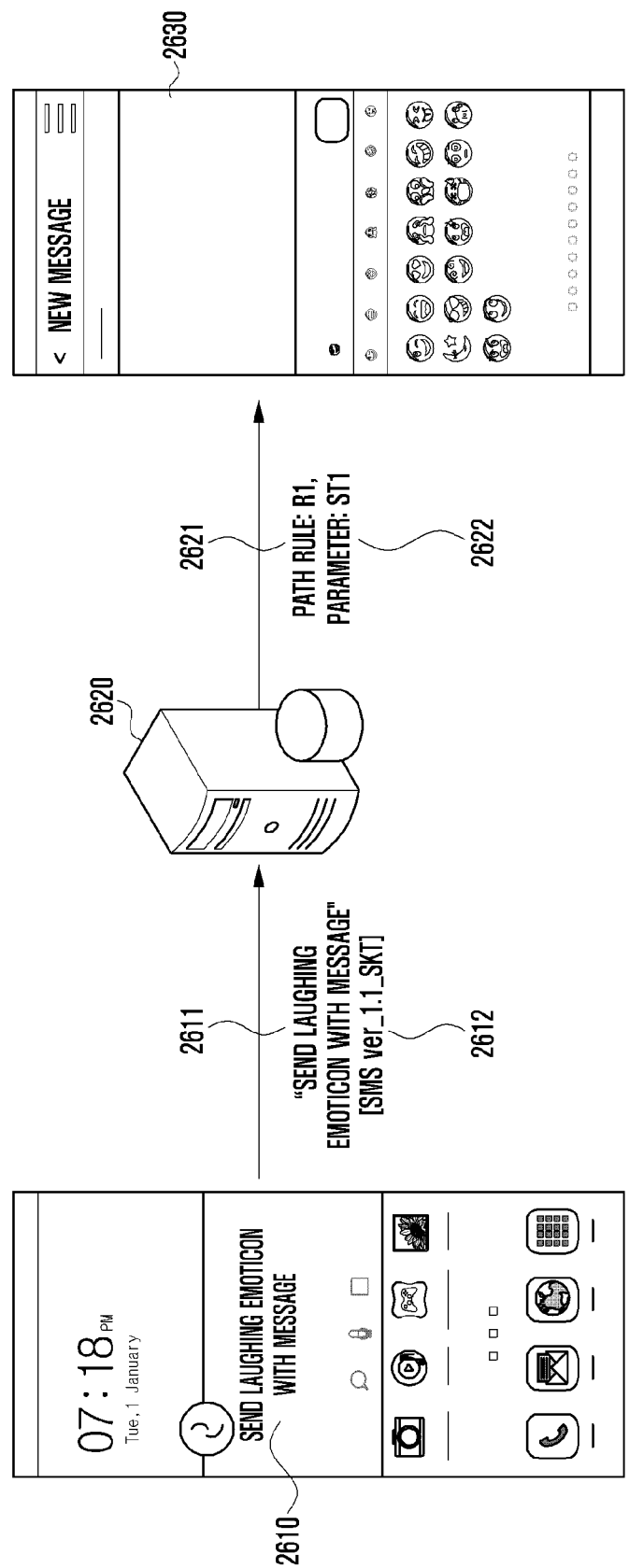
FIG. 26 is a diagram explaining an example of an operation in which an integrated intelligence system processes a user input for each version according to various embodiments of the disclosure.

FIG. 26 is a diagram explaining an example of an operation in which an integrated intelligence system processes a user input for each version according to various embodiments of the disclosure.

With reference to FIG. 26, an electronic device according to various embodiments of the disclosure may receive a user's speech, for example, "Send me a laughing emoticon with a text message" through an input module as a user input. The electronic device may convert the speech into a text 2610 to be displayed on a display. The user input 2611 may be transferred to an intelligent server 2620 to search for a matching path rule, and for this, version information of an SMS application installed in the electronic device, for example, "SMS ver_1.1_SKT" 2612, may be transferred to the intelligent server 2620. Not only the version information of the SMS application but also version information of all applications installed in the electronic device and controllable by the intelligent agent may be transmitted to the intelligent server 2620.

The intelligent server 2620 according to various embodiments of the disclosure may search for the path rule matching the corresponding speech. When the path rule is searched for, version information "SMS ver 1.1_SKT" may be considered, and for example, as shown in Table 4, R1 supporting "SMS ver 1.1_SKT" may be confirmed as the path rule matching the speech. The intelligent server 2620 may transmit the confirmed path rule 2621 and the matching parameter 2622 (e.g., st1 (laughing emoticon)) to the electronic device. The electronic device may control the application based on the received path rule and the parameter to display the corresponding execution screen 2630 on the display.

Figure 27:
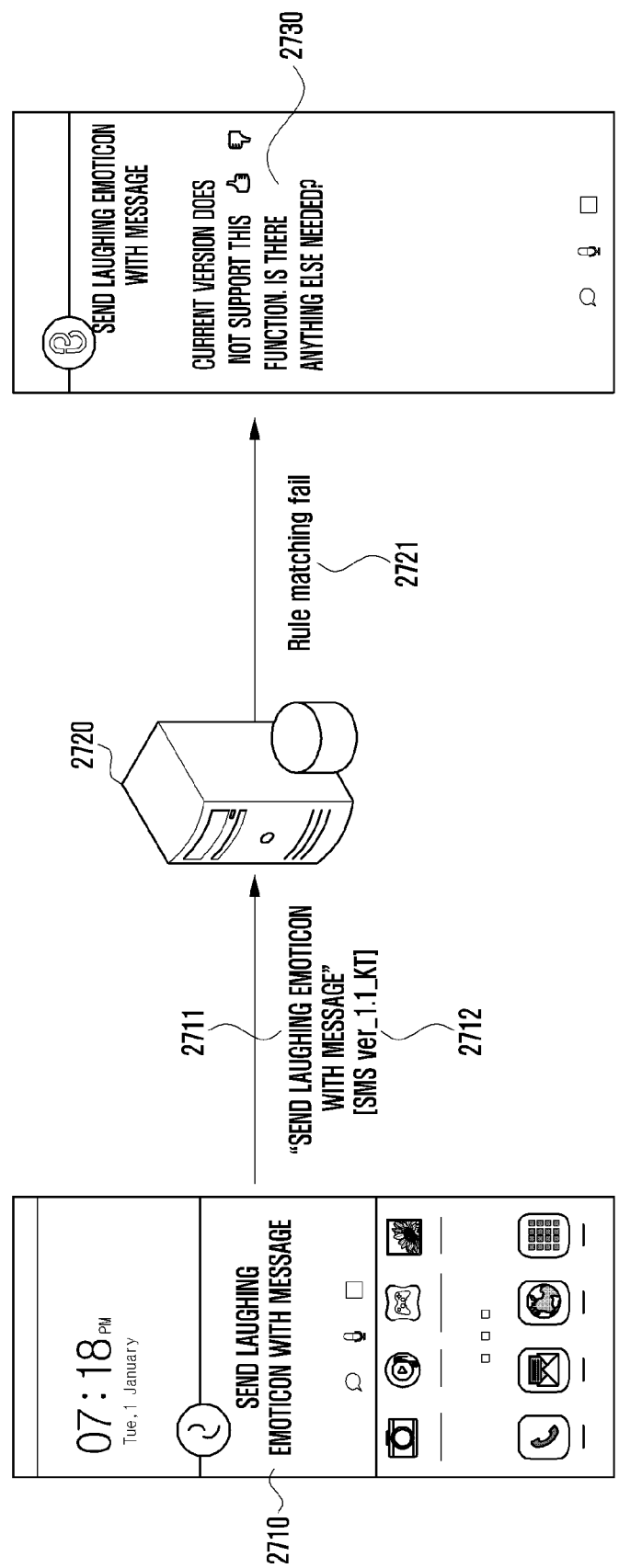
FIG. 27 is a diagram explaining another example of an operation in which an integrated intelligence system processes a user input for each version according to various embodiments of the disclosure.

FIG. 27 is a diagram explaining another example of an operation in which an integrated intelligence system processes a user input for each version according to various embodiments of the disclosure.

With reference to FIG. 27, an electronic device according to various embodiments of the disclosure may receive a user's speech, for example, "Send me a laughing emoticon with a text message" through an input module as a user input. The electronic device may convert the speech into a text 2710 to be displayed on a display. The user input 2711 may be transferred to an intelligent server 2720 to search for a matching path rule, and for this, version information of an application installed in the electronic device, for example, "SMS ver 1.1_KT" 2712, may be transferred to the intelligent server 2720.

The intelligent server 2720 according to various embodiments of the disclosure may search for the path rule matching the speech. For example, with reference to Table 4, R1 may be searched for as the path rule matching the speech. The intelligent server may determine that the searched R1 is the path rule that does not support "SMS ver 1.1 KT". Accordingly, the intelligent server 2720 may transmit a notification 2721 indicating that the user input is unable to be processed to the electronic device. The electronic device may display a message 2730 related to the notification 2721 on the display. In addition, the electronic device may present other similar instructions through the display to allow the user to perform the instructions, or if the corresponding function can be performed through software upgrade, the electronic device may present a version upgrade of the corresponding application to the user through the display.

According to various embodiments of the disclosure, the intent may be a specific path rule that the user desires to execute. For example, with reference to Table 4, it is assumed that there are four specific functions desired by the user. If the corresponding functions are "Send a laughing emoticon with a text message", "Send an awkwardly laughing emoticon with a text message", "Send a loudly laughing emoticon with a text message", and "Send a cash emoticon with a text message", path rules R1, R2, R3, and R4 corresponding to the respective functions may exist. The corresponding path rules may be composed of the execution order of states.

The intent classification manager according to various embodiments of the disclosure may perform a function desired by the user among the corresponding intents, that is, a function of discriminating what is the path rule. In the intent classification manager, the intent may be changed in accordance with the version of the application, and the intent belonging to one domain may be in the form of a superset, and a supporting path rule and a non-supporting path rule may exist as a subset for each version. Accordingly, the intent may be divided into a supporting path rule and a non-supporting path rule to be stored in accordance with the version.

According to various embodiments of the disclosure, the domain may be a set of similar intents. For example, applications, such as SMS, Kakao Talk, LINE, and Facebook messenger, may belong to the domain of the text message service. For example, even if the version of the SMS application is changed from 1.0 to 2.0, the domain of the SMS application may be fixed to, for example, "text message service".

According to various embodiments of the disclosure, the parameter (slot) may mean a condition to go on to a next state and information to be input from the user on the corresponding screen. For example, in order for the user to send a message to anyone, the parameter may be divided into a mandatory item and an optional item. For example, in the parameter to be tagged onto the path rule of which the intent is "message transmission", the "recipient" may be classified into a mandatory item as a condition to go on to the next state. The "main text" may be classified into a mandatory item as information (e.g., message contents) to be input from the user, and the "attached file" may be classified into an optional item. The recipient may be a user's name or a phone number, and the main text may be replaced by several kinds of items. The condition of such a parameter may be defined in a path rule DB, and using this, the application may check mandatory conditions to go on to the next stage of the operation. For example, with reference to Table 4, the parameter may be set as a value that is dependent to the path rule and is not changed.

Table 5 below exemplifies that parameters that can be tagged onto a path rule of which the intent is "message send" are classified into mandatory items (M) and an optional items (O).

TABLE 5

Message Send

| Group 1 | | | Parameter | |
|---|---|---|---|---|
| Group Name | M/O | Logic | Parameter Name | M/O |
| Receiver | M | Radio | Contact Name | O |
| | | | Phone Number | O |
| Mandatory | M | Plain | text | O |
| | | | emoticon | O |
| | | | Camera | O |
| | | | image | O |
| | | | video | O |
| | | | audio | O |
| | | | calendar | O |
| | | | memo | O |
| | | | contact | O |
| | | | cloud server | O |
| | | | Voice Recorder | O |
| | | | Location | O |
| | | | Slide show | O |
| Optional | O | Plain | Subject | O |
| | | | Scheduled (date/time) | O |

An artificial intelligence system is a computer system implementing human-level intelligence, and it is a system in which a machine learns and determines by itself, and a recognition rate is improved with the use thereof.

The artificial intelligence technology may be composed of element technologies that copy functions of recognition, determination, and the like of a human brain utilizing a deep learning technology and a deep learning algorithm using an algorithm for self-classifying/learning features of input data.

For example, the element technologies may include at least one of linguistic understanding technology to recognize human language/text, visual understanding technology to recognize things like human eyesight, deduction/prediction technology to determine, logically deduce and predict information, knowledge expression technology to process human experience information as knowledge data, autonomous driving of a vehicle, or operation control technology to control movement of a robot.

The linguistic understanding is a technology to recognize and apply/process human language/text, and it may include natural language processing, machine translation, dialogue system, inquiry response, and speech recognition/synthesis. The visual understanding is a technology to recognize and process things like human eyesight, and it may include object recognition, object trace, video search, human recognition, scene understanding, space understanding and video improvement. The deductive prediction is a technology to determine, logically deduce, and predict information, and it may include knowledge/probability based deduction, optimization prediction, preference based plan, and recommendation. The knowledge expression is a technology to automatically process human experience information as knowledge data, and it may include knowledge establishment (data generation/classification), and knowledge management (data utilization). The operation control is a technology to control the vehicle autonomous driving or robot motion, and it may include motion control (navigation, collision, or driving) and operation control (behavior control).

According to various embodiments of the disclosure, an integrated intelligence system may support NLU using various deep learning techniques, that is, deep NLU (DNLU) module. The DNLU module according to various embodiments of the disclosure is an intent classification manager for selecting the path rule through grasping of a user's intent, and it may include a separate intent classification manager (SICM), a conditional ICM (CICM), a version layered ICM (VLICM), or a separate VLICM (SVLICM). The DNLU modules may learn selection of a path rule with respect to the user input using such ICMs. If the user input corresponding to the non-learned path rule enters into the DNLU module, the DNLU module may select the path rule having high similarity among the supported path rules as the resultant value, and it may transmit the selected path rule to the user terminal. As an alternative, there is a possibility that the operation of the application in accordance with the path rule is recognized by the user as an abnormal operation, and if the user input corresponding to the non-learned path rule is received, the DNLU module may transmit a message for the corresponding state to the user terminal without transmitting the selected path rule to the user terminal.

Figure 28:
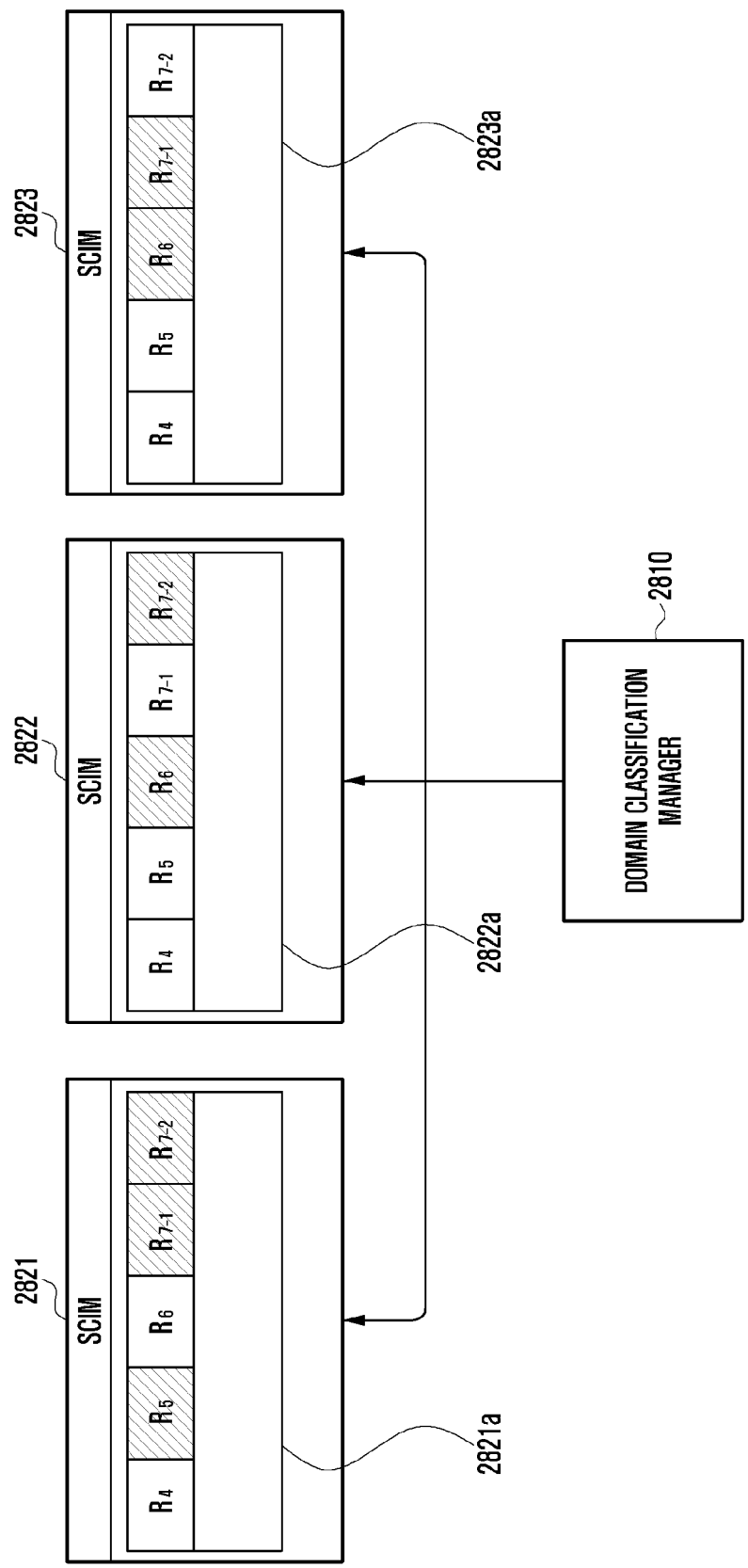
FIG. 28 is a diagram explaining operation in which an integrated intelligence system selects a path rule using a separate intent classification manager (SICM) according to various embodiments of the disclosure.

FIG. 28 is a diagram explaining operation in which an integrated intelligence system selects a path rule using an SICM according to various embodiments of the disclosure.

The integrated intelligence system according to various embodiments of the disclosure may include a plurality of SICMs that are learned through division by versions of applications.

With reference to FIG. 28, a domain classification manager 2810 according to various embodiments of the disclosure may determine the domain of the user input. Further, the domain classification manager 2810 may receive version information of the application corresponding to the domain from the user terminal. The domain classification manager 2810 may receive version information of a plurality of applications from the user terminal, and it may select the version information corresponding to the domain among the plurality of applications. The domain classification manager 2810 may transmit the user input to an SICM corresponding to the received version information (or selected version information) among a plurality of SICMs 2821, 2822, and 2833.

Each of the SICMs 2821, 2822, and 2833 according to various embodiments of the disclosure is identified by the version of the application, and it may define a path rule set. For example, a first path rule set 2821a is generated when the version of the application is Version 1.0, a second path rule set 2822a is generated when the version of the application is upgraded to Version 2.0, and a third path rule set 2823a is generated when the version of the application is upgraded to Version 3.0.

According to various embodiments of the disclosure, path rules in the respective path rule sets may be managed and divided into path rules supported by the application of the corresponding version (to process the user input) and non-supportable path rules by the corresponding SICM. For example, in the case of the first path rule set 2821a, R4 and R6 among the path rules are supportable path rules, and R5, R7-1, and R7-2 are non-supportable path rules. In the case of the second path rule set 2822a, R4, R5, and R7-1 may be supportable, and the remainders may be non-supportable. In the case of the third path rule 2823a, R4, R5, and R7-2 may be supportable, and the remainders may be non-supportable.

According to an embodiment, if the first SICM 2821 is selected to analyze the intent of the user input through the domain classification manager 2810, and the path rule R4 or R6 is selected by the first SICM 2821, the path rule R4 or R6 may be transmitted to the user terminal. For example, because the version of the SMS application selected by the domain classification manager 2810 is Version 1.0, the user input may be transmitted to the first SICM 2821, and the path rule corresponding to the user input may be supportable R4 or R6 as the analysis result of the first SICM 2821. Further, if non-supportable R5, R7-1, or R7-2 is selected as the path rule corresponding to the user input as the analysis result of the first SICM 2821, the path rule may not be transmitted to the user terminal, and other information (e.g., message indicating that the user input is unable to be processed or message guiding a version upgrade for processing the user input) may be transmitted to the user terminal.

According to the path rule selection operation using the SICM as described above, a plurality of intent classification managers are generated for respective versions, and it is not necessary to learn the version name together in the DNLU learning process. However, as the corresponding application is being upgraded, the number of intent classification managers is increased, and this may cause the size of the DNLU to be increased. Further, as the size is being increased, a path rule loading time may be increased.

Figure 29:
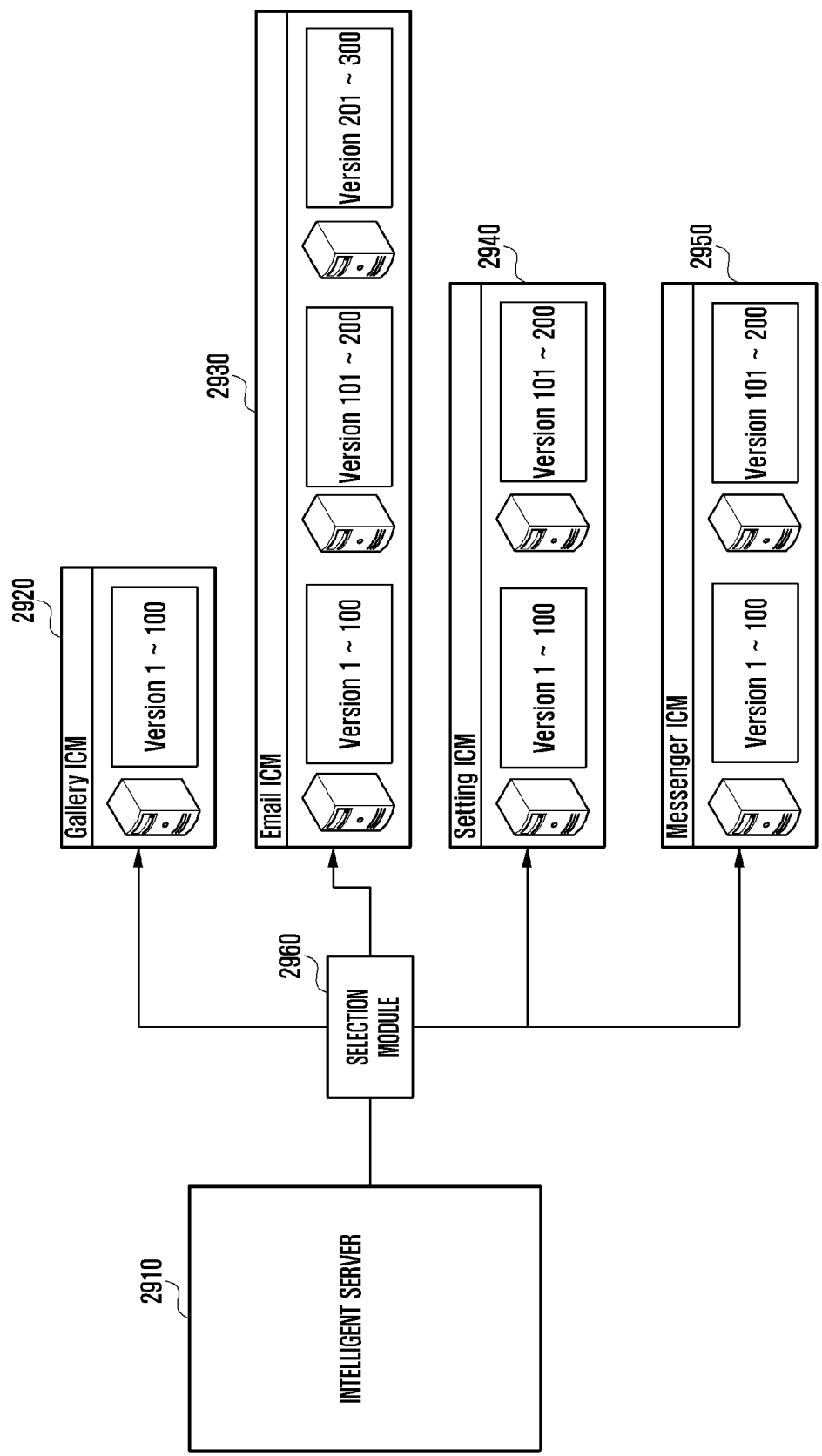
FIG. 29 is a diagram explaining a dispersion processing structure for SICM in an integrated intelligence system according to various embodiments of the disclosure.

FIG. 29 is a diagram explaining a dispersion processing structure for SICM in an integrated intelligence system according to various embodiments of the disclosure.

As the number of applications that can be controlled by an intelligent agent is increased, and their versions are increased, the number of ICMs may be continuously increased. Accordingly, an integrated intelligence system according to various embodiments of the disclosure may divide an ICM into several SICMs based on a domain, and it may disperse the SICMs to several physically different servers to operate the dispersed SICMs.

With reference to FIG. 29, the integrated intelligence system may include an intelligent server 2910, a plurality of SICM servers 2920, 2930, 2940, and 2950, and a selection module 2960.

The intelligent server 2910 according to various embodiments of the disclosure may determine the domain of the user input received from the user terminal. Further, the intelligent server 2910 may receive version information of the application corresponding to the domain from the user terminal. The intelligent server 2910 may receive version information of a plurality of applications from the user terminal, and among them, the intelligent server 2910 may select the version information corresponding to the domain. The intelligent server 2910 may transmit the domain and the corresponding version information to the selection module 2960 together with the user input.

The selection module 2960 according to various embodiments of the disclosure may transmit the version information and the user input by selecting an SICM server corresponding to the domain. The selection module 2960 may be one constituent element of the intelligent server 2910, or it may be located in a separate server that is physically discriminated from the intelligent server 2910.

A plurality of SICM servers 2920, 2930, 2940, and 2950 according to various embodiments of the disclosure may be identified by the domain, and they may be provided with a plurality of SICMs discriminated by the version of the application. Further, the plurality of SICM servers 2920, 2930, 2940, and 2950 may select the path rule based on the version information received from the selection module 2960 and the user input to transmit the selected path rule to the intelligent server 2910. Accordingly, the intelligent server 2910 may transmit the corresponding parameter to the user terminal together with the path rule.

Figure 30:
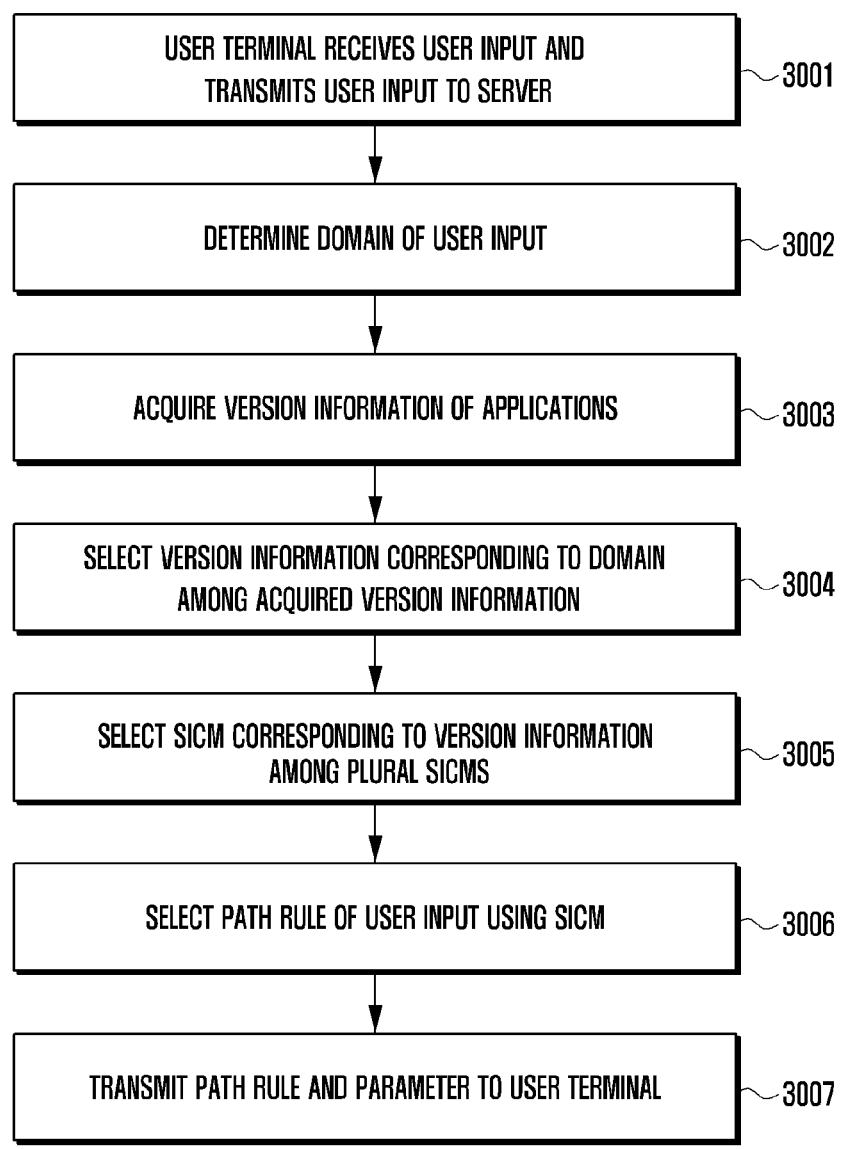
FIG. 30 is a flowchart explaining a path rule selection method using SICM in an integrated intelligence system according to various embodiments of the disclosure.

FIG. 30 is a flowchart explaining a path rule selection method using SICM in an integrated intelligence system according to various embodiments of the disclosure.

With reference to FIG. 30, at operation 3001, a user terminal (e.g., 100 in FIG. 1) may receive a user input through an input module (e.g., 110 in FIG. 2).

At operation 3002, the intelligent server (e.g., 200 in FIG. 2) may determine a domain of the user input received from the user terminal using a domain classification manager.

At operation 3003, the intelligent server may read version information of all applications that can be controlled by an intelligent agent (e.g., 151 in FIG. 2) from the user terminal.

At operation 3004, the intelligent server may select version information corresponding to the domain among the read version information.

At operation 3005, the intelligent server may select an intent classification manager corresponding to the selected version information to select the path rule among the plurality of SICMs.

At operation 3006, the intelligent server may select the path rule through sending of the user input to the selected intent classification manager. The selected intent classification manager may be a constituent element of the intelligent server, or it may be located in a separate server that is physically discriminated.

At operation 3007, the intelligent server may transmit the selected path rule and the corresponding parameter to the user terminal.

Figure 31:
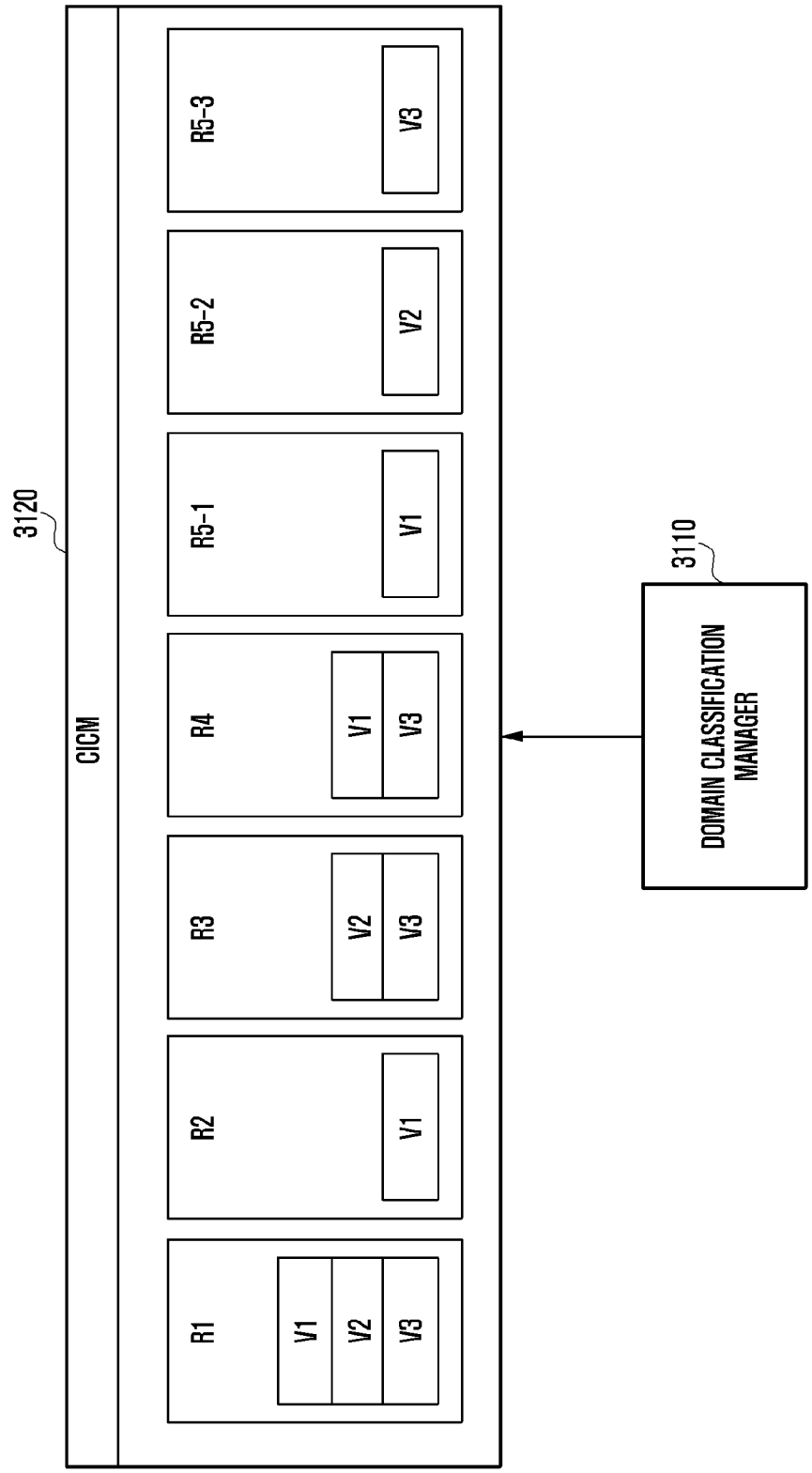
FIG. 31 is a diagram explaining an operation in which an integrated intelligence system selects a path rule using a conditional ICM (CICM) according to various embodiments of the disclosure.

FIG. 31 is a diagram explaining an operation in which an integrated intelligence system selects a path rule using a CICM according to various embodiments of the disclosure.

An integrated intelligence system according to various embodiments of the disclosure may include a CICM learning a path rule together with a version of an application that can be controlled by the corresponding path rule. Accordingly, as compared with the above-described SICM, the CICM may have an increased amount of learning and a reduced DNLU size.

With reference to FIG. 31, a domain classification manager 3110 according to various embodiments of the disclosure may determine a domain of a user input. Further, the domain classification manager 3110 may receive version information of an application corresponding to the domain from a user terminal. The domain classification manager 3110 may receive version information of a plurality of applications from the user terminal, and among them, it may select the version information corresponding to the domain. The domain classification manager 3110 may transmit the received version information (or the selected version information) to a CICM 3120 together with the user input.

The CICM 3120 according to various embodiments of the disclosure may be provided with a plurality of path rules. The path rules may be managed together with the version information of the application that can be controlled by the corresponding path rule. For example, as illustrated in FIG. 31, the version of the application that can be controlled by the path rule R1 may be version (V)1, V2, and V3. The CICM 3120 may determine whether the selected path rule is a path rule corresponding to the version information received from the domain classification manager 3110. For example, if the selected path rule is R5-2, and the version information received from the domain classification manager 3110 is V2, the path rule R5-2 may be transmitted to the user terminal together with the corresponding parameter. If the version information received from the domain classification manager 3110 is unable to be supported by the selected path rule, the selected path rule may not be transmitted to the user terminal, and other information (e.g., message indicating that the user input is unable to be processed or message guiding a version upgrade for processing the user input) may be transmitted to the user terminal.

According to the path rule selection operation using the CICM, learning data is generated by a combination of the path rule and the version, and thus the amount of learning of the intent classification manager may be increased. This is because the learning of the intent classification manager should be performed whenever the path rule and the version are added.

Figure 32:
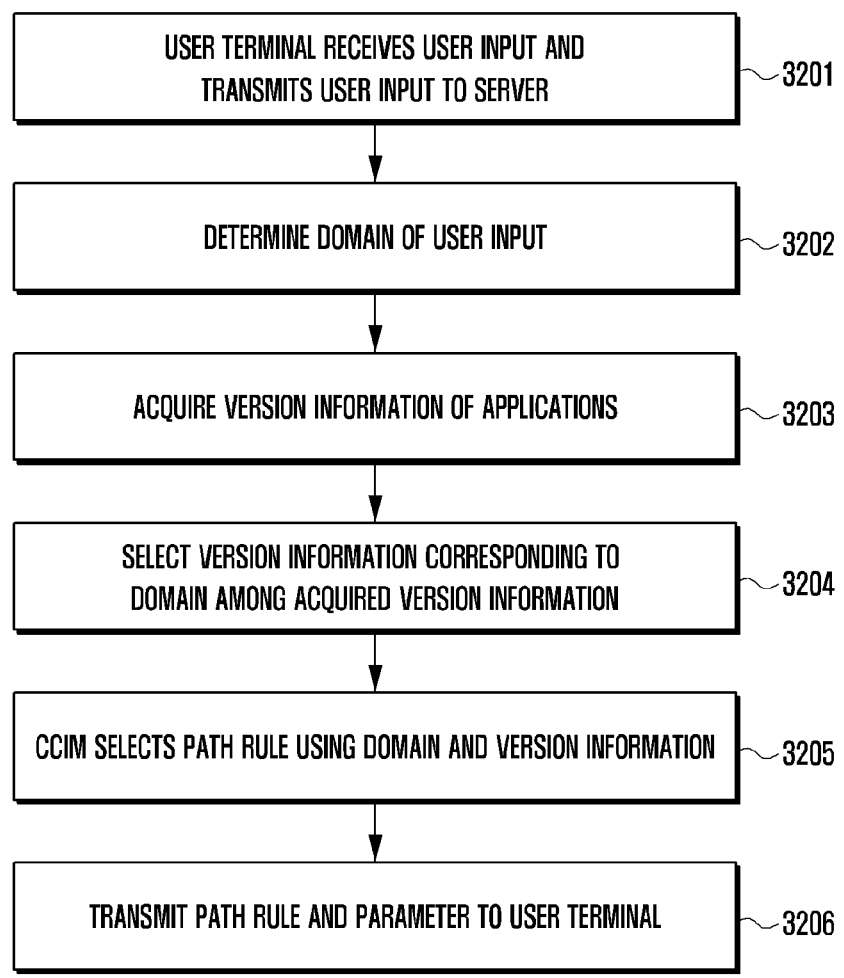
FIG. 32 is a flowchart explaining a path rule selection method using CICM in an integrated intelligence system according to various embodiments of the disclosure.

FIG. 32 is a flowchart explaining a path rule selection method using CICM in an integrated intelligence system according to various embodiments of the disclosure.

With reference to FIG. 32, at operation 3201, a user terminal (e.g., 100 in FIG. 1) may receive a user input through an input module (e.g., 110 in FIG. 2).

At operation 3202, the intelligent server (e.g., 200 in FIG. 2) may determine a domain of the user input received from the user terminal using a domain classification manager.

At operation 3203, the intelligent server may read version information of all applications that can be controlled by an intelligent agent (e.g., 151 in FIG. 2) from the user terminal.

At operation 3204, the intelligent server may select version information corresponding to the domain among the read version information.

At operation 3205, the intelligent server may select the path rule through sending of the domain and the corresponding version information to a CICM. Here, the CICM may be provided with a plurality of path rules. For example, as illustrated in FIG. 31, the path rules may be managed together with the version information of the application that can be controlled by the corresponding path rule.

At operation 3206, the intelligent server may transmit the selected path rule and the corresponding parameter to the user terminal.

Figure 33:
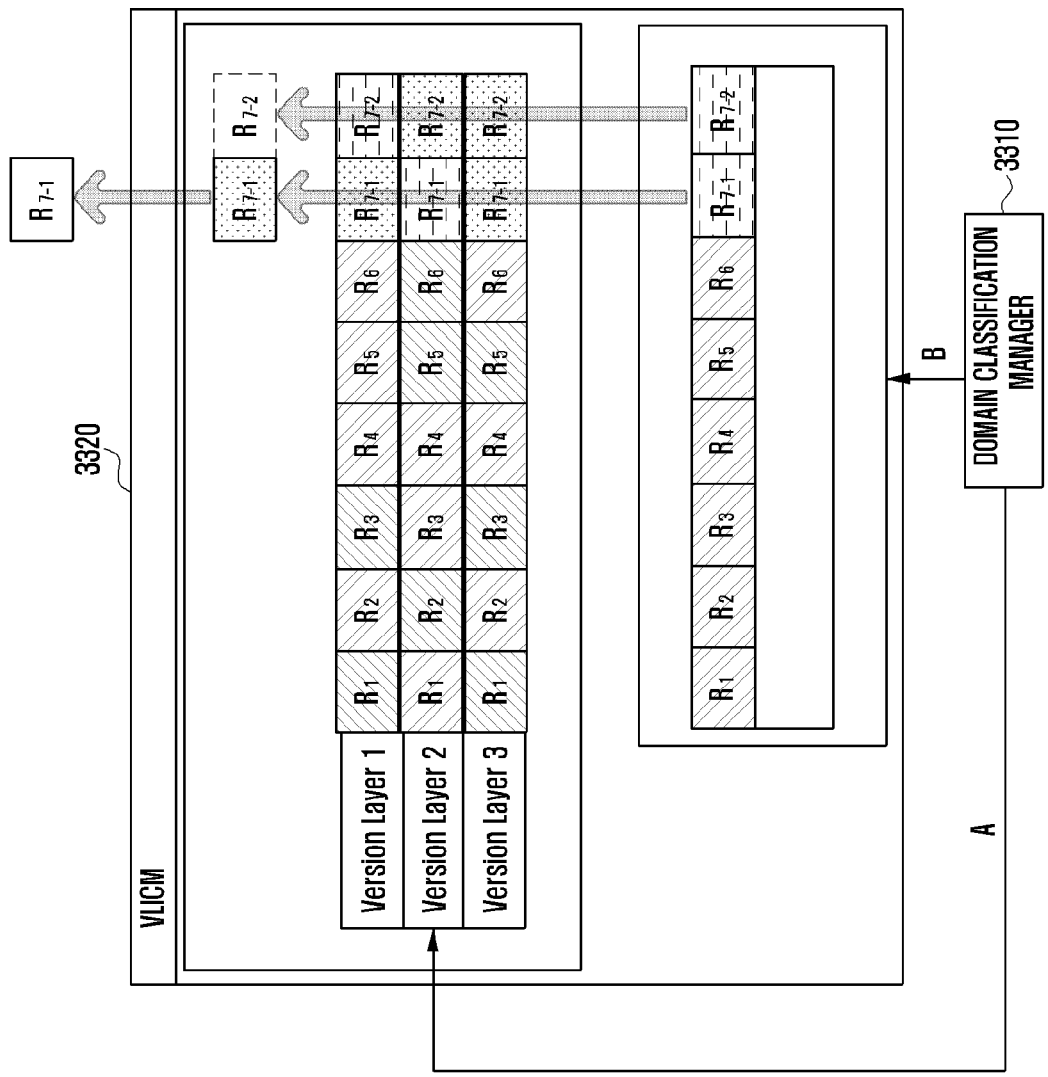
FIG. 33 is a diagram explaining an operation in which an integrated intelligence system selects a path rule using a version layered ICM (VLICM) according to various embodiments of the disclosure.

FIG. 33 is a diagram explaining an operation in which an integrated intelligence system selects a path rule using a VLICM according to various embodiments of the disclosure.

An integrated intelligence system according to various embodiments may include a VLICM whereby path rules are hierarchically configured and learned in accordance with a version of an application. As compared with the above-described CICM whereby the path rule is learned together with the version, the VLICM can reduce the learning amount of ICM.

With reference to FIG. 33, a domain classification manager 3310 according to various embodiments of the disclosure may determine a domain of a user input. Further, the domain classification manager 3310 may receive version information of an application corresponding to the domain, for example, version (V)2. The domain classification manager 3310 may receive version information of a plurality of applications from the user terminal, and among them, the domain classification manager 3310 may select the version information corresponding to the domain, for example, V2. The domain classification manager 3310 may transmit the received version information (or selected version information) (A) and the user input (B) to the VLICM 3320.

The VLICM 3320 according to various embodiments of the disclosure may select path rules belonging to the domain of the user input (B), for example, "R1, R2, R3, R4, R5, R6, R7-1, and R7-2" as a candidate group corresponding to the user input (B). The VLICM 3320 may grasp the user's intent through analysis of the user input (B), and it may select the path rule corresponding to the intent from a candidate group.

For example, the VLICM 3320 may determine that R7-1 and R7-2 in the candidate group have the same probability and are closest to the intent.

The VLICM 3320 according to various embodiments of the disclosure may version-hierarchically divide the path rules into supportable path rules and non-supportable path rules. For example, version layers may be identified by the version information of the application. The VLICM 3320 may select the version information received from the domain classification manager 3310, for example, version layer 2 corresponding to V2, and it may determine whether the path rule selected to correspond to the intent is the path rule that can be supported on the selected version layer 2. For example, the VLICM 3320 may select R7-1 of the selected path rules R7-1 and R7-2 as the path rule that can be supported by the selected version layer 2, and it may confirm the selected path rule as the path rule to be transmitted to the user terminal.

Figure 34:
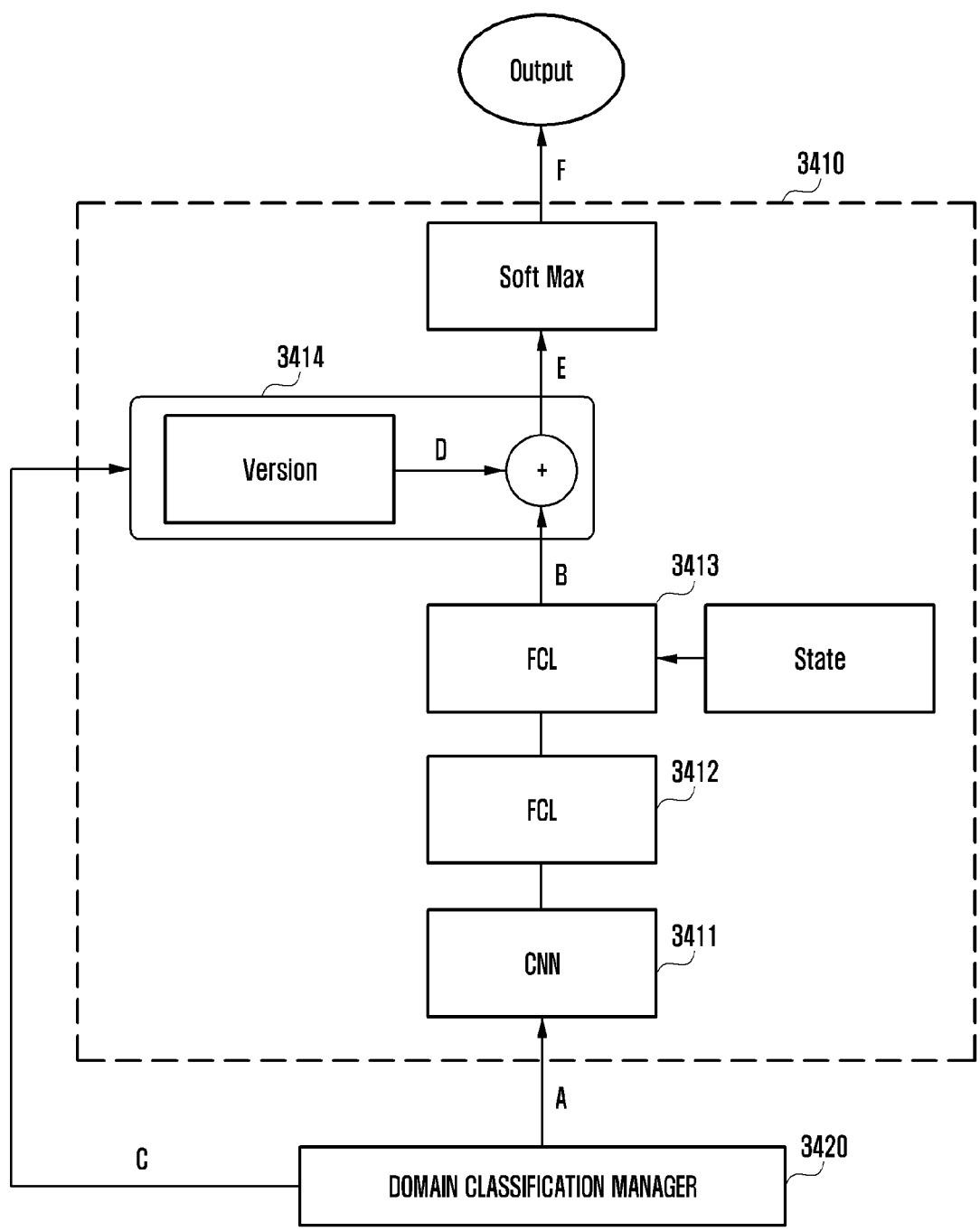
FIG. 34 is a diagram explaining an internal structure for an operation in which an integrated intelligence system selects a path rule using a VLICM according to various embodiments of the disclosure.

FIG. 34 is a diagram explaining an internal structure for an operation in which an integrated intelligence system selects a path rule using a VLICM according to various embodiments of the disclosure.

With reference to FIG. 34, a DNLU module 3410 according to various embodiments of the disclosure may be configured to grasp a user's intent through analysis of a user input and to output a path rule as a result. For example, the DNLU module 3410 may include a hierarchically configured convolution neural network (CNN) module 3411, a first fully connected layer (FCL) module 3412, a second FCL module 3413, and a version layer module 3414.

According to various embodiments of the disclosure, the CNN module 3411, the first FCL module 3412, and the second FCL module 3413 may recognize the user's intent through analysis in stages of the user input (A) received from the domain classification manager 3420, and it may output the path rule (B) corresponding to the intent among the path rules. One of the modules 3411, 3412, and 3413, for example, the second FCL module 3413, may refer to state information.

The version layer module 3414 according to various embodiments of the disclosure may version-hierarchically divide the path rules into supportable path rules and non-supportable path rules. Further, the version layer module 3414 may receive version information (C) of the application corresponding to the domain of the user input from the domain classification manager 3420. The version layer module 3414 may be configured to filter the result received from the second FCL module 3413 based on the version information (C). For example, the version layer module 3414 may select the version layer (D) corresponding to the version information (C), and it may determine whether the path rule (B) can be supported by the version layer (D) to output the resultant value (E). The resultant value (E) output through filtering by the version layer module 3414 may be output as the final resultant value, for example, the path rule (F) after readjustment of the probability through a softmax function. The above-described structure may be used in a DNLU running process and also in a DNLU learning process.

Figure 35:
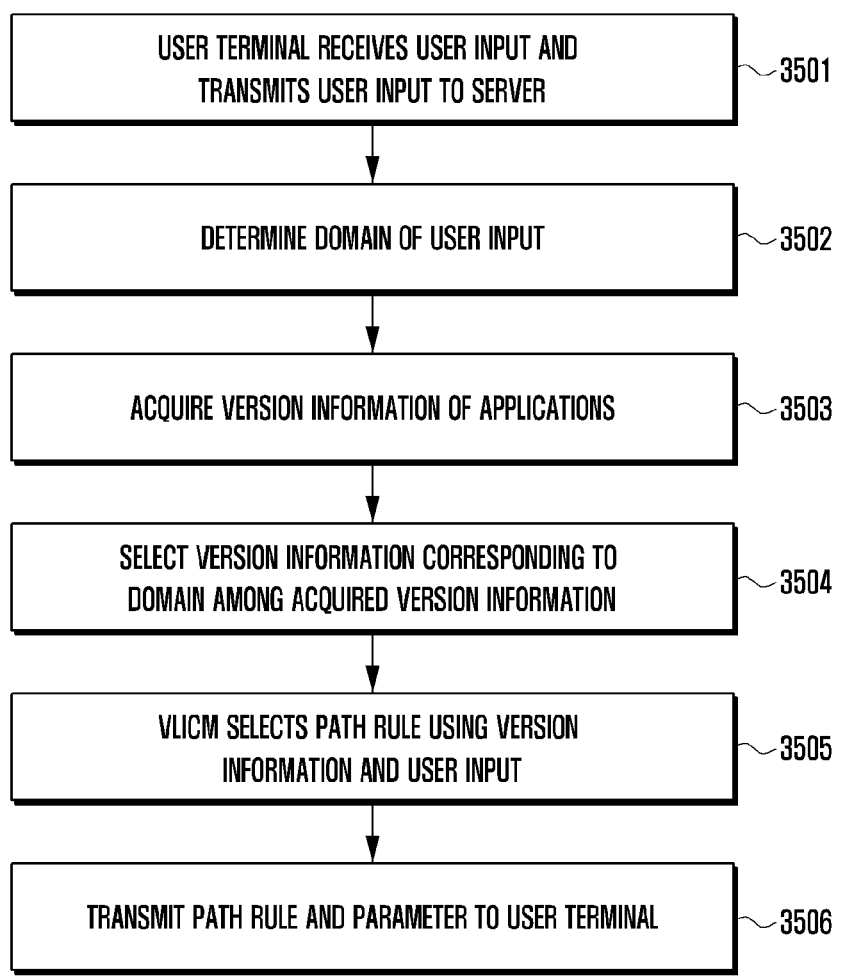
FIG. 35 is a flowchart explaining a path rule selection method using a VLICM in an integrated intelligence system according to various embodiments of the disclosure.

FIG. 35 is a flowchart explaining a path rule selection method using a VLICM in an integrated intelligence system according to various embodiments of the disclosure.

With reference to FIG. 35, at operation 3501, a user terminal (e.g., 100 in FIG. 1) may receive a user input through an input module (e.g., 110 in FIG. 2), and it may transmit the user input to an intelligent server (e.g., 200 in FIG. 1).

At operation 3502, the intelligent server may determine a domain of the user input received from the user terminal using an NLU module (e.g., 220 in FIG. 4).

At operation 3503, the intelligent server may acquire version information of all applications that can be controlled by an intelligent agent (e.g., 151 in FIG. 2), for example, through communication with the user terminal.

At operation 3504, the intelligent server may select version information corresponding to the domain among the acquired version information.

At operation 3505, the intelligent server may select the path rule through sending of the version information and the user input to a VLICM (e.g., 3410 in FIG. 34).

At operation 3506, the intelligent server may transmit the path rule through sending of the selected path rule and the corresponding parameter to the user terminal.

Figure 36:
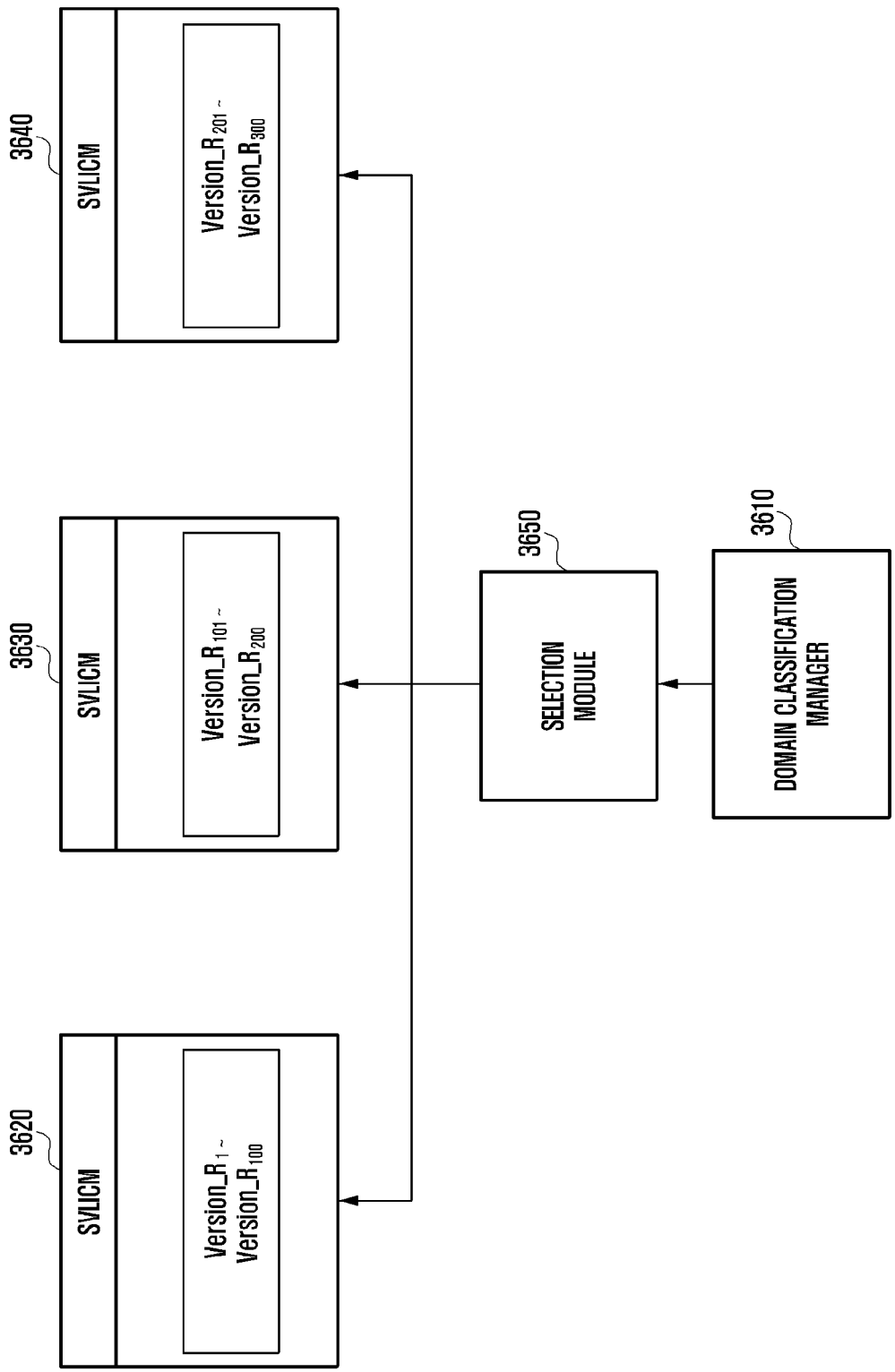
FIG. 36 is a diagram explaining an operation in which an integrated intelligence system selects a path rule using a separate VLICM (SVLICM) according to various embodiments of the disclosure.

FIG. 36 is a diagram explaining an operation in which an integrated intelligence system selects a path rule using a separate VLICM (SVLICM) according to various embodiments of the disclosure An integrated intelligence system according to various embodiments of the disclosure may divide VLICM into several SVLICMs to be operated based on a version.

With reference to FIG. 36, a domain classification manager 3610 according to various embodiments of the disclosure may determine a domain of a user input. Further, the domain classification manager 3610 may receive version information of an application corresponding to the domain from a user terminal. The domain classification manager 3610 may receive version information of a plurality of applications from the user terminal, and among them, the domain classification manager 3610 may select the version information corresponding to the domain. The domain classification manager 3610 may transmit the user input to an SVLICM corresponding to the received version information (or selected version information) among a plurality of SVLICMs 3620, 3630, and 3640.

A selection module 3650 according to various embodiments of the disclosure may select the SVLICM corresponding to the version information received from the domain classification manager 3610, and it may transmit the version information and the user input.

The plurality of SVLICMs 3620, 3630, and 3640 according to various embodiments of the disclosure may be identified by a version layer set. For example, the first SVLICM 3620 may have a version layer set V1 to V100, the second SVLICM 3630 may have a version layer set V101 to V200, and the third SVLICM 3640 may have a version layer set V201 to V300. A selection module 3650 may transmit the version information and the user input to the SVLICM having the version layer set to which the version information received from the domain classification manager 3610 belongs. The SVLICM selected by the selection module 3650 may select the path rule based on the version information and user input.

FIG. 37 is a diagram explaining a graphic interface for showing an operation in which an electronic device provides a hint to a user based on version information of an application according to various embodiments of the disclosure.

With reference to (a) in FIG. 37, an electronic device according to various embodiments of the disclosure may provide various hints to a user through a dialogue window of an intelligent agent. If a hint desired by the user among the provided hints, for example, "Send a laughing emoticon with a text massage" (3710), is selected, the electronic device may control a path rule application corresponding to the selected hint.

According to various embodiments of the disclosure, the hint may be provided through analysis of functions frequently used by the user in ordinary days. A hint for introducing addition of a new function through a manufacturer to the user may be provided. A hint that is currently required by the user based on the user's context information may be provided.

According to various embodiments of the disclosure, the hint may be related to the path rule for controlling the application. That is, the control of the application may be performed by user's selection of the hint. Accordingly, the hint to be provided to the user may differ in accordance with the version of the application. For example, with reference to Table 4, if the version of the application is Version 1.1_KT or Version 1.1_SKT, as illustrated as (a) in FIG. 37, "Send a laughing emoticon with a text message" (3710) may be provided as the hint, and as illustrated as (b) in FIG. 37, "Send a loudly laughing emoticon with a text message" (3720) may be provided as the hint.

Figure 38:
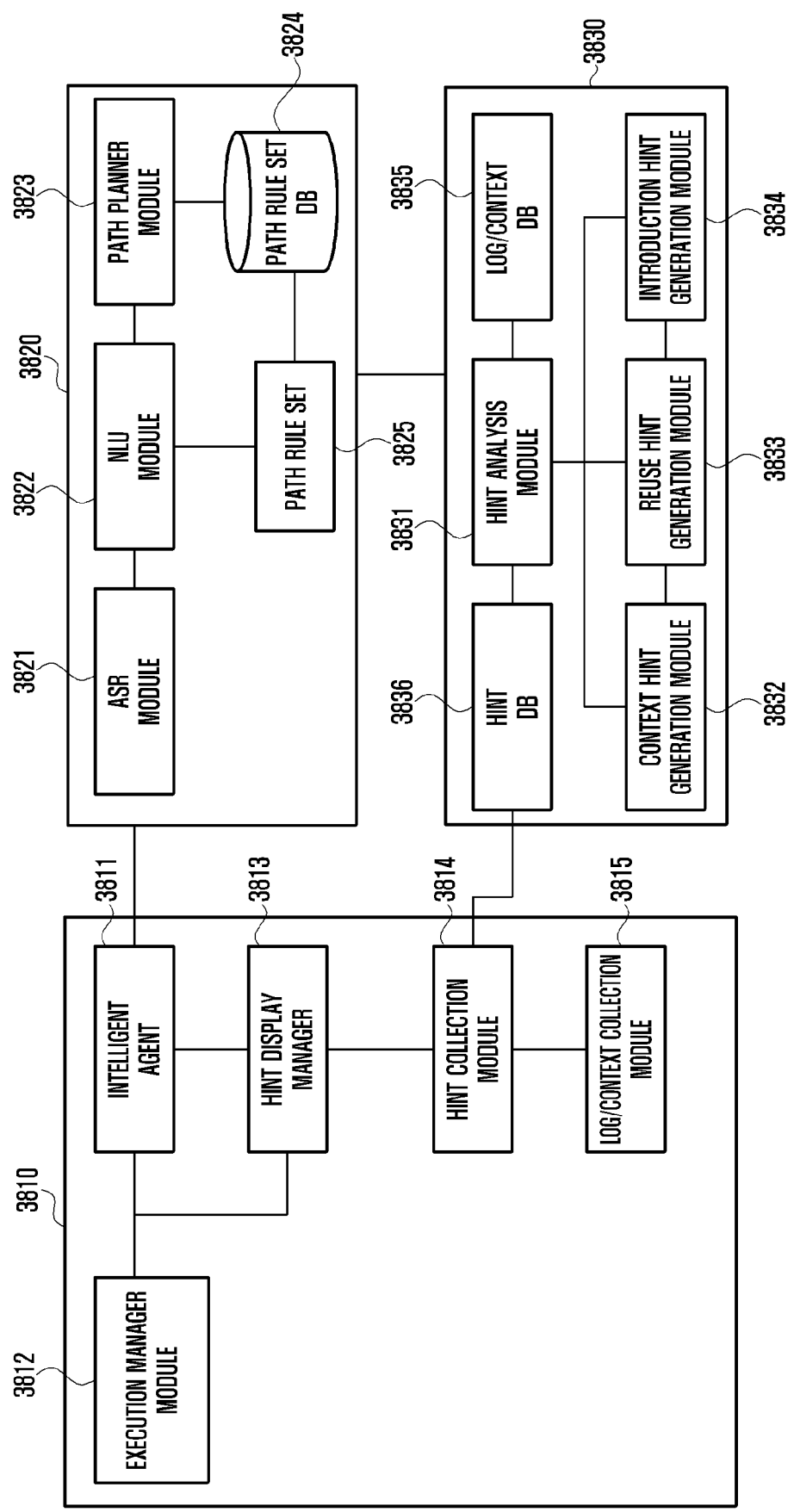
FIG. 38 is a diagram explaining an operation in which an integrated intelligence system manages a hint based on version information of an application according to various embodiments of the disclosure.

FIG. 38 is a diagram explaining an operation in which an integrated intelligence system manages a hint based on version information of an application according to various embodiments of the disclosure.

With reference to FIG. 38, an integrated intelligence system according to various embodiments of the disclosure may include a user terminal 3810, an intelligent server 3820, and a hint proposal server 3830.

The user terminal 3810 according to various embodiments of the disclosure may include an intelligent agent 3811, an execution manager module 3812, a hint display manager 3813, a hint collection module 3814, and a log/context collection module 3815.

The intelligent server 3820 according to various embodiments of the disclosure may include an ASR module 3821, an NLU module 3822, a path planner module 3823, and a path rule set DB 3824.

The hint proposal server 3830 according to various embodiments of the disclosure may include a hint analysis module 3831, a context hint generation module 3832, a reuse hint generation module 3833, an introduction hint generation module 3834, a log/context DB 3835, and a hint DB 3836.

The intelligent agent 3811 according to various embodiments of the disclosure may transmit a user input for controlling an application to the intelligent server 3820. Further, version information of the application collected by the execution manager module 3812 may be transmitted to the intelligent server 3820 through the intelligent agent 3811. The intelligent agent 3811 may transfer the path rule selected by the intelligent server 3820 and the parameter to the execution manager module 3812 based on the version information and the user input. Accordingly, the execution manager module 3812 may control the application based on the path rule and the parameter.

If a hint providing request is received from the intelligent agent 3811, the hint collection module 3814 according to various embodiments of the disclosure may request the hint from the hint proposal server 3830, and it may send the received hint to the hind display manager 3813 to display the hint on a display. The hint selected by the user among the displayed hints may be recognized by the intelligent agent 3811 through the hint display manager 3813. The intelligent agent 3811 may transfer the hint selected by the user to the intelligent server 3820 as the user input. Accordingly, the path rule selected by the intelligent server 3820 based on the hint (i.e., user input) may be transferred to the execution manager module 3812, and as a result, execution of the corresponding application based on the hint may be performed.

The log/context collection module 3815 according to various embodiments of the disclosure may collect log information and context information, and it may transmit the collected log information and context information to the hint proposal server 3830. Here, the log information may include an execution result log of an application according to the path rule, user's profile information (e.g., sex, age, life event information, and activity time), or user's preference information. As described above with reference to FIG. 6, the context information may include general context information, user context information, or device context information.

In the path planner module 3823 according to various embodiments of the disclosure, a path rule set DB 3824 including path rule sets corresponding to respective versions of the applications exists, and based on the version information received from the user terminal 3810, the path planner module 3823 may transfer the path rule set 3825 coinciding with the version of the respective applications installed in the user terminal 3810 to the NLU module 3822.

The NLU module 3822 according to various embodiments of the disclosure may grasp the user's intent through analysis of the user input received from the user terminal 3810 through the ASR module 3821, and it may select the path rule as the result to send the path rule together with the parameter to the user terminal 3810. In selecting the final path rule, the NLU module may refer to the version information of the application installed in the user terminal 3810, that is, a path rule set 3825.

The hint analysis module 3831 according to various embodiments of the disclosure may collect log and context information of the user terminal 3810 through the log/context DB 3835, and it may generate the hints to be provided to the user terminal 3810, for example, in the form of a list in which priorities are given to the respective hints through analysis of the collected information. For example, the hint analysis module 3831 may generate the hint using the context hint generation module 3832 (e.g., 155c-2), the reuse hint generation module 3833 (e.g., 155c-5), and the introduction hint generation module 3834 (e.g., 155c-6). The hint analysis module 3831 may provide a list to the user terminal 3810 through the hint DB 3836.

The hint analysis module 3831 according to various embodiments of the disclosure may receive the version information of the application installed in the user terminal 3810 through the path planner module 3823. According to a certain embodiment, the version information may be received from the user terminal 3810 to the hint proposal server 3830 without passing through the intelligent server 3820. The hint analysis module 3831 may determine whether the path rule corresponding to the generated hint can be supported by the user terminal 3810 based on the version information, and it may perform a task for selecting the supportable hints and the non-supportable hints in the hint list in accordance with the result of the determination. Through the selection task, the hint list may be reconfigured with only the supportable hints to be stored in the hint DB 3836, and it may be transmitted to the user terminal 3810 by the hint providing request of the user terminal 3810.

According to a certain embodiment, the selection task may be omitted, and the version information supporting this may be transmitted to the user terminal 3810 together with the hint. According to this, the hint display manager 3813 of the user terminal 3810 may perform the selection task, and it may display the supportable hint through the display. If the hint displayed on the display is selected by the user, the hint display manager 3813 may send the path rule of the corresponding hint and the parameter to the execution manager module 3812 to execute the application.

According to a certain embodiment, the hint may be transmitted to the user terminal 3810 together with the path rule and the parameter. For example, the hint analysis module 3831 may receive the path rule and the parameter corresponding to the hint (i.e., user's speech) from the intelligent server 3820 to store the path rule and the parameter in the hint DB 3836 together with the hint, and it may transmit the "hint, path rule, and parameter" to the user terminal 3810 through the hint providing request of the user terminal 3810.

According to various embodiments of the disclosure, an electronic device may include a housing; a touchscreen display located inside the housing and exposed through a first portion of the housing; a microphone located inside the housing and exposed through a second portion of the housing; at least one speaker located inside the housing and exposed through a third portion of the housing; a wireless communication circuitry located inside the housing; a processor located inside the housing and electrically connected to the display, the microphone, the speaker, and the communication circuitry; and a memory located inside the housing and electrically connected to the processor, wherein the memory is configured to store a plurality of application programs installed in the electronic device, and the memory, when executed, includes instructions to cause the processor to receive a user input including a request for performing a task using at least one of the application programs through at least one of the display or the microphone, to transmit data related to the user input to an external server through the communication circuitry, to transmit version information on at least one of the application programs to the external server through the communication circuit together with or after the data transmission, to receive a path rule from the external server through the communication circuitry as a response to the request, and to perform the task by allowing the electronic device to have the sequence. The path rule may include information on a sequence of states of the electronic device for performing the task. At least one of the states may be determined by the external server based on at least a part of the version information The sequence may be determined by the external server based on at least a part of the version information.

The instructions may cause the processor to receive, from the external electronic device, parameters necessary when at least one of operations of the task.

The parameters may be acquired from the user input.

The instructions may cause the processor to display a user interface for the user input necessary when at least one of operations of the task is executed.

The instructions may cause the processor to upgrade an application to a version necessary to execute operations of the task.

The instructions may cause the processor to display a change in stages of operations of the task through the display.

The instructions may cause the processor to transmit information indicating a change of an application to the external server through the communication circuitry.

The change may be deletion, version upgrade, or installation into the electronic device.

The instructions may cause the processor to transmit version information corresponding to applications installed in the electronic device to the external server through the communication circuitry if booting completion of the electronic device, insertion of an SD card into the electronic device, or removal of the SD card from the electronic device is recognized.

The instructions may cause the processor to acquire a hint based on at least one of version information corresponding to applications installed in the electronic device, to display the hint through the display, to receive a second user input for the hint, and to control operations of at least one of the applications using the path rule corresponding to the hint in response to the second user input.

The hint may differ for each version of the application.

According to various embodiments of the disclosure, an electronic device may include a housing; a touchscreen display located inside the housing and exposed through a first portion of the housing; a microphone located inside the housing and exposed through a second portion of the housing; at least one speaker located inside the housing and exposed through a third portion of the housing; a wireless communication circuitry located inside the housing; a processor located inside the housing and electrically connected to the display, the microphone, the speaker, and the communication circuitry; and a memory located inside the housing and electrically connected to the processor, wherein the memory, when executed, includes instructions to cause the processor to receive a user input through at least one of the display or the microphone, to transmit the user input to an external server, to receive an analysis result of the user input from the external server, to select a path rule set from a path rule set database based on at least a part of the analysis result and version information corresponding to respective applications installed in the electronic device, to select a path rule from the path rule set based on at least the part of the analysis result, and to control operations of at least one of the applications using the path rule. The path rule may include information on the operations and an order of the operations According to various embodiments of the disclosure, a server may include a path planner module configured to receive, from a user terminal, version information corresponding to respective applications installed in the user terminal and to acquire path rule sets respectively corresponding to the version information from a path rule set database; and a natural language understanding module configured to analyze a user input received from the user terminal, to select a path rule set among the path rule sets acquired by the path planner module based on at least a part of an analysis result, to select a path rule from the selected path rule set based on at least a part of the result, and to transmit the selected path rule to the user terminal, wherein the selected path rule controls at least one of operations of the applications installed in the user terminal The result may include a domain indicating the application to be controlled using the selected path rule, a user's intent corresponding to the selected path rule, and a parameter necessary when at least one of the operations is executed.

The natural language understanding module may be configured to select the path rule set corresponding to the domain among the path rule sets acquired by the path planner module and to transmit the parameter to the user terminal together with the selected path rule.

The natural language understanding module may include a plurality of intent classification managers configured to grasp a user's intent through analysis of the user input and to determine the path rule corresponding to the grasped intent, and a domain classification manager configured to determine a domain of the user input, to select the version information corresponding to the domain among the version information, and to determine one of the plurality of intent classification managers as a manager for the analysis of the user input based on the selected version information.

The plurality of intent classification managers may be identified by application versions, and classify and manage the path rules into supportable ones and unsupportable ones.

The natural language understanding module may include a domain classification manager configured to determine a domain of the user input and to select the version information corresponding to the domain among the version information; and an intent classification manager configured to grasp a user's intent through analysis of the user input and to determine whether to transmit the selected path rule to the user terminal based on the version information selected by the domain classification manager.

According to various embodiments of the disclosure, a method for operating an electronic device may include receiving a user input through at least one of a touchscreen display or a microphone; acquiring version information corresponding to respective applications installed in the electronic device in response to the user input; transmitting the user input and the version information to an external server through a communication module; receiving a path rule from the external server; and controlling operations of at least one of the applications using the path rule, wherein the path rule is generated based on the user input and at least one of the version information, and the path rule includes information on the operations and an order of the operations.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. The module may be implemented mechanically or electronically, and for example, it may perform certain operations, and include an application-specific integrated circuit (ASIC) chip, a field-programmable gate arrays (FPGAs), or a programmable logic device, which is known or is to be developed. At least parts of a device according to various embodiments (e.g., modules or their functions) or a method (e.g., operations) may be implemented in the form of program modules as instructions stored in a computer-readable recording medium (e.g., memory 140). If the instructions are executed by a processor (e.g., processor 150), the processor may perform functions corresponding to the instructions. The computer-readable recording medium may include a hard disk, a floppy disk, a magnetic medium (e.g., magnetic tape), an optical recording medium (e.g., CD-ROM, DVD, magneto-optic medium (e.g., floptical disk), and built-in memory. The instructions may include a code made by a compiler or a code that can be executed by an interpreter. According to various embodiments, one or more of the above-described components may be omitted, or one or more other components may be added. According to various embodiments, operations performed by the module, the program, or another component may be carried out sequentially, in parallel, repeatedly, or heuristically, or one or more of the operations may be executed in a different order or omitted, or one or more other operations may be added.

Although preferred embodiments of the disclosure have been described in the specification and drawings and specific wordings have been used, these are merely used as general meanings to assist those of ordinary skill in the art to gain a comprehensive understanding of the disclosure, and do not limit the scope of the disclosure. It will be apparent to those of ordinary skill in the art to which the disclosure pertains that various embodiments are possible based on the technical concept of the disclosure.

The invention claimed is:

1. An electronic device comprising:
a touchscreen display;
a microphone;
at least one speaker;
a wireless communication circuitry;
a processor electrically connected to the display, the microphone, the speaker, and the communication circuitry; and
a memory electrically connected to the processor,
wherein the memory is configured to store a plurality of application programs installed in the electronic device, and
the memory, when executed, includes instructions to cause the processor to:
receive a user input including a request for performing a task using at least one of the application programs through at least one of the display or the microphone,
transmit data related to the user input to an external server through the communication circuitry,
transmit version information on at least one of the application programs to the external server through the communication circuit together with or after the data transmission,
receive a path rule from the external server through the communication circuitry as a response to the request, the received path rule including information on a sequence of operations of the task to be performed by the electronic device using at least one of the application programs, and the received path rule being selected by the external server based on the version information from among a plurality of path rules that are different for each version of the application programs, and
perform the task based on the received path rule.

2. The electronic device of claim 1, wherein the instructions cause the processor to receive, from an external electronic device, parameters necessary for at least one of the operations of the task,
wherein the parameters are acquired from the user input.

3. The electronic device of claim 1, wherein the instructions cause the processor to display a user interface for the user input necessary when at least one of the operations of the task is executed.

4. The electronic device of claim 1, wherein the instructions cause the processor to upgrade an application to a version necessary to execute the operations of the task.

5. The electronic device of claim 1, wherein the instructions cause the processor to display a change in stages of the operations of the task through the display.

6. The electronic device of claim 1, wherein the instructions cause the processor to transmit information indicating a change of an application to the external server through the communication circuitry,
wherein the change is deletion, version upgrade, or installation into the electronic device.

7. The electronic device of claim 1, wherein the instructions cause the processor to transmit the version information corresponding to the application programs installed in the electronic device to the external server through the communication circuitry if booting completion of the electronic device, insertion of an SD card into the electronic device, or removal of the SD card from the electronic device is recognized.

8. The electronic device of claim 1, wherein the instructions cause the processor to:
acquire a hint based on the version information corresponding to application programs installed in the electronic device,
display the hint through the display,
receive a second user input for the hint, and
control operations of at least one of the application programs using the path rule corresponding to the hint in response to the second user input,
wherein the hint differs for each version of the at least one application program.

9. A server comprising:
a path planner module configured to:
receive, from a user terminal, version information indicating each version of applications installed in the user terminal, and
select a path rule set corresponding to the version information from a path rule set database including a plurality of path rule sets that are different for each version of the applications; and
a natural language understanding module configured to:
analyze a user input received from the user terminal,
select a path rule from the selected path rule set based on at least a part of an analysis result, and
transmit the selected path rule to the user terminal,
wherein the selected path rule includes information on operations performed by the user terminal using at least one of the applications installed in the user terminal.

10. The server of claim 9, wherein the result comprises:
a domain indicating at least one of the applications to be controlled using the selected path rule;
a user's intent corresponding to the selected path rule; and
a parameter necessary when the at least one of the operations is executed,
wherein the natural language understanding module is further configured to:
select the path rule corresponding to the domain among the path rule set selected by the path planner module, and
transmit the parameter to the user terminal together with the selected path rule.

11. The server of claim 9, wherein the natural language understanding module comprises:
a plurality of intent classification managers configured to:
grasp a user's intent through analysis of the user input, and
determine the path rule corresponding to the grasped intent; and
a domain classification manager configured to:
determine a domain of the user input,
select version information corresponding to the domain among the received version information, and
determine one of the plurality of intent classification managers as a manager for the analysis of the user input based on the selected version information,
wherein the plurality of intent classification managers are identified by application versions, and classify and manage path rules into supportable ones and unsupportable ones.

12. The server of claim 9, wherein the natural language understanding module comprises:
a domain classification manager configured to:
determine a domain of the user input, and
select version information corresponding to the domain among the received version information; and
an intent classification manager configured to:
grasp a user's intent through analysis of the user input, and
determine whether to transmit the selected path rule to the user terminal based on the version information selected by the domain classification manager.

13. An electronic device comprising:
a touchscreen display;
a microphone;
at least one speaker;
a wireless communication circuitry;
a processor electrically connected to the display, the microphone, the speaker, and the communication circuitry; and
a memory electrically connected to the processor,
wherein the memory, when executed, includes instructions to cause the processor to:
receive a user input through at least one of the display or the microphone,
transmit the user input to an external server,
receive an analysis result of the user input from the external server,
select a path rule set from a path rule set database based on at least a part of the analysis result and version information corresponding to respective applications installed in the electronic device, the path rule set database including a plurality of path rule sets that are different for each version of the applications,
select a path rule from the path rule set based on at least the part of the analysis result, the selected path rule including information on operations performed by the electronic device using at least one of the applications and an order of the operations, and
control the operations using the path rule.

14. A method for operating an electronic device, comprising:
receiving a user input through at least one of a touchscreen display or a microphone;
acquiring version information corresponding to applications installed in the electronic device in response to the user input;
transmitting the user input and the version information to an external server through a communication module;
receiving a path rule from the external server, the received path rule including information on operations performed by the electronic device using at least one of the applications and an order of the operations, and the received path rule being selected by the external server based on the version information from among a plurality of path rules that are different for each version of the applications; and
performing the operations using the path rule.

* * * * *